(12) United States Patent
Purchase

(10) Patent No.: US 10,317,583 B2
(45) Date of Patent: Jun. 11, 2019

(54) 2D DEGLARING DIFFUSERS INCREASING AXIAL LUMINOUS INTENSITY

(71) Applicant: Bright View Technologies Corporation, Richmond, VA (US)

(72) Inventor: Ken G. Purchase, Morrisville, NC (US)

(73) Assignee: Bright View Technologies Corporation, Richmond, VA (US)

( * ) Notice: Subject to any disclaimer, the term of this patent is extended or adjusted under 35 U.S.C. 154(b) by 265 days.

(21) Appl. No.: 15/105,838

(22) PCT Filed: Dec. 16, 2014

(86) PCT No.: PCT/US2014/070595
§ 371 (c)(1),
(2) Date: Jun. 17, 2016

(87) PCT Pub. No.: WO2015/095189
PCT Pub. Date: Jun. 25, 2015

(65) Prior Publication Data
US 2016/0320532 A1   Nov. 3, 2016

Related U.S. Application Data

(60) Provisional application No. 62/043,868, filed on Aug. 29, 2014, provisional application No. 61/918,498, filed on Dec. 19, 2013.

(51) Int. Cl.
*G02B 5/02* (2006.01)
*F21V 5/00* (2018.01)
(Continued)

(52) U.S. Cl.
CPC ............ *G02B 5/0294* (2013.01); *F21V 5/005* (2013.01); *F21V 5/02* (2013.01); *F21V 7/00* (2013.01);
(Continued)

(58) Field of Classification Search
CPC .............................. G02B 5/0231; F21V 5/005
(Continued)

(56) References Cited

U.S. PATENT DOCUMENTS 1,589,370 A    6/1926  Conover
1,950,560 A *  3/1934  Martinek ............... G02B 5/124
                                              359/528

(Continued)

FOREIGN PATENT DOCUMENTS

CN          102023329         4/2011
DE     10 2006 009 325 A1    10/2011
(Continued)

OTHER PUBLICATIONS

International Search Report and Written Opinion for PCT/US14/70595 dated Mar. 18, 2015, 11 pages.
(Continued)

*Primary Examiner* — Julie A Bannan
(74) *Attorney, Agent, or Firm* — Myers Bigel, P.A.

(57) ABSTRACT

A light transmissive structure includes a light transmissive substrate having first and second opposing faces and an array of microprism elements on the first face, with a respective microprism element comprising a plurality of concentric microprisms. The light transmissive structure is configured to receive light from a light source facing the second face and reduce high-angle luminous intensity of the light emerging from the first face.

16 Claims, 35 Drawing Sheets

(51) Int. Cl.
*F21V 5/02* (2006.01)
*F21V 7/00* (2006.01)
*F21Y 115/10* (2016.01)

(52) U.S. Cl.
CPC ......... *G02B 5/0231* (2013.01); *G02B 5/0268* (2013.01); *F21Y 2115/10* (2016.08)

(58) Field of Classification Search
USPC .................................................. 362/337, 339
See application file for complete search history.

(56) References Cited

U.S. PATENT DOCUMENTS

| | | | |
|---|---|---|---|
| 2,474,317 A | | 6/1949 | McPhail |
| 3,020,395 A | * | 2/1962 | Peltz ...................... F21V 5/008 359/742 |
| 3,159,352 A | | 12/1964 | Wakefield et al. |
| 3,228,990 A | | 11/1966 | Stahlhut |
| 3,330,951 A | * | 7/1967 | Neal ......................... F21V 5/00 362/309 |
| 3,349,238 A | | 10/1967 | Kruger |
| 3,483,366 A | | 12/1969 | Wince |
| 4,703,405 A | | 10/1987 | Lewin |
| 4,725,934 A | | 2/1988 | Gordin |
| 4,906,070 A | | 3/1990 | Cobb, Jr. |
| 4,907,143 A | | 3/1990 | Lasker |
| 4,927,248 A | * | 5/1990 | Sakakibara ............. F21S 43/26 359/742 |
| 5,100,222 A | * | 3/1992 | Minoura ............... G03B 21/625 359/455 |
| 5,363,293 A | | 11/1994 | Lasker |
| 5,486,989 A | | 1/1996 | Compton |
| 5,613,769 A | | 3/1997 | Parkyn et al. |
| 5,730,521 A | | 3/1998 | Spink et al. |
| 5,746,502 A | | 5/1998 | Huang |
| 6,027,231 A | | 2/2000 | Fouke |
| 6,193,394 B1 | | 2/2001 | Herst et al. |
| 6,305,830 B1 | * | 10/2001 | Zwick ...................... F21S 43/26 362/520 |
| 6,354,725 B1 | | 3/2002 | Simon |
| 6,698,908 B2 | | 3/2004 | Sitzema, Jr. et al. |
| 7,156,540 B2 | | 1/2007 | Haines |
| 7,190,387 B2 | | 3/2007 | Rinehart et al. |
| 7,192,692 B2 | | 3/2007 | Wood et al. |
| 7,213,948 B2 | | 5/2007 | Hein |
| 7,364,341 B2 | * | 4/2008 | Parker ...................... F21V 5/00 359/599 |
| 7,460,301 B2 | * | 12/2008 | Imafuku ................ G03B 21/10 348/E5.137 |
| 7,631,980 B2 | | 12/2009 | Holten |
| 7,635,193 B2 | * | 12/2009 | Chang .................. G02B 6/0043 359/599 |
| 7,660,039 B2 | | 2/2010 | Santoro et al. |
| 7,777,832 B2 | | 8/2010 | Richard et al. |
| 7,837,361 B2 | | 11/2010 | Santoro et al. |
| 7,867,695 B2 | | 1/2011 | Freese et al. |
| 7,918,589 B2 | | 4/2011 | Mayfield et al. |
| 7,993,020 B2 | * | 8/2011 | Chang ...................... G02B 5/02 362/309 |
| 8,061,877 B2 | * | 11/2011 | Chang .................. G02B 5/0242 359/837 |
| 8,523,405 B2 | * | 9/2013 | Chang ...................... F21V 5/02 362/311.02 |
| 8,529,116 B2 | * | 9/2013 | Tsai ...................... G02B 6/0036 315/39 |
| 9,086,521 B2 | | 7/2015 | Rinehart et al. |
| 2004/0120152 A1 | | 6/2004 | Bolta et al. |
| 2005/0265029 A1 | * | 12/2005 | Epstein ................ G02B 3/0056 362/339 |
| 2006/0146566 A1 | | 7/2006 | Ko et al. |
| 2006/0172119 A1 | * | 8/2006 | Hayashi .................. B29C 33/42 428/156 |
| 2007/0091617 A1 | | 4/2007 | Couzin et al. |
| 2007/0171671 A1 | * | 7/2007 | Kurokawa ................ B32B 3/30 362/606 |
| 2008/0106793 A1 | | 5/2008 | Olczak |
| 2008/0130280 A1 | * | 6/2008 | Rodstein .................... F21V 5/02 362/246 |
| 2008/0192342 A1 | | 8/2008 | Wood |
| 2008/0198296 A1 | | 8/2008 | Chu et al. |
| 2008/0198469 A1 | | 8/2008 | Yuba et al. |
| 2008/0303977 A1 | | 12/2008 | Sekiguchi et al. |
| 2009/0122540 A1 | | 5/2009 | Chiang et al. |
| 2009/0141487 A1 | | 6/2009 | Gould et al. |
| 2009/0285543 A1 | | 11/2009 | Marttila et al. |
| 2010/0033818 A1 | * | 2/2010 | Petcavich ............... B08B 17/06 359/507 |
| 2010/0039808 A1 | | 2/2010 | Purchase et al. |
| 2010/0157609 A1 | * | 6/2010 | Wu ...................... G02B 5/0231 362/360 |
| 2011/0019404 A1 | * | 1/2011 | Chien .................... F21V 5/002 362/235 |
| 2011/0063723 A1 | | 3/2011 | Shyu et al. |
| 2011/0085241 A1 | | 4/2011 | Purchase et al. |
| 2012/0019936 A1 | | 1/2012 | Blessing et al. |
| 2012/0127755 A1 | | 5/2012 | Shiau et al. |
| 2013/0057137 A1 | | 3/2013 | Zijp |
| 2013/0070478 A1 | * | 3/2013 | Edamitsu ............. G02B 5/0231 362/608 |
| 2014/0043846 A1 | * | 2/2014 | Yang .................... G02B 6/0035 362/606 |
| 2014/0376220 A1 | * | 12/2014 | Shen ................... B29D 11/0074 362/235 |

FOREIGN PATENT DOCUMENTS

| | | |
|---|---|---|
| WO | WO 00/10835 A1 | 3/2000 |
| WO | WO 02/23258 A2 | 3/2002 |
| WO | WO 2005/083317 A1 | 9/2005 |
| WO | WO 2011/046864 A1 | 4/2011 |
| WO | WO 2012/141899 A1 | 10/2012 |

OTHER PUBLICATIONS

Extended European Search Report for EP 14871894.3 dated Jul. 13, 2017, 8 pages.

Waldmann Lighting, Technical Data for Ataro: Indirect Lighting Family, 36 pages, available as of filing date.

\* cited by examiner

SECTION A-A

SECTION B-B

○ HIGHEST-LEVEL
◉ LOWEST-LEVEL

2D DEGLARING DIFFUSERS INCREASING AXIAL LUMINOUS INTENSITY

CROSS-REFERENCE TO RELATED APPLICATIONS

This application is a 35 U.S.C. § 371 national stage application of PCT International Application No. PCT/US2014/070595, filed on 16 Dec. 2014, which claims priority from U.S. Provisional Patent Application Nos. 61/918, 498, filed 19 Dec. 2013, and 62/043,868, filed 29 Aug. 2014, the disclosures of which are hereby incorporated herein by reference in their entirety. The above-referenced PCT International Application was published in the English language as International Publication No. WO 2015/095189.

BACKGROUND

In many illumination systems, targeted areas to be illuminated are much larger than an emitting area of the light sources. Many artificial light sources emit light in an approximately Lambertian distribution. In many cases the Lambertian distribution emits light at high angles from 65 to 90 degrees relative to nadir. In office and other environments, it is often desirable to reduce or minimize light emitted in 65 to 90 degree angles, because of discomfort viewers may experience in directly viewing the lights from those angles, and/or because of reflections of light from those angles from displays, work surfaces, and other objects.

In some countries, specifications or recommendations regarding luminaires limit the amount of light in the 65 to 90 degree range. In the United States, ANSI/IESNA RP-1-04 recommends maximum limits for the luminous intensity emitted at angles above 65, 75, and 85 degrees (at any azimuthal angle). In Europe, EN-12464 places similar limits on luminance at high angles. In addition to specific standards, specifications, or recommendations, in some cases lighting designers will prefer luminaires with limited high-angle luminous intensity. In some cases, limited high-angle luminous intensity is desirable along one azimuthal plane (e.g. East-West) while not being required in the orthogonal plane (e.g. North-South). In many other cases limited high-angle luminous intensity is desirable in all azimuthal planes.

In many cases it is desirable to increase the axial luminous intensity of a light source, so as to most effectively light the space below the luminaire. In many of these cases, it is desirable to do so without artifacts at high angles such as a wink that might be caused by a 90-degree prism film.

A downward-facing light source with Lambertian light distribution has luminous intensity that is proportional to the cosine of the angle from nadir (the downward-facing direction). By definition, the Full Width at Half Maximum (FWHM) of a Lambertian distribution is 120 degrees. In the lighting industry, the term "Lambertian" is also frequently used to refer to light distributions with similar quality but of different widths. That is, distributions that have a peak at nadir, and monotonically decrease at higher angles are often called Lambertian. In one example, a Gaussian distribution with FWHM of 80 degrees will often be called "Lambertian" in the lighting industry. FIG. 1 shows a measurement of a wide, approximately Lambertian light source. High-angle luminous intensity is high, with luminous intensity at 65 degrees approximately 37.5% of the peak luminous intensity.

Herein, the term "high-angle luminous intensity" will refer to luminous intensity at polar angles between 65 and about 90 degrees relative to nadir.

Herein, the term "axial luminous intensity" will refer to luminous intensity at the polar angle of about 0 degrees. For most downward-facing lighting fixtures, the axial direction is straight down.

High-efficiency LED lighting is being increasingly adopted. Typical LED light sources emit light into a Lambertian distribution with a Full Width Half Max (FWHM) of approximately 120 degrees. Although LEDs with many other light distributions are available, many cost-effective LEDs sold for general lighting are of the 120 degree Lambertian variety. Many luminaires (LED and traditional) have flat outer surfaces (such as some downlights, task lights, and troffers). In many cases, light emitted by these fixtures has high-angle luminous intensity that is undesirably high. This is often true for luminaires employing other types of light sources in addition to LEDs, such as incandescent lamps, fluorescent lamps, organic light-emitting diodes (OLEDs), etc. In many of these fixtures, a simple flat diffuser (such as a microstructured, holographic, or volumetric diffuser) is used to diffuse the LEDs, hiding their appearance from viewers and smoothing the surface appearance of the luminaire. In the absence of other features such as baffles, louvers, focusing reflectors, focusing refractors, and bezels, these diffusers often give Lambertian distributions of various widths (most typically about 80 to 120 degrees). In such cases, the high-angle luminous intensity may be undesirably high.

A 90-degree linear prism optic has one smooth surface and the other one is textured by an array of parallel linear prisms with 45-degree sidewalls, as shown, for example, in U.S. Pat. Nos. 2,474,317 and 3,288,990, in which one or two layers of prism optics are used to increase brightness directly under a luminaire, and reduce high-angle luminous intensity. A film with the similar properties is described by Cobb in U.S. Pat. No. 4,906,070. Films such as described by Cobb, usually employing prisms with peak angle of substantially 90 degrees, are used extensively for brightness enhancement of the back light unit inside a display system. In both lighting and displays, a brightness-enhancing prism is used with the light entering smooth surface of the optic, and thus the prisms facing away from the light source. Rays incident perpendicular to the surface of the film will encounter total internal reflections (TIR) from the prisms. Those light rays are generally reflected back into the backlight, which is generally configured with high reflectivity to recirculate those rays back toward the prism film (sometimes repeatedly), until they enter the prism film at larger incident angle and are allowed to pass to the viewer of display. Rays incident at larger angles are at least in part refracted through the prisms, and on average over all angles, the average exit angles are smaller than the average entrance angles, when measured relative to the normal to the prism optic. The angle bending and recirculation process creates a narrower FWHM light distribution (approximately 70-95 degrees) than the incident Lambertian distribution (approximately 120 degrees), and axial brightness enhancement. Said another way, a prism illuminated by Lambertian light in this orientation and with appropriate recirculation will increase axial luminous intensity, while reducing the FWHM. At some polar angles between about 65 and about 90 degrees, luminous intensity is decreased, but most 90-degree prisms also produce a distinct bright band (sometimes called a "wink") at some polar angles above about 65 degrees at some azimuthal angles. This wink can produce high-angle luminous intensity that is unacceptably high. A measured 90-degree prism film illuminated by an approximately Lambertian source is shown in FIG. 2, in which the measured azimuthal plane was perpendicular to the major direction of the linear prisms, the "wink" being the peaks noticeable at approximately +/−70 degrees. This wink and the light paths within a prism optic that lead to the wink are described, for example, by Richard et al. in U.S. Pat. No. 7,777,832. Having no wink is defined herein by having a light distribution that substantially monotonically decreases as polar angles increase from the angle of peak luminous intensity. Richard et al. describe incorporating diffusion into a linear prism film to make the wink less noticeable in displays, using what is essentially a blurring process. This process may leave too much high-angle luminous intensity for use in lighting applications. Thus it may be desirable to simultaneously have substantially no wink and have low high-angle luminous intensity.

Cones are known in the art to be a surface structure that can reduce high-angle luminous intensity of a light source. Such use of cone shapes is mentioned in U.S. Pat. Nos. 2,474,317, 3,349,238, 3,159,352, 3,483,366, U.S. Patent Application Publication No. 2013/0057137, U.S. Patent Application Publication No. 2010/0128351 and German Patent Application No. DE102006009325A1. A cone-like hexagonal pyramid is mentioned in German Patent No. DE202010002744U1. In U.S. Pat. No. 7,631,980 and International Publication No. WO 2005/083317A1, a cone with inverted tip is pictured that resembles a prism bent into a single ring.

SUMMARY

Light transmissive structures according to various embodiments described herein include a light transmissive substrate having first and second opposing faces and array of microprism elements on the first face, with a respective microprism element comprising a plurality of concentric microprisms. The light transmissive structure is configured to receive light from a light source facing the second face and reduce high-angle luminous intensity of the light emerging from the first face.

In some embodiments, the light transmissive structure is configured to reduce luminous intensity of the light emerging from the first face at angles greater than about 65 degrees from a direction orthogonal to the light transmissive substrate to less than about 30% of the light emerging from the first face in the direction orthogonal to the light transmissive substrate. In various embodiments, the light transmissive structure may be configured to reduce luminous intensity of the light emerging from the first face at angles greater than about 65 degrees from the direction orthogonal to the light transmissive substrate to less than about 20% or less than about 15% of the light emerging from the first face in the direction orthogonal to the light transmissive substrate. The light transmissive structure may be configured to monotonically decrease luminous intensity of the light emerging from the first face at increasing angles from the direction orthogonal to the light transmissive substrate.

In some embodiments, the light transmissive structure is configured to substantially reduce luminous intensity of the light emerging from the first face at angles between about 65 degrees and about 85 degrees from a direction orthogonal to the light transmissive substrate relative a Lambertian light distribution. In some embodiments, the light transmissive structure is configured to substantially increase luminous intensity of the light emerging from the first face in a direction orthogonal to the light transmissive substrate relative to a Lambertian light distribution. The light transmissive structure may be configured to increase luminous intensity of the light emerging from the first face at angles up to at least about 30 degrees from the direction orthogonal to the light transmissive substrate relative to a Lambertian light distribution.

A respective microprism element may include a plurality of concentric circular microprisms. In various embodiments, a respective microprism element includes at least five concentric circular microprisms, at least 10 concentric circular microprisms and at least 20 concentric circular microprisms. In some embodiments, at least one generally triangular microprism is defined by at least some adjacent microprism elements. In some embodiments, a plurality of concentric generally triangular microprisms are defined by at least some adjacent microprism elements.

In some embodiments, the array of microprism elements extends over substantially the entire first face of the substrate.

In some embodiments, the second face is substantially smooth.

A respective microprism element may include a plurality of concentric elliptical microprisms. A respective microprism element may include a plurality of concentric rounded square microprisms. A respective microprism element may include an outermost rounded hexagonal microprism and an innermost generally circular microprism. A respective microprism element may include concentric microprisms of random or pseudorandom size and/or shape.

In some embodiments, a respective microprism is undetectable by the naked eye at a viewing distance of about three feet.

In some embodiments, a respective microprism element is hexagonal.

In some embodiments, the light transmissive structure is configured to produce a visible pattern to a viewer of the light transmissive structure at a viewing distance of about three feet, with the visible pattern corresponding to the array of microprism elements on the first face.

In some embodiments, the light transmissive structure is configured to receive light from an array of LEDs as the light source and produce a sparkly pattern to a viewer of the light transmissive substrate. The sparkly pattern may change in appearance as a viewing angle relative to a direction orthogonal to the light transmissive substrate changes.

In some embodiments, a respective microprism has a generally triangular cross section with sides defining a peak, the cross section taken in a plane perpendicular to the first face of the substrate. The peak may be generally parallel to the first face of the substrate. The peak may be a rounded peak. At least one side of the microprism may define a convex surface. The microprism may have an internal angle defined by the peak of between about 95 and 120 degrees or between about 100 and 110 degrees in various embodiments.

Substantially all of the microprism elements may include a plurality of concentric microprisms.

In some embodiments, adjacent microprism elements are in contact with one another. In some embodiments, the array of microprism elements includes gaps between at least some of the microprism elements, and the light transmissive structure further includes gap-filling microstructures in at least some of the gaps.

The light transmissive structure may include at least one diffusion feature including: surface roughness on at least some of the microprisms; a diffuser on the second face of the substrate; a light scattering agent in at least some of the microprisms and/or in the substrate; and/or a diffusive coating on at least some of the microprisms.

In some embodiments, the light source is a Lambertian light source. The light source may include one or more LEDs.

In some embodiments, the light transmissive structure is in combination with at least one light source and a housing that is configured to hold the at least one light source and the light transmissive substrate so that light from the light source impinges on the second face of the substrate and emerges from the first face of the substrate with reduced high-angle luminous intensity. The housing may define a light exit surface area where the substrate is held. In various embodiments, a respective microprism element has an area on the first face of the substrate that is at least one order of magnitude, at least two orders of magnitude, and/or at least four orders of magnitude smaller than the light exit surface area. In some embodiments, the array of microprism elements on the first face of the substrate extends over substantially the entire light exit surface area. In some embodiments, the light source is an array of LEDs with a spacing between adjacent LEDs, and a respective microprism element has a size that generally corresponds to the spacing between adjacent LEDs.

In some embodiments, the light transmissive structure is in combination with at least one light source wherein the light transmissive substrate is suspended under the light source so that light from the light source impinges on the second face of the substrate and emerges from the first face of the substrate with reduced high-angle luminous intensity.

Light transmissive structures may be fabricated according to various embodiments described herein by imaging onto a photoimageable material an image of a plurality of microprisms having a geometric feature that is configured to reduce high-angle luminous intensity of light transmitted through the microprisms. The photoimageable material is then used to replicate an image of a plurality of microprisms in and/or on a substrate, the plurality of microprisms also having a geometric feature that is configured to reduce high-angle luminous intensity of light transmitted through the microprisms. The imaging may be performed by scanning a laser across the photoimageable material, the laser defining the image of a plurality of microprisms having the geometric feature that is configured to reduce high-angle luminous intensity of light transmitted through the microprisms.

Light transmissive structures according to various embodiments described herein include a light transmissive substrate having first and second opposing faces. A plurality of microprisms are on the first face, with the microprisms having a generally triangular cross section in a plane that is perpendicular to the first face, and the microprisms are distributed on the first face of the substrate in a plurality of different prism orientation angles measured from an edge of the substrate. The light transmissive structure is configured to receive light from a light source facing the second face and reduce high-angle luminous intensity of the light emerging from the first face. The light transmissive structure is also configured to increase luminous intensity of the light emerging from the first face in a direction orthogonal to the light transmissive substrate relative to a Lambertian light distribution.

In some embodiments, the plurality of microprisms and/or interspersed microstructures substantially cover the first face of the substrate.

Light transmissive structures according to various embodiments described herein include a light transmissive substrate having first and second opposing faces. An array of microprism elements are on the first face, with a respective microprism element including a plurality of concentric microprism patterns, and with a respective microprism pattern including a plurality of pyramids arranged in a generally elliptical configuration. The light transmissive structure is configured to receive light from a light source facing the second face and reduce high-angle luminous intensity of the light emerging from the first face.

In some embodiments, a respective pyramid includes a face that faces away from a center of the plurality of concentric microprism patterns. In some embodiments, a respective pyramid includes at least one face that defines a convex surface.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

DETAILED DESCRIPTION

Measurement

Figure 3:
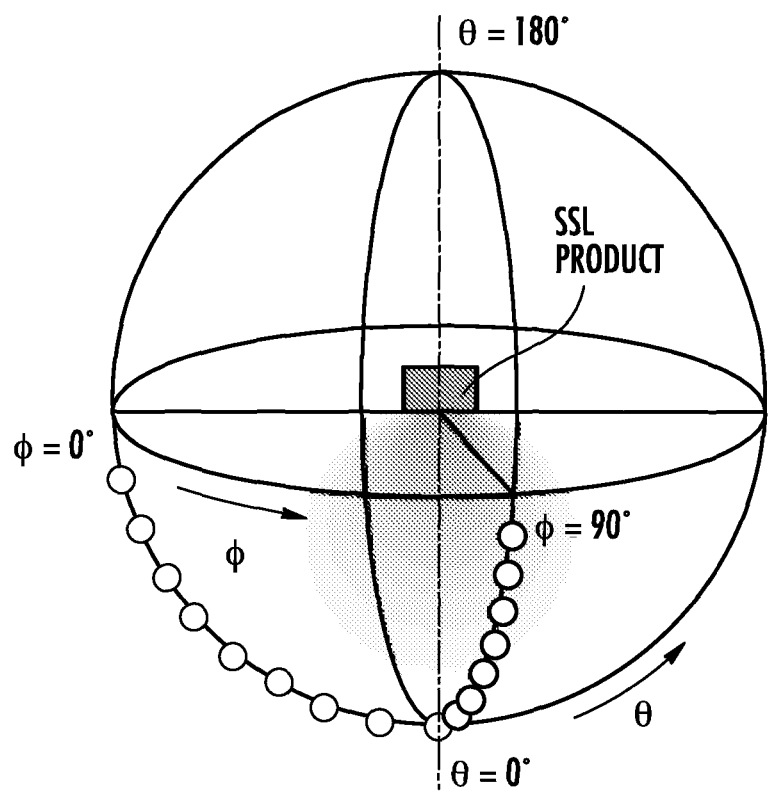
FIG. 3 is a chart illustrating the measurement of light distributions in a spherical coordinate system.

Light distributions are typically measured using goniometric apparatus similar to that described in the IES LM-79 standard, as illustrated in FIG. 3. In the figure, a luminaire or illuminated optical device is depicted (labeled SSL product) emitting light in a downward dimension. The two circles with dots on their perimeters represent planes at two different azimuthal angles φ (phi). In each of these planes, the polar angle θ (theta, ranging from −180 to 180 degrees)

is defined as indicated. Example measurement points in the phi=0 degree and phi=90 degree planes are depicted as dots. At each of these points, luminous intensity is measured as a function of the theta angle from the principle axis of the light source. This luminous intensity is measured by an optical detector; the optical detector and/or light source may be moved relative to each other so that the optical detector measures light at the desired angles. In practice a light source can be measured at any group of phi and theta points desired. Many lights emit generally in one hemisphere, and thus theta will often be measured from −90 to 90 degrees.

Potential Advantages

Various embodiments described herein relate to light sources, particularly luminaires, for providing special lighting patterns. These embodiments have particular, but not exclusive, usefulness in providing favorable light distributions with reduced luminous intensity at high angles.

A two-dimensional (2D) deglaring diffuser as defined herein is an optic (e.g., a prism optic) that reduces high-angle luminous intensity of a wide light source (e.g., a Lambertian light source) in substantially all azimuthal directions.

Various embodiments described herein provide a 2D deglaring diffuser that can reduce high-angle luminous intensity of a light source in substantially all radial directions.

Various embodiments described herein provide a luminaire that can provide reduced high-angle luminous intensity employing a 2D deglaring diffuser.

Various embodiments described herein provide an illumination system that can provide reduced high-angle luminous intensity employing a 2D deglaring diffuser.

Various embodiments described herein describe a method for using a 2D deglaring diffuser that can decrease the luminous intensity emitted by a light source at high angles.

Various embodiments described herein describe a backlight for display or signage employing a 2D deglaring diffuser that can provide reduced high-angle intensity.

Various embodiments described herein provide a 2D deglaring diffuser that can increase axial luminous intensity of a light source and/or can have no wink.

Various embodiments described herein provide a luminaire that can provide increased axial luminous intensity employing a 2D deglaring diffuser and/or can have no wink.

Various embodiments described herein provide an illumination system that can provide increased axial luminous intensity and/or no wink employing a 2D deglaring diffuser.

Various embodiments described herein describe a method for using a 2D deglaring diffuser that can increase axial luminous intensity to increase the luminous intensity emitted by a light source along its principal axis and/or provides a light distribution with no wink.

Various embodiments described herein can provide a 2D deglaring diffuser that obscures or helps obscure light sources, including but not limited to LEDs and fluorescent lamps.

Various embodiments described herein can provide a 2D deglaring diffuser that has a visible surface pattern that may be aesthetically pleasing to a viewer. Further, various embodiments described herein can provide a 2D deglaring diffuser that has a visible surface pattern can visually obscure light sources such as LEDs or distracts the eye to reduce their visibility.

Various embodiments described herein describe a 2D deglaring diffuser with visible surface patterns that can produce a sparkly appearance when illuminated by an array of LEDs.

Various embodiments described herein describe a 2D deglaring diffuser with visible surface patterns that can produce a sparkly appearance or pattern when illuminated by an array of LEDs, said sparkly pattern appearing to change when viewed from different viewing angles.

Various embodiments described herein describe a method for using a 2D deglaring diffuser that can decrease high-angle luminous intensity and/or increase axial luminous intensity in conjunction with a traditional diffuser to provide a substantially uniformly bright surface.

Various embodiments described herein describe a method for using a 2D deglaring diffuser that can decrease high-angle luminous intensity and/or increase axial luminous intensity in conjunction with a traditional diffuser to provide a substantially uniformly bright surface with surface patterns visible from at least one viewing angle.

Various embodiments described herein can provide a 2D deglaring diffuser for a luminaire that does not require specific alignment relative to the luminaire's light sources.

Various embodiments described herein can provide a 2D deglaring diffuser that is shift-invariant, and thus can be manufactured in large areas such that a diffuser suitable for a given luminaire can be cut from an arbitrary location of the large area without the need to align the cut to specific optical features (such as a central point) of the optical structure.

Various embodiments described herein can provide 2D deglaring diffuser with high optical efficiency, having substantially no light-absorbing materials.

Various embodiments described herein can provide a 2D deglaring diffuser that increases the luminance uniformity on the surface of a luminaire.

Various embodiments described herein can provide a 2D deglaring diffuser than can be efficiently and inexpensively mass-produced in areas large enough to be suitable for use in general lighting.

Various embodiments described herein can provide a substantially flat or slightly curved 2D deglaring diffuser that reduces high-angle luminous intensity.

General Description

Various embodiments described herein can provide a 2D deglaring diffuser comprising a substrate having a first and second surface, the first surface being substantially smooth or flat, and the second surface having pattern elements comprising a plurality of substantially parallel prismatic microstructures, or prisms, said prisms following substantially curvilinear paths along the surface of the substrate and having multiple prism orientation angles over the area of the substrate, configured to reduce high-angle luminous intensity relative to a wide lambertian light distribution for light emitted from the second surface when the first surface is illuminated by a wide lambertian light distribution. They may also be configured to provide substantially no wink and/or increase axial luminous intensity relative to a wide Lambertian light distribution when similarly illuminated.

The prisms have a cross-sectional shape that is substantially isosceles triangular or modified triangular and may include features such as a rounded tip and/or valley, a tip resembling a pointed arch tip or Gothic arch and/or ogive, side curvature, surface roughness and/or variation in prism pitch, height, and/or angle. In many embodiments, some or most of the prisms form closed concentric shapes. In many embodiments, these shapes form pattern element(s) that are repeated or tiled across the substrate.

In many embodiments, the triangle approximating the cross-sectional shape of the prisms has an internal angle of between 95 and 120 degrees, and in some embodiments between 100 and 120 degrees, and in other embodiments between 100 and 110 degrees. In some embodiments, the cross-sectional shape is in the form of an approximate isosceles triangle with convex slightly curved sides. In some embodiments, the cross-sectional shape additionally has a rounded peak.

Various embodiments described herein are based on the surprising insight that in practice, prisms on substantially parallel curvilinear paths representing substantially all orientation angles may provide equivalent or better reduction of high-angle luminous intensity than collections of straight linear prisms tiled in zones with a limited number (such 1, 2, 3 or 4) of prism orientation angles. The use of curvilinear paths may provide advantages including increased obscuration of light sources, decreased artifacts at specific azimuthal angles that may be characteristic of prism arrays having a limited number of prism orientation angles, and/or desirable aesthetic appearance.

Various embodiments described herein are also based on the surprising insight that in practice, prisms on substantially parallel curvilinear paths with two or more substantially parallel neighboring elements may provide better reduction of high-angle luminous intensity than arrays of cones or arrays of cones with inverted tips.

Various embodiments described herein are also based on the surprising experimental outcome that prism paths including increased numbers of concentric circles (and thus larger pattern elements) have increased suppression of high-angle luminous intensity. In addition, pattern elements with characteristic sizes large enough to produce visible patterns can produce an unexpectedly pleasing visual appearance, adding aesthetic appeal to a luminaire in which it is used. An additional unexpected benefit of characteristic sizes large enough to produce visible patterns is that in laboratory observations, they were found to confuse the eye, giving the illusion of better hiding or scrambling of images of light sources.

In many embodiments disclosed herein, the 2D deglaring diffuser does not require alignment to the light source, and can be manufactured in large areas, with parts cut to size in substantially any layout.

DETAILED DESCRIPTION OF EMBODIMENTS

Figure 4:
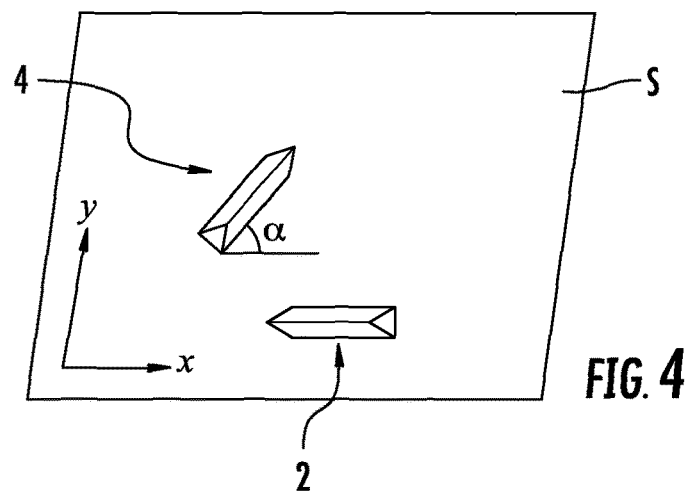
FIG. 4 is a perspective view of a substrate having prisms oriented thereon in different prism orientation angles.

Prism-like structures can be arranged on a substrate S as illustrated in FIG. 4. The prisms are created on the surface of a substrate that defines the x-y axis, and thus the line defined by their peak is always substantially parallel to the x-y plane as defined in the figure. We choose to define the orientation of a prism to be in the x-y plane and parallel to the line making the crest of the prism. The prism orientation angle is the angle measured in the plane from the x axis, counter-clockwise to the prism axis. The prism labeled 2 has a prism orientation angle of roughly 0 degrees from the x-axis, while the prism labeled 4 has a prism orientation angle of roughly 45 degrees from the x-axis. For a symmetrical prism, a prism orientation angle of 180 degrees is indistinguishable from a prism orientation angle of 0 degrees.

Figure 5:
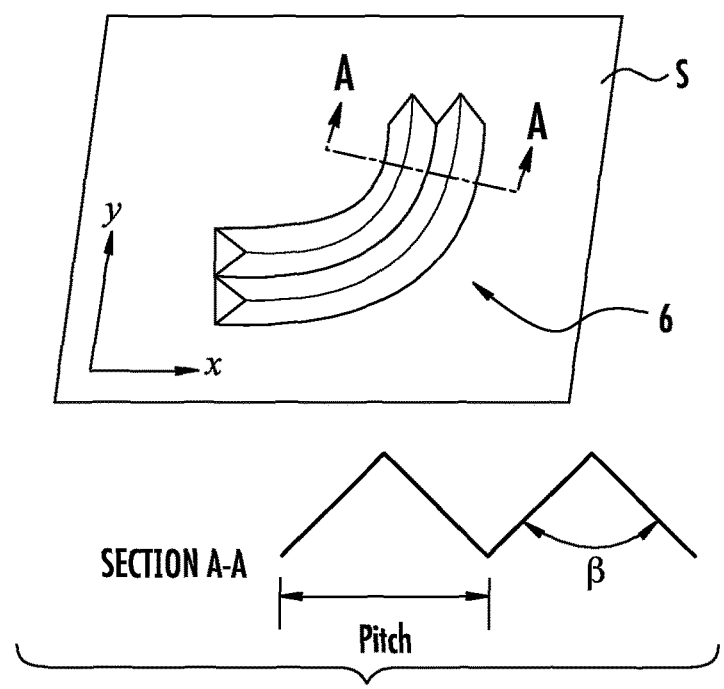
FIG. 5 includes a perspective view of a substrate having curved prisms oriented thereon and a cross-sectional view of the prisms.

In FIG. 5, a prism 6 on a curved path is presented. The peak of the prism forms a curved line or path that, once again, is substantially parallel to the plane of the substrate (the x-y plane). This prism does not have one orientation angle, but has a continuum of orientation angles ranging from 0 to 90 degrees. This curved prism can be approximated as the combination of several shorter, substantially straight sub-prisms, each at its own prism orientation angle. Similarly, a curved prism that made a complete circle would represent all prism orientation angles in equal measure. Section A-A shows a cross section upon which two features are defined, (a) the prism pitch being the distance between the valleys on either side of a prism peak, and (b) the prism internal angle β, being the full angle subtended by the prism peak.

Figure 6:
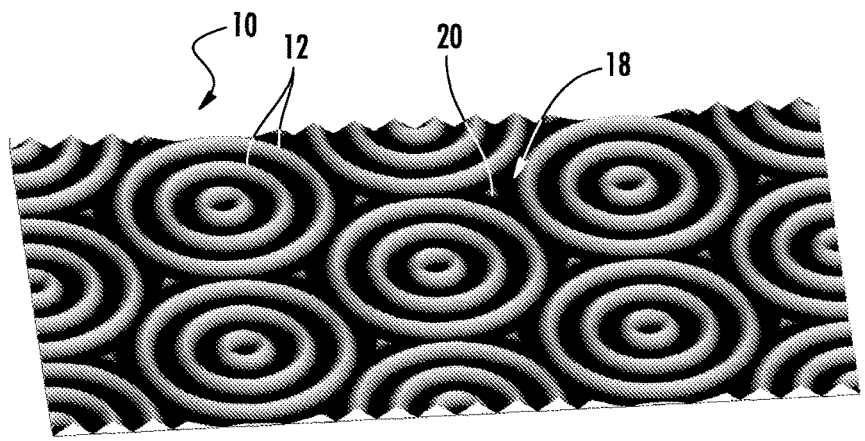
FIG. 6 is an enlarged fragmentary perspective view of a light transmissive structure including an array of microprism elements according to some embodiments described herein.

In some embodiments, a 2D deglaring diffuser includes prisms arranged in pattern elements 10 having a plurality of concentric circles 12, as shown in FIG. 6, said circles of concentric and substantially parallel prisms arrayed upon the substrate in a desired pattern, such as close-packed hexagons. The choice of array patterns is unlimited, but may for example include hexagons, triangles, squares, irregular shapes, and random shapes. Gaps 18 may be present between at least some of the elements 10 and gap-filling microstructures 20 may be in at least some of the gaps 18.

Although a variety of shapes are disclosed here for paths of prisms, concentric circles may have a unique advantage in some circumstances in which traditional subtractive machining techniques are used to create the 2D deglaring diffuser or tooling used in the manufacture of 2D deglaring diffusers, because they can be readily created using techniques such as micromachining, diamond turning, and fly cutting. Also in the case of micromachining, prisms with a simple straight-walled triangular cross-sectional shape may be desirable due to the lower cost of manufacturing tooling, compared to prisms with curved walls and/or curved tips or valleys.

It is understood in FIG. 6 and all figures herein representing prism arrays that the figures depict one section of the prism array with a finite number of tile elements, and that 2D deglaring diffuser may comprise a larger (or smaller) array of prisms than the extent of the array presented in the figures.

Figure 7:
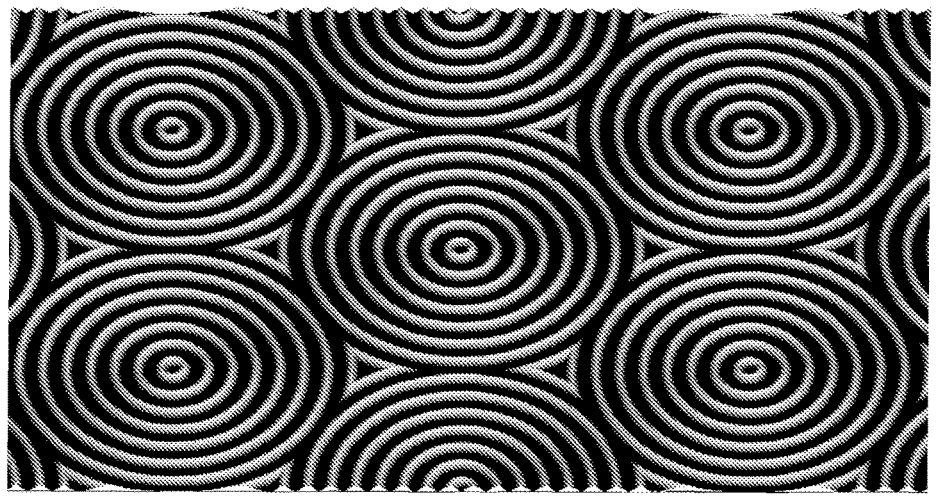
FIG. 7 is an enlarged fragmentary perspective view of a light transmissive structure including an array of microprism elements according to some embodiments described herein.
Figure 8:
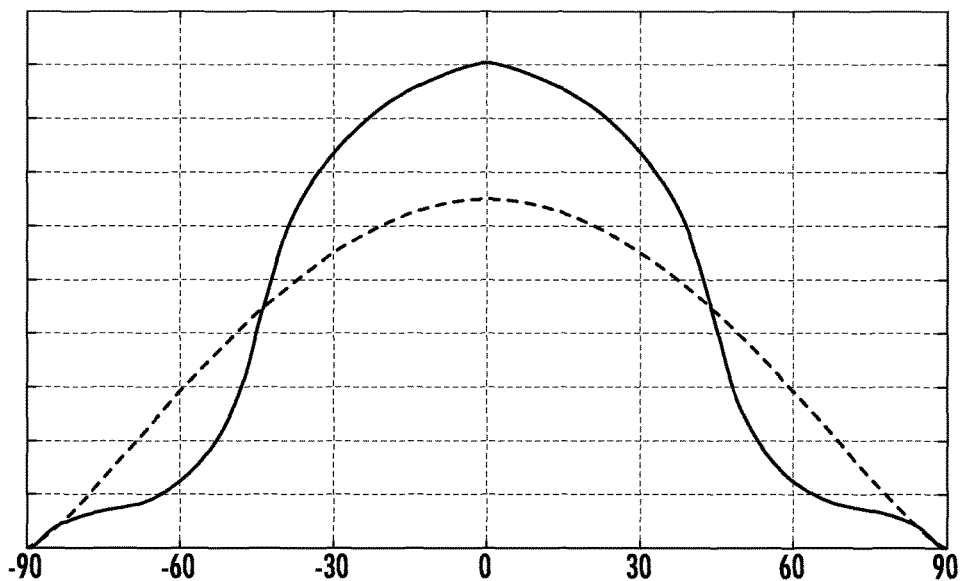
FIG. 8 is a chart illustrating the light distribution of a Lambertian light source having a FWHM of 120 degrees after passing through the light transmissive structure of FIG. 7 with the microprism elements facing away from light source.

In one particular example of the embodiment above, the 2D deglaring diffuser shown in FIG. 7 comprises prisms with 60 micron pitch repeated in a hexagonal array with hexagon size 840 μm to fill the surface of the diffuser. The size of a hexagon as defined herein is measured between the centers of two opposite sides of the hexagon. The prisms are formed of a transparent polymer on a transparent polymer substrate of thickness 175 microns. The prism internal angle is about 105 degrees. When illuminated with an approximately 120 degree Lambertian light incident upon the first smooth surface, this 2D deglaring diffuser reduces high-angle luminous intensity in all azimuthal directions, as depicted in the solid curve in FIG. 8. The dashed curve shows a Lambertian distribution for reference. In this example, the 2D deglaring diffuser reduces luminous intensity in the range of approximately 40-80 degrees on each side, and has low luminous intensity in the range of approximately 65-90 degrees. The peak high-angle luminous intensity (at 65 degrees) is about 9.2% of the axial luminous intensity. The 2D deglaring diffuser also increases luminous intensity in the range of approximately 0-40 degrees on each side, including axial luminous intensity, and has no wink.

Figure 9:
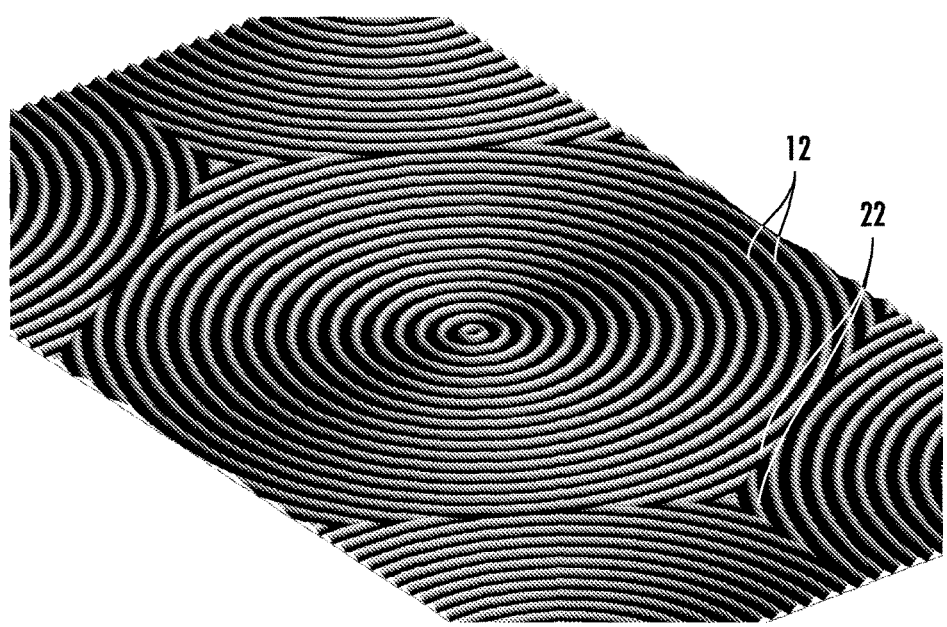
FIG. 9 is an enlarged fragmentary perspective view of a light transmissive structure including an array of microprism elements according to some embodiments described herein.

In another embodiment, the prisms have 84.8 micron pitch, are arranged in concentric circular paths, and are repeated in a hexagonal array with dimension 2.9 mm to fill the surface of the diffuser as shown in FIG. 9. The prism internal angle is about 105 degrees, and the refractive index is 1.49. The prisms are formed of a transparent polymer on a transparent polymer substrate of thickness 175 microns. The prisms' cross-sections are approximately isosceles triangular with a slightly rounded tip and slightly convex sides. When illuminated with an approximately 120 degree Lambertian light source impinging upon the substantially smooth side, this 2D deglaring diffuser reduces high-angle luminous intensity in all azimuthal directions, increases axial luminous intensity, and has no wink. The peak high-angle luminous intensity (at 65 degrees) is about 8.6% of the axial luminous intensity. An unexpected benefit is that the hexagons are visible to the naked eye, and the array of hexagonal elements produces a pleasing surface pattern that adds artistic and visual appeal, while individual prisms are undetectable or substantially undetectable by the naked eye at typical viewing distances of three feet or more or at typical viewing distances of one meter or more. In this and some other embodiments in which single LEDs or arrays of multiple LEDs (or similar small light source) directly illuminate the 2D deglaring diffuser, there is an unexpected benefit is that when an LED light source is viewed through this 2D deglaring diffuser, it is perceived in a sparkly shape that is roughly circular, centered around the location of the LED, and may be aesthetically pleasing. The sparkly shape changes in appearance (e.g., becomes brighter or darker and/or changes in shape and/or size) as the viewing angle changes and may lead to an illusion of depth that may be aesthetically pleasing.

In the embodiment of FIG. 9 and other embodiments, the prism paths may make multiple shapes due to the nature of the tiling or tessellation of elements. This can be seen in FIG. 9 as a first type of shape consisting of concentric circles 12 and occupying the majority of the surface area, and additional shapes in the form of concave-sided triangles 22, occupying a minority of the surface area. In some cases such shapes may have sharp corners where neighboring elements meet, but they may not be significantly detrimental to the performance of the 2D deglaring diffuser.

Figure 21:
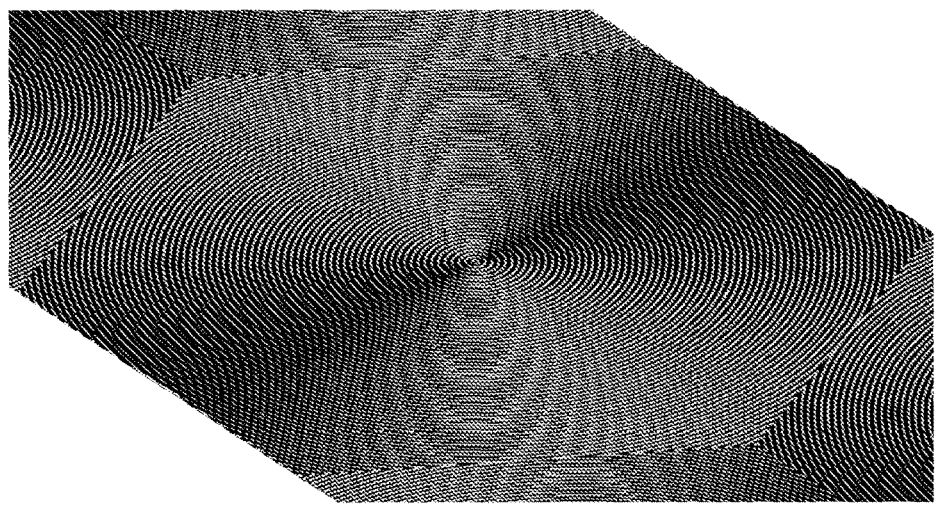
FIG. 21 is an enlarged fragmentary perspective view of a light transmissive structure including an array of microprism elements according to some embodiments described herein.

In another embodiment, the prisms have 84.8 micron pitch, are arranged in concentric circular paths, and are repeated in a hexagonal array with dimension 10.09 mm to fill the surface of the diffuser, as depicted in FIG. 21. The prism internal angle is about 105 degrees, and the refractive index is 1.49. The prisms' are formed of a transparent polymer on a transparent polymer substrate of thickness 175 microns. The prisms cross-sections are approximately isosceles triangular with a slightly rounded tip and slightly convex sides. When illuminated with an approximately 120 degree Lambertian light source impinging upon the substantially smooth side, this 2D deglaring diffuser reduces high-angle luminous intensity in all azimuthal directions, increases axial luminous intensity, and has no wink. The peak high-angle luminous intensity (at 65 degrees) is about 7.5% of the axial luminous intensity. An unexpected benefit is that the hexagons are visible to the naked eye, and the array of hexagonal elements produces a pleasing surface pattern that adds artistic and visual appeal, while individual prisms are undetectable or substantially undetectable by the naked eye at typical viewing distances of three feet or more or at typical viewing distances of one meter or more. In this and some other embodiments in which single LEDs or arrays of multiple LEDs (or similar small light source) directly illuminate the 2D deglaring diffuser, there is an unexpected benefit is that when an LED light source is viewed through this 2D deglaring diffuser, it is perceived in a sparkly shape that is roughly circular, centered around the location of the LED, and may be aesthetically pleasing. The sparkly shape changes in appearance (e.g., different areas become brighter or darker and/or change in shape and/or size) as the viewing angle changes and may lead to an illusion of depth that may be aesthetically pleasing.

Figure 37:
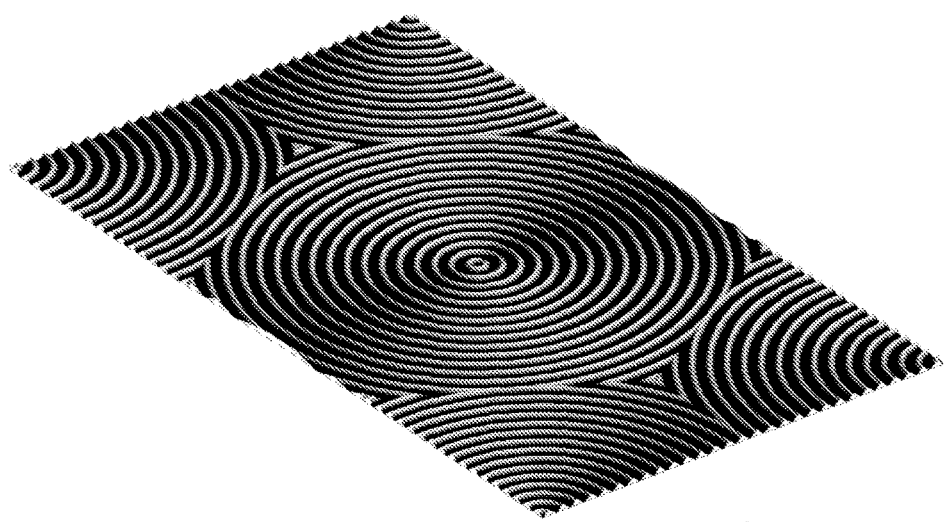
FIG. 37 is an enlarged fragmentary perspective view of a light transmissive structure including an array of microprism elements according to some embodiments described herein.
Figure 38:
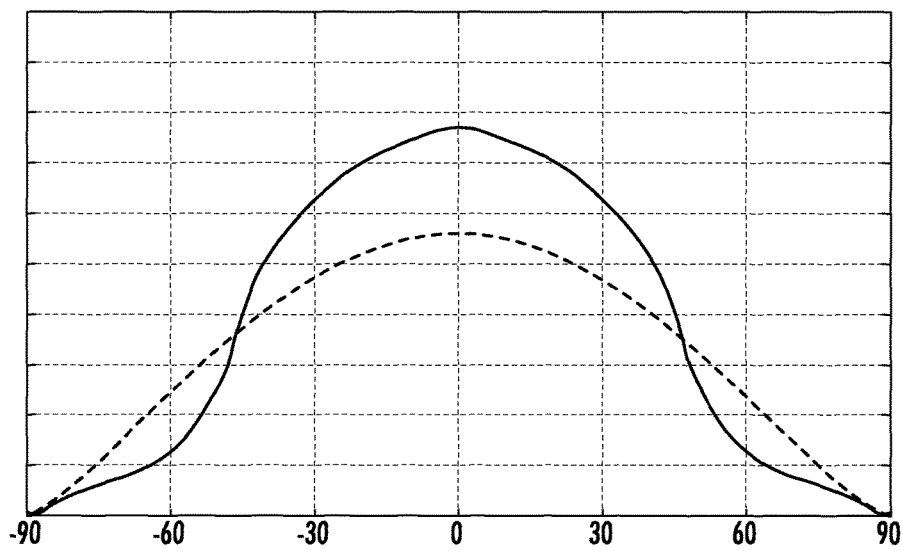
FIG. 38 is a chart illustrating the light distribution of a Lambertian light source having a FWHM of 120 degrees after passing through the light transmissive structure of FIG. 37 with the microprism elements facing away from light source.

In another embodiment, the prisms have 84 micron pitch, are arranged in concentric circular paths, and are repeated in a hexagonal array with dimension about 2.4 mm to fill the surface of the diffuser as shown in FIG. 37. The prism internal angle is about 102.5 degrees, and the refractive index is about 1.49. The prisms are formed of a transparent polymer on a transparent polymer substrate of thickness about 175 microns. There are about 14 rings of prisms in each pattern element. The prisms' cross-sections are approximately isosceles triangular with a slightly rounded tip. When illuminated with an approximately 120 degree Lambertian light source with distribution shown by the dashed line in FIG. 38, impinging upon the substantially smooth side, this 2D deglaring diffuser reduces high-angle luminous intensity in all azimuthal directions, increases axial luminous intensity, and has no wink, with distribution shown in the solid line of FIG. 38. The peak high-angle luminous intensity at 65 degrees is about 12.8% of the axial luminous intensity, while the source Lambertian distribution has peak luminous intensity about 35% of the axial luminous intensity. The peak high-angle luminous intensity at 75 degrees is about 7.6% of the axial luminous intensity, while the source Lambertian distribution has peak luminous intensity about 18% of the axial luminous intensity. The peak high-angle luminous intensity at 85 degrees is about 2.1% of the axial luminous intensity, while the source Lambertian distribution has peak luminous intensity about 3.6% of the axial luminous intensity. An unexpected benefit is that the hexagonal pattern elements are detectable by or visible to the naked eye, and the array of hexagons produces a pleasing surface pattern that adds artistic and visual appeal, while individual prisms are undetectable by the naked eye at typical viewing distances of three feet or more or at typical viewing distances of one meter or more. In this and some other embodiments in which single LEDs or arrays of multiple LEDs (or similar small light source) directly illuminate the 2D deglaring diffuser, there is an unexpected benefit is that when an LED light source is viewed through this 2D deglaring diffuser, it is perceived in a sparkly shape that is roughly circular, centered around the location of the LED, and may be aesthetically pleasing. The sparkly shape changes in appearance (e.g., becomes brighter or darker and/or changes in shape and/or size) as the viewing angle changes and may lead to an illusion of depth that may be aesthetically pleasing.

Figure 39:
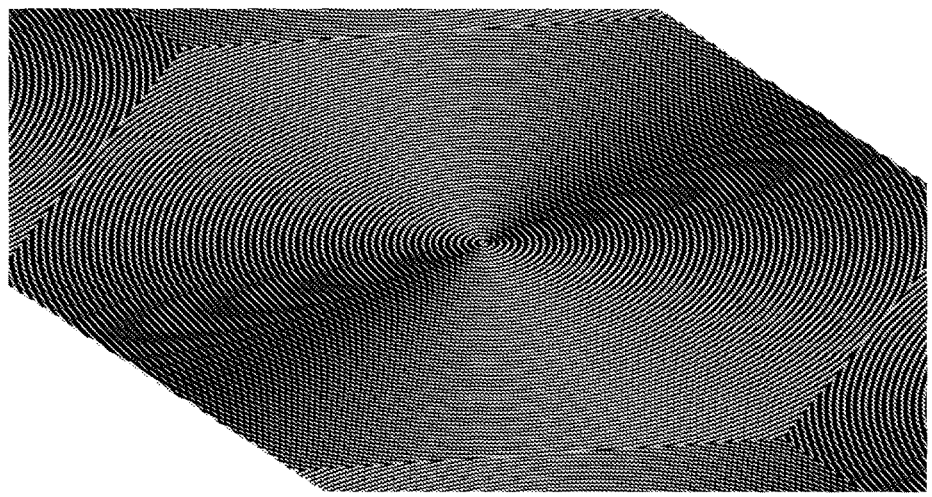
FIG. 39 is an enlarged fragmentary perspective view of a light transmissive structure including an array of microprism elements according to some embodiments described herein.
Figure 40:
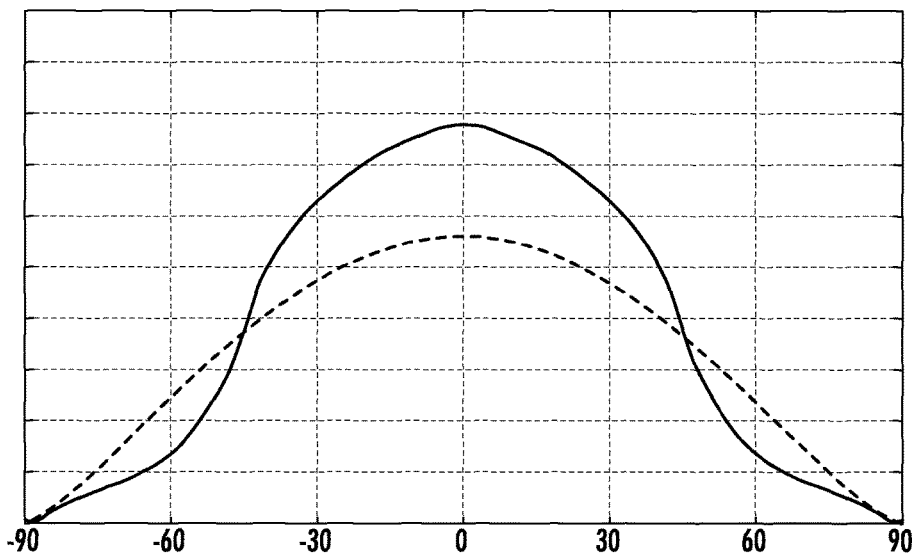
FIG. 40 is a chart illustrating the light distribution of a Lambertian light source having a FWHM of 120 degrees after passing through the light transmissive structure of FIG. 39 with the microprism elements facing away from light source.

In another embodiment, the prisms have 84.8 micron pitch, are arranged in concentric circular paths, and are repeated in a hexagonal array with dimension about 10.1 mm to fill the surface of the diffuser as partly shown in FIG. 39. The prism internal angle is about 105 degrees, and the refractive index is about 1.49. The prisms are formed of a transparent polymer on a transparent polymer substrate of thickness about 175 microns. There are about 59 rings of prisms in each pattern element. The prisms' cross-sections are approximately isosceles triangular with a slightly rounded tip. When illuminated with an approximately 120 degree Lambertian light source with distribution shown by the dashed line in FIG. 40, impinging upon the substantially smooth side, this 2D deglaring diffuser reduces high-angle luminous intensity in all azimuthal directions, increases axial luminous intensity, and has no wink, with distribution shown in the solid line of FIG. 40. The peak high-angle luminous intensity at 65 degrees is about 12% of the axial luminous intensity, while the source Lambertian distribution has peak luminous intensity about 35% of the axial luminous intensity. The peak high-angle luminous intensity at 75 degrees is about 7.6% of the axial luminous intensity, while the source Lambertian distribution has peak luminous intensity about 18% of the axial luminous intensity.

The peak high-angle luminous intensity at 85 degrees is about 2.0% of the axial luminous intensity, while the source Lambertian distribution has peak luminous intensity about 3.6% of the axial luminous intensity. An unexpected benefit is that the hexagonal pattern elements are detectable by or visible to the naked eye, and the array of hexagons produces a pleasing surface pattern that adds artistic and visual appeal, while individual prisms are undetectable by the naked eye at typical viewing distances of three feet or more or at typical viewing distances of one meter or more. In this and some other embodiments in which single LEDs or arrays of multiple LEDs (or similar small light source) directly illuminate the 2D deglaring diffuser, there is an unexpected benefit is that when an LED light source is viewed through this 2D deglaring diffuser, it is perceived in a sparkly shape that is roughly circular, centered around the location of the LED, and may be aesthetically pleasing. The sparkly shape changes in appearance (e.g., becomes brighter or darker and/or changes in shape and/or size) as the viewing angle changes and may lead to an illusion of depth that may be aesthetically pleasing.

In another example embodiment, LEDs are used to illuminate the 2D deglaring diffuser of the embodiments described herein and a conventional diffuser (such as a micro structured or volumetric diffuser) with sufficient strength to produce a wide light distribution and uniform brightness across the exit surface of the diffuser is disposed between the LEDs and the 2D deglaring diffuser. The 2D deglaring diffuser reduces high-angle luminous intensity, increases axial luminous intensity, and has no wink when compared to the LEDs and conventional diffuser without the 2D deglaring diffuser. An unexpected benefit is that at many viewing angles away from nadir, a hexagonal pattern is visible that may be aesthetically pleasing.

The geometric arrangement of prisms and the prisms' shape and internal angles can be changed in a multitude of ways to customize the light distribution created by a light source.

Figure 10A:
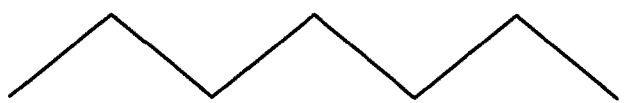
FIGS. 10A-10F are cross-sectional views of prisms according to various embodiments described herein.
Figure 10B:
Figure 10C:
Figure 10D:
Figure 10E:
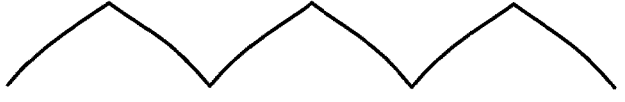
Figure 10F:

FIGS. 10A-10F show cross-sectional views of prisms, and examples of the limitless ways in which a prism can be modified in cross-sectional shape. It is understood that these drawing represent prisms composed of a transparent material, and that relative to the drawings, the substrate understood to be below the prisms. FIG. 10A depicts an isoceles-triangular prism. FIG. 10B depicts a prism with rounded valleys, that is, the part of the prisms that is closest to the substrate. FIG. 10C depicts prisms with rounded peaks, that is, the part of the prisms that extends farthest away from to the substrate. FIG. 10D depicts prisms with sides that are concave when viewed from above. FIG. 10E depicts prisms with sides that are convex when viewed from above. Combinations of these and other modifications are possible. For example, FIG. 10F depicts prisms that have rounded peaks and convex sides. According to laboratory experiments by the Applicant, prisms with rounded peaks and convex sides such as depicted in FIG. 10F may provide improved effectiveness in reducing high-angle luminous intensity compared to the other modifications depicted in FIG. 10, and may be desirable. In practice, slight rounding of prism peaks and valleys may be unavoidable in many manufacturing processes.

Figure 11:
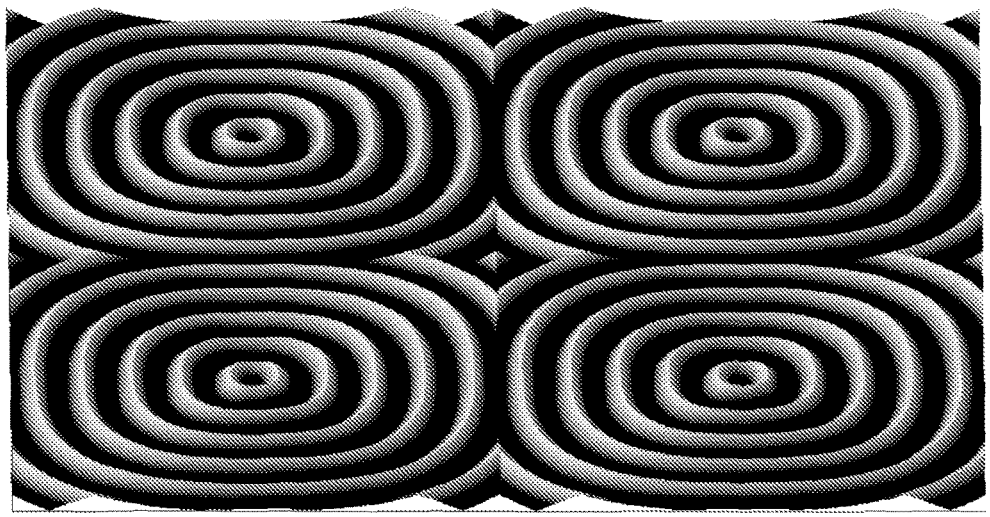
FIG. 11 is an enlarged fragmentary perspective view of a light transmissive structure including an array of microprism elements according to some embodiments described herein.

In the embodiment of FIG. 11, the prism paths take the shape of a squared-off circle (examples include but are not limited to the geometric shapes known as Gielis curve, squircle and/or superellipse), arrayed concentrically substantially parallel to one another, repeated in square pattern elements. When illuminated with a wide light source, this 2D deglaring diffuser reduces high-angle luminous intensity in all azimuthal directions. It has the additional benefit of producing a square surface pattern that may be aesthetically pleasing, while individual prisms are undetectable or substantially undetectable by the naked eye at typical viewing distances of three feet or more or at typical viewing distances of one meter or more.

Figure 12:
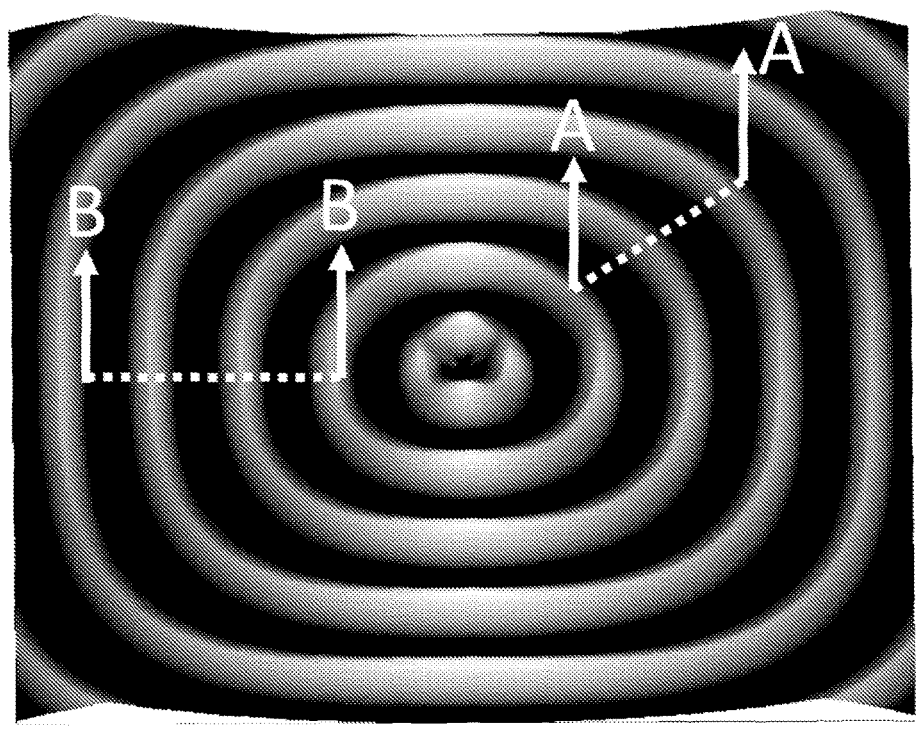
FIG. 12 includes an enlarged fragmentary perspective view of one of the microprism elements of FIG. 11 modified to have microprisms having a prism internal angle that varies as a function of prism orientation angle and cross-sectional views of the prisms.
Figure 12:
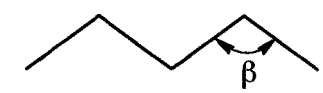
Figure 12:

In the embodiment of FIG. 12, the prisms of FIG. 11 have been further modified. In addition to the same rounded-square paths of the embodiment of FIG. 11, the prisms internal angle is varied slightly from 100 to 120 degrees as a function of the prism orientation angle. As indicated in the figure, the prisms that are oriented near 45 degrees (indicated by Section A-A) and 135 degrees have a larger internal angle β than the prisms oriented near 90 degrees and 180 degrees (indicated by Section B-B). The variation in internal creates a variation in the perceived image of an LED. In embodiments in which single LEDs or arrays of multiple LEDs directly illuminate the 2D deglaring diffuser, there is an unexpected benefit is that when an LED light source is viewed through this 2D deglaring diffuser, it is perceived in a sparkly shape that is roughly a squared-off circle, centered around the location of the LED, and may be aesthetically pleasing. The sparkly shape changes in appearance (e.g., becomes brighter or darker and/or changes in shape and/or size) as the viewing angle changes and may lead to an illusion of depth that may be aesthetically pleasing.

Figure 13:
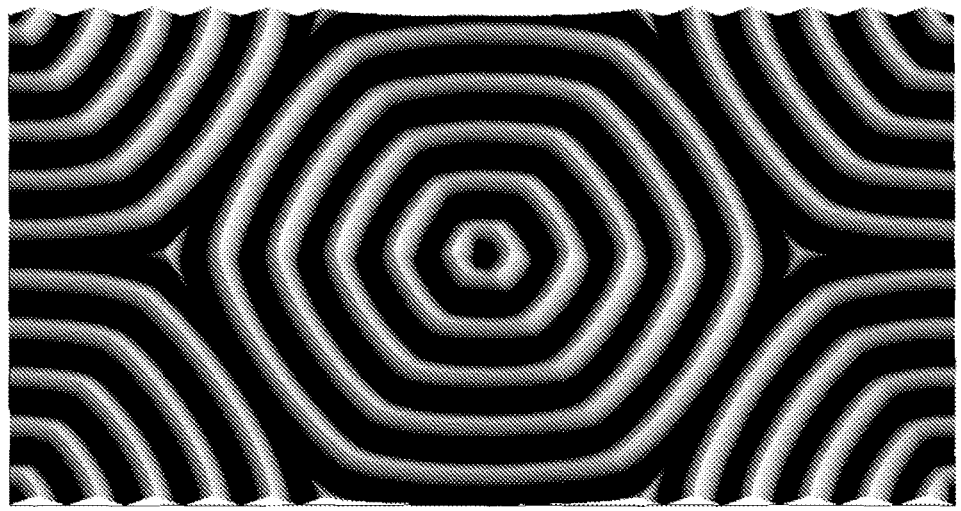
FIG. 13 is an enlarged fragmentary perspective view of a light transmissive structure including an array of microprism elements according to some embodiments described herein.

In the embodiment of FIG. 13, the prism paths take the shape of a rounded hexagon, arrayed concentrically substantially parallel to one another, repeated in hexagonal pattern elements. When illuminated with a wide light source, this 2D deglaring diffuser reduces high-angle luminous intensity in all azimuthal directions. It has the additional benefit of producing a hexagon-like surface pattern that may be aesthetically pleasing, while individual prisms are undetectable or substantially undetectable by the naked eye at typical viewing distances of three feet or more or at typical viewing distances of one meter or more. When an LED is viewed through this 2D deglaring diffuser, it forms a sparkly snowflake-like image that may be aesthetically pleasing.

Figure 14:
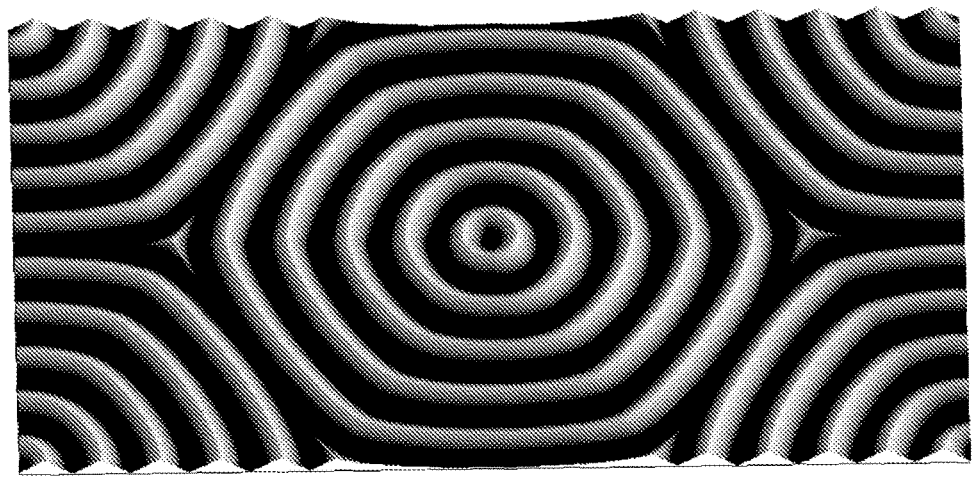
FIG. 14 is an enlarged fragmentary perspective view of a light transmissive structure including an array of microprism elements according to some embodiments described herein.

In the embodiment of FIG. 14, the embodiment of FIG. 13 is further modified to include a circle in the innermost concentric path, and a rounded hexagon in the outermost concentric path, with shapes in between varying between the circle and rounded hexagon. When illuminated with a wide light source, this 2D deglaring diffuser reduces high-angle luminous intensity in all azimuthal directions. It has the additional benefit of producing a hexagon-like surface pattern that may be aesthetically pleasing, while individual prisms are undetectable or substantially undetectable by the naked eye at typical viewing distances of three feet or more or at typical viewing distances of one meter or more. When an LED is viewed through this 2D deglaring diffuser, it forms a sparkly snowflake-like image, different from the image formed by the embodiment of FIG. 13, that may be aesthetically pleasing. It may have the additional advantage of providing a more uniform distribution of prism orientation angles due to the circular inner rings and may have more uniform suppression of high-angle luminous intensity at the various azimuthal angles.

Figure 15:
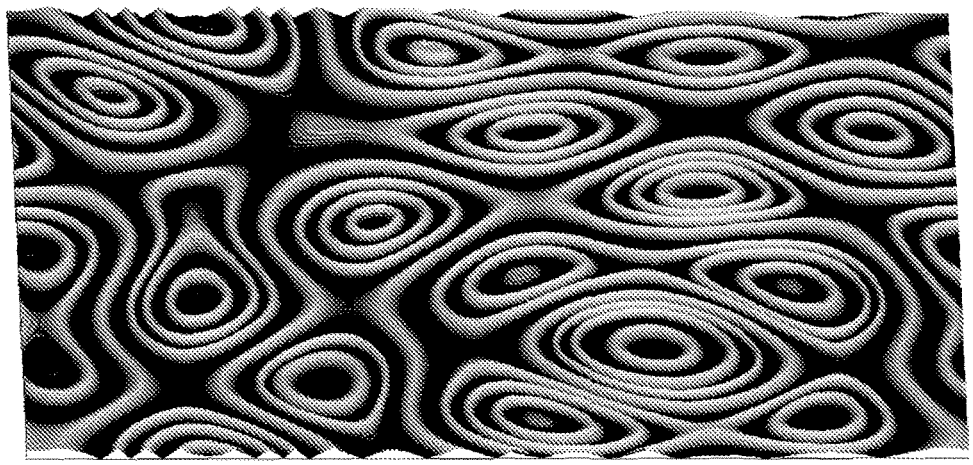
FIG. 15 is an enlarged fragmentary perspective view of a light transmissive structure including an array of microprism elements according to some embodiments described herein.

In many embodiments, periodic or non-periodic tilings (or tessilations) are used to arrange elements comprising concentric prisms. In some embodiments, the tiling may involve multiple tile shapes, such as in the case of penrose tiling. In some embodiments, tiling is not used at all, and substantially parallel curved prisms can be arranged in random shapes. One such random shape can be generated by mathematically generating a random bumpy data surface (resembling smooth waves on the surface of a swimming pool), and forming prisms along contour lines representing the height of the data surface. Prisms are then created on a substrate in the positions given by the contour lines. An example of this type of 2D deglaring diffuser is depicted in FIG. 15. Because this random 2D deglaring diffuser still comprises prisms at all orientation angles and in equal measure, this diffuser will reduce high-angle luminous intensity in all azimuthal directions. This embodiment may offer advantages in surface appearance and reducing the visibility (better scrambling) of the light sources to a viewer of the luminaire.

In another embodiment (not shown), elongation along one direction of the circular path of the prisms into elliptical paths, and corresponding elongation of the hexagonal packing shape will produce a 2D deglaring diffuser with a higher proportion of prisms oriented near one azimuthal plane than in other planes. When illuminated with a wide light source, this 2D deglaring diffuser reduces high-angle luminous intensity in all azimuthal directions, reducing it further in the azimuthal plane perpendicular to the long axis of the elliptical path, and reducing it less in the azimuthal plane parallel to the long axis of the elliptical path. This embodiment may eliminate wink in all azimuthal directions, or may eliminate wink only in one azimuthal plane.

Figure 16:
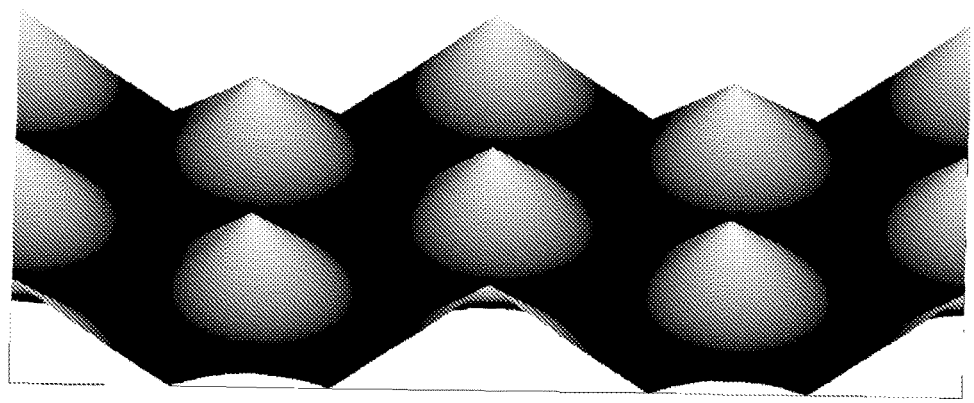
FIG. 16 is an enlarged fragmentary perspective view of a light transmissive structure including an array of cones.
Figure 17:
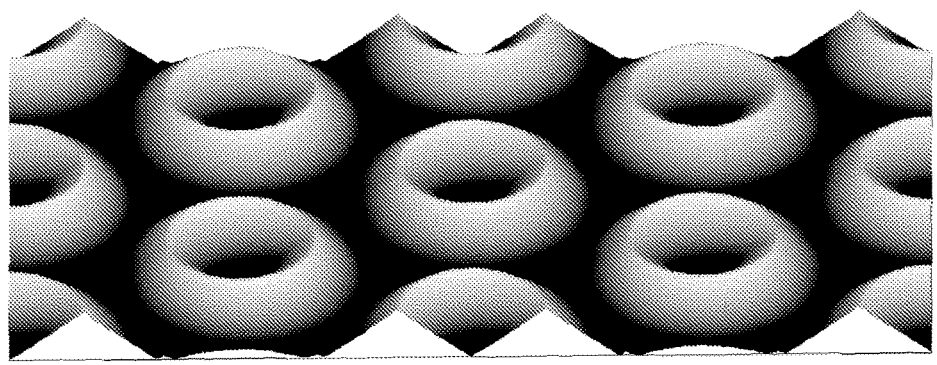
FIG. 17 is an enlarged fragmentary perspective view of a light transmissive structure including an array of cones with inverted tips.

As mentioned previously, an array of simple cones, as depicted in FIG. 16, is mentioned in the prior art. A cone array is roughly equivalent to an array of prisms on paths consisting of less than one circle per repeated element. Also mentioned in prior art is an array of cones with inverted tips, as depicted in FIG. 17. An array of cones with inverted tips is roughly equivalent to a prism array with exactly one circular path per repeated element. The 2D deglaring optics presented herein are based partly on the surprising observation that for a given manufacturing technology (which may not be able to create perfect prism shapes, and may include some rounding of tips and valleys) prism arrays including two or more circular elements arranged concentrically may have better suppression of high-angle luminous intensity than cones or cones with inverted tips.

Figure 18:
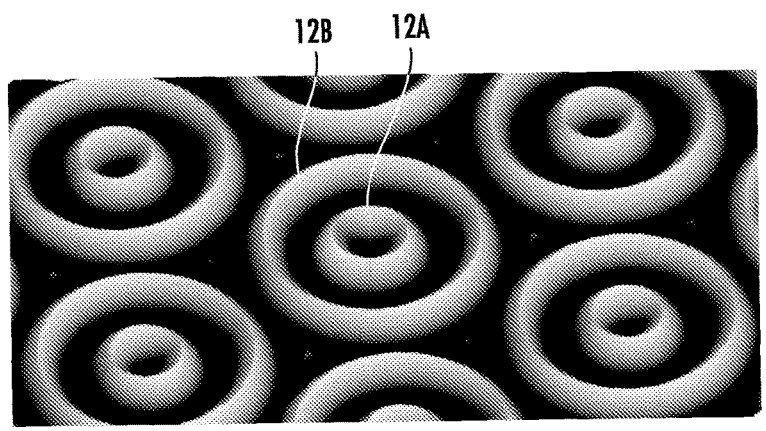
FIG. 18 is an enlarged fragmentary perspective view of a light transmissive structure including an array of microprism elements according to some embodiments described herein.
Figure 19:
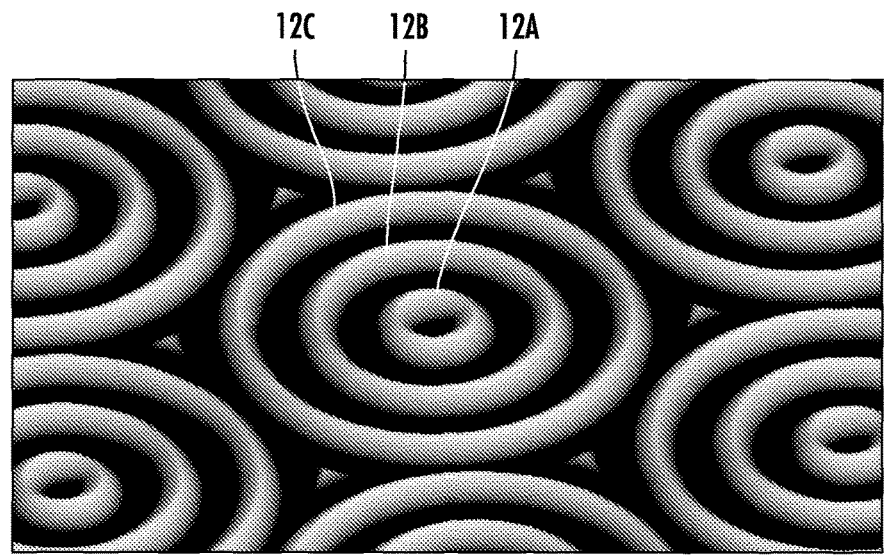
FIG. 19 is an enlarged fragmentary perspective view of a light transmissive structure including an array of microprism elements according to some embodiments described herein.

FIG. 18 depicts a 2D deglaring diffuser in which the prism paths consist of two concentric circles within each hexagonal packing element. According to laboratory experiments by the Applicant, the surprising result was observed that this and other embodiments whose prism paths comprise at least two concentric shapes per repeated pattern element provided better suppression of high-angle luminous intensity than cones of similar design, or cones with inverted tips of similar design. FIG. 19 depicts a 2D deglaring diffuser in which the prism paths consist of three concentric circles within each hexagonal packing element.

Figure 20:
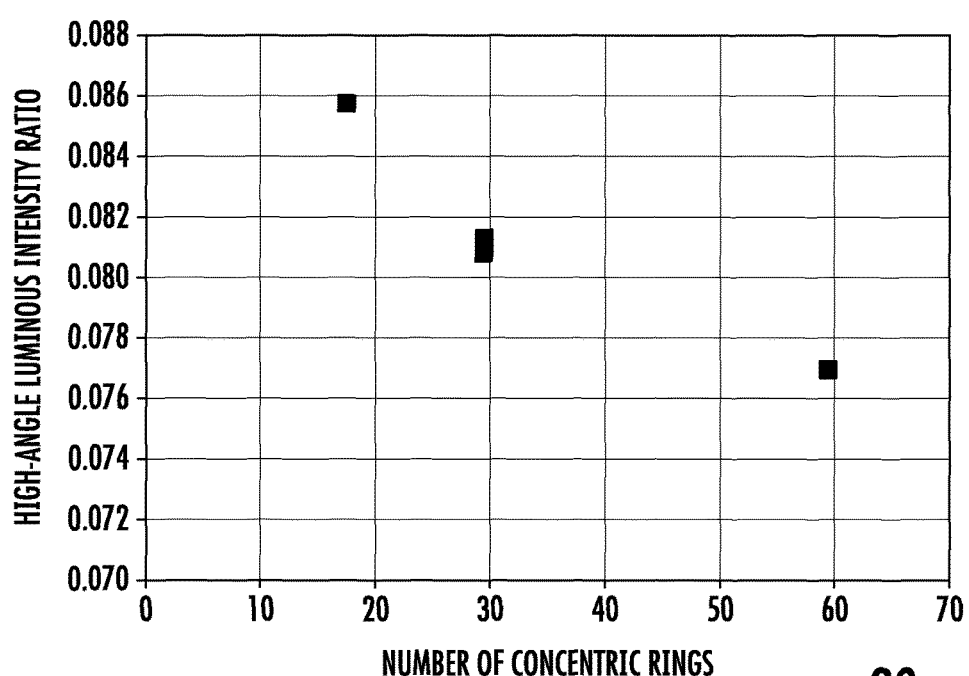
FIG. 20 is a chart of the high-angle luminous intensity ratio vs. the number of concentric rings per microprism element of light transmissive structures according to various embodiments described herein.

Due to imperfections or limitations of manufacturing technology, it may not be possible to make prisms of perfect shape. For example, it may not be possible to create prism sidewalls with cross-section of precisely the desired flatness or curvature; it may not be possible to create tips of perfect sharpness or exactly a desired rounding; and it may not be possible to create prism valleys of perfect sharpness. The Applicant performed several laboratory experiments in which 2D deglaring diffusers were created with substantially consistent manufacturing conditions including prism pitch of about 85 microns, prism internal angle of about 105 degrees, substrate thickness of about 175 microns, and prism paths consisting of a varying number of concentric circles. 2D deglaring diffusers with a higher number of concentric circle paths had correspondingly larger hexagonal repeated elements. This experiment provided the surprising outcome that prism paths including increased numbers of concentric circles (and thus larger elements) had better suppression of high-angle luminous intensity. Data from this experiment are plotted in FIG. 20. For each experimental condition, the maximum luminous intensity in the angle range of 65-90 degrees was divided by the peak luminous intensity (which was substantially the axial luminous intensity) to give a high-angle luminous intensity ratio. A smaller high-angle luminous intensity ratio indicates better suppression of high-angle luminous intensity and is desirable. Given this result, various embodiments described herein can provide two or more, and in some embodiments three or more rings, and in other embodiments at least 5, 10, 15, 20, 30, 40 or more rings, such that any given small segment of a prism is adjacent to at least one and in some embodiments two small segments of prisms (on either or both sides of the small segment of prism) that has a substantially similar prism orientation angle and is thus substantially parallel. FIG. 18 depicts a 2D deglaring diffuser in which the prism or prism segment 12A has substantially parallel neighboring prism 12B. FIG. 19 depicts a 2D deglaring diffuser in which prism or prism segment 12A has substantially parallel neighboring prisms 12B and 12C, prism 12B has substantially parallel neighboring prisms 12A and 12C, and prism 12C has substantially parallel neighboring prisms 12B and 12A. For elements with a large number of rings, many of the prisms will have many substantially parallel neighboring prisms.

The trend of improved performance for greater numbers of rings (i.e. larger pattern elements, or larger characteristic size of pattern elements) is not exclusively for circular paths. The trend may hold for any embodiment presented herein, in which may be desirable to have more substantially parallel prism paths (and paths with, substantially one or more neighboring paths) within each characteristic size of a pattern element.

The characteristic size of pattern elements for a tiled arrangement of pattern elements can be defined as the distance between each tile, or average distance between nearest-neighbor tiles in the case of non-periodic or irregular tilings.

Although it may be difficult to clearly define individual elements in some randomly-arranged prism arrays, the collection of concentric shapes could be called "pseudo-elements" and still can be said to have a characteristic size. The prism array shown has several locations that are relative maxima or minima, having the maxima or minima of the random bumps involved in generating the data surface as explained herein. The characteristic size of the pseudo-elements is simply the average distance between these maxima or minima of the data surface, which can be determined by one skilled in the art through techniques such as Fourier analysis. Thus the features in random non-repeating arrangements can still be said to have a defined characteristic size.

Pyramid optical articles, also known as corner cube arrays or pyramid optics, including films, large rigid sheets, and individual rigid parts, have been used for optical purposes including retro-reflection, broadening of light beams, forming Lambertian light into 2D batwing light distributions, or reducing glare from Lambertian light sources. Pyramid optics are also used to create gain (increase in nadir intensity perpendicular to the plane of the pyramid optic), often in conjunction with a reflector disposed on the opposite side of the light source as the pyramid optic. Pyramid optics may be used to create gain in displays including televisions, monitors, small displays, phones, tablets, and advertising displays, as well as in general lighting.

Pyramid optics such as corner cube arrays can be used for many applications including displays and general lighting.

Existing corner cube arrays usually have corner cubes arranged in a close-packed hexagonal or triangular tessellation, in which the faces of the cubes are arranged in a finite number of orientations, often in six orientations for triangular- or hex-packed corner cubes, and often four in square-packed arrays of square pyramids.

Figure 41A:
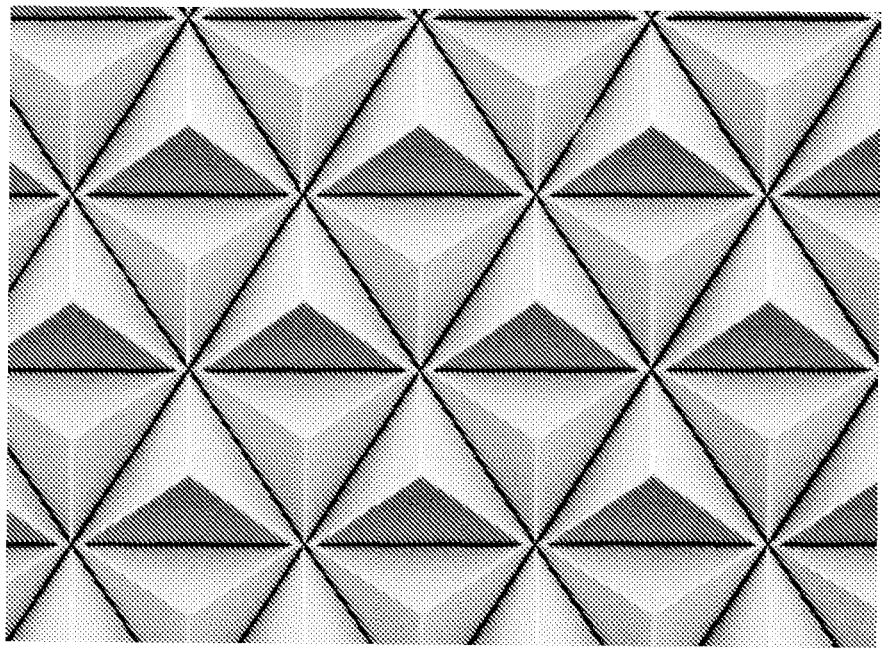
FIG. 41A illustrates a convex triangular pyramid array with triangular packing.
Figure 41B:
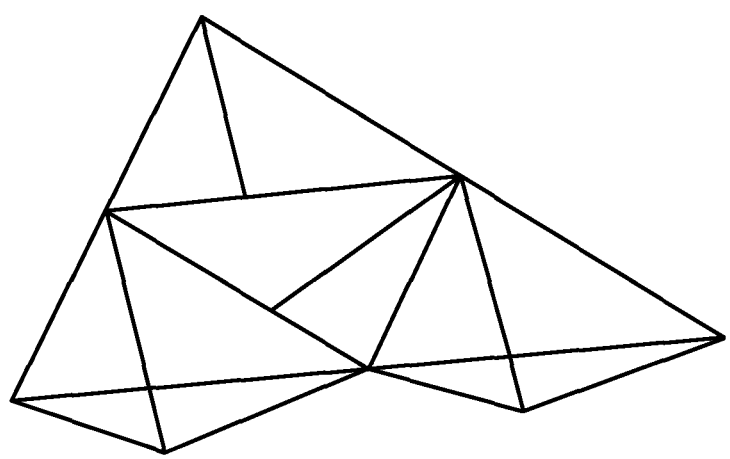
FIG. 41B illustrates a concave triangular pyramid array with triangular packing.

FIG. 41A depicts a convex triangular pyramid array on uniform close-packed triangular base of the prior art. FIG. 41B depicts a concave triangular pyramid array on uniform triangular close packing of the prior art. Each pyramid comprises three substantially planar faces that intersect forming a given angle between intersecting planes. In many cases in the prior art, this intersection angle is 90 degrees. It is noted that the article of FIGS. 41A and 41B has pyramid faces in six orientations.

Figure 42A:
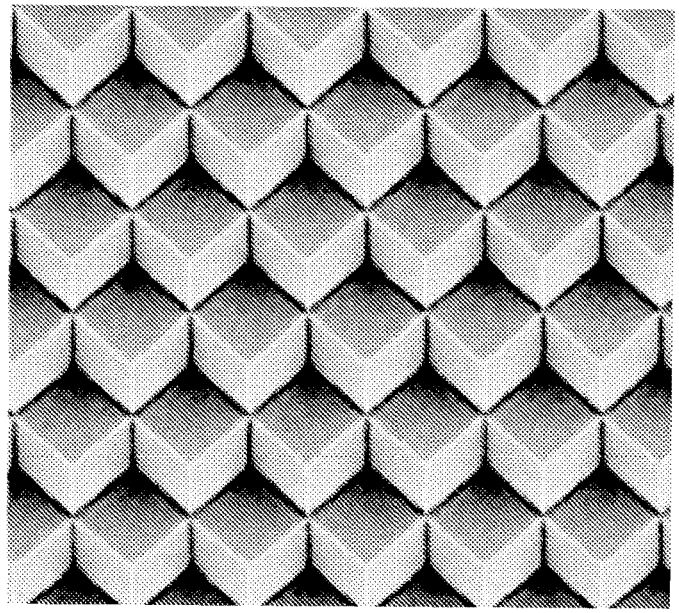
FIG. 42A illustrates a convex triangular pyramid array with hexagonal packing.
Figure 42B:
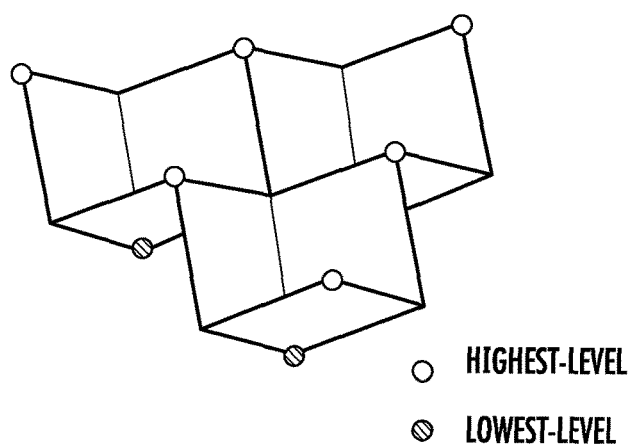
FIG. 42B illustrates a concave triangular pyramid array with hexagonal packing.

FIG. 42A depicts a convex triangular pyramid array on close hexagonal packing of the prior art. FIG. 42B depicts a concave triangular pyramid array on close hexagonal packing of the prior art. Each pyramid is comprises three substantially planar faces that intersect forming a given angle between intersecting planes. In many cases in the prior art, this intersection angle is 90 degrees. It is noted that the article of FIGS. 42A and 42B has pyramid faces in three orientations.

Various embodiments described herein may arise from the recognition that the limited number of pyramid face orientations when equal or generally identically oriented close-packed pyramids or corner cubes are employed means that undesirable artifacts can be created in the optical performance of the article. In glare-reducing articles this can result in undesirable axially-varying degrees of glare reduction.

Light transmissive structures according to various embodiments described herein include a light transmissive substrate having first and second opposing faces. An array of microprism elements is on the first face, each element including a plurality of microstructure pyramids. One or more aspects of the geometry such as the orientation of individual pyramids or the orientation of groups of pyramids such as rings or circles of pyramids may be randomized in such a way that on the entire substrate there exists a pseudo-continuum of prism face orientations.

Light transmissive structures according to various embodiments described herein have a pseudo-continuum of pyramid face orientations to reduce or remove artifacts in the light distribution that may otherwise be present from having a limited number of orientations. A pseudo-continuum can be defined as having a collection of prism faces having 8, 12, 16, 32, 64 or more orientations in various embodiments.

For a plane or surface that is part of a microstructure feature, such as a pyramid face, one can define the orientation of said surface to be the angle, relative to an x-axis in the plane of the substrate, of an axis normal to said surface projected onto the plane of the substrate.

Figure 55:
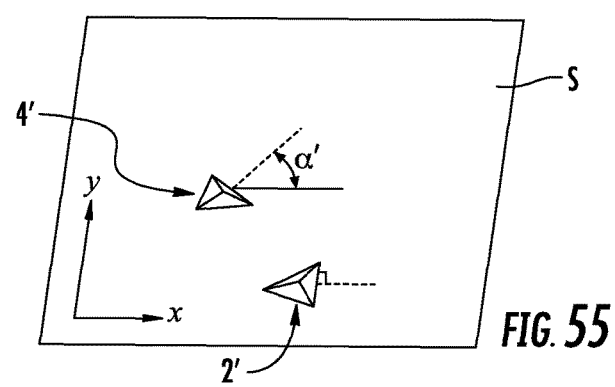
FIG. 55 is a perspective view of a substrate having microstructure pyramids oriented thereon with different pyramid face orientation angles.

Referring to FIG. 55, the pyramid face orientation angle may be the angle measured in the plane from the x-axis, counter-clockwise to the normal axis. The pyramid 2' has a pyramid face orientation angle of roughly 0 degrees from the x-axis, while the pyramid 4' has a pyramid face orientation angle α' of roughly 45 degrees from the x-axis. In some embodiments, the pyramid face orientation angle can be measured relative to an edge of the substrate S (e.g., for a polygonal substrate) or relative to a tangent of the substrate S (e.g., for a circular or elliptical substrate).

Various embodiments described herein can provide arrangements of relatively closely-packed corner cubes and pyramids that are arranged in close-packed circular and/or concentric-ring elements, in which some elements may be rotated at pseudo-random angles when compared to other elements, leading to substantially a continuum of angular orientations for the corner cubes or pyramids, while maintaining somewhat close packing. In some embodiments, a single element may contain multiple concentric rings in which the orientation or rotation of a given ring may vary from orientation of other rings in the element.

Light transmissive structures according to various embodiments described herein include a light transmissive substrate having first and second opposing faces and an array of microstructure elements on the first face, with a respective microstructure element comprising a plurality of pyramids.

In some embodiments the light transmissive structure is configured to receive light from a light source facing the second face and distribute the light emerging from the first face in a distribution with reduced luminance at high viewing angles (glare) relative to a Lambertian source.

Figure 43:
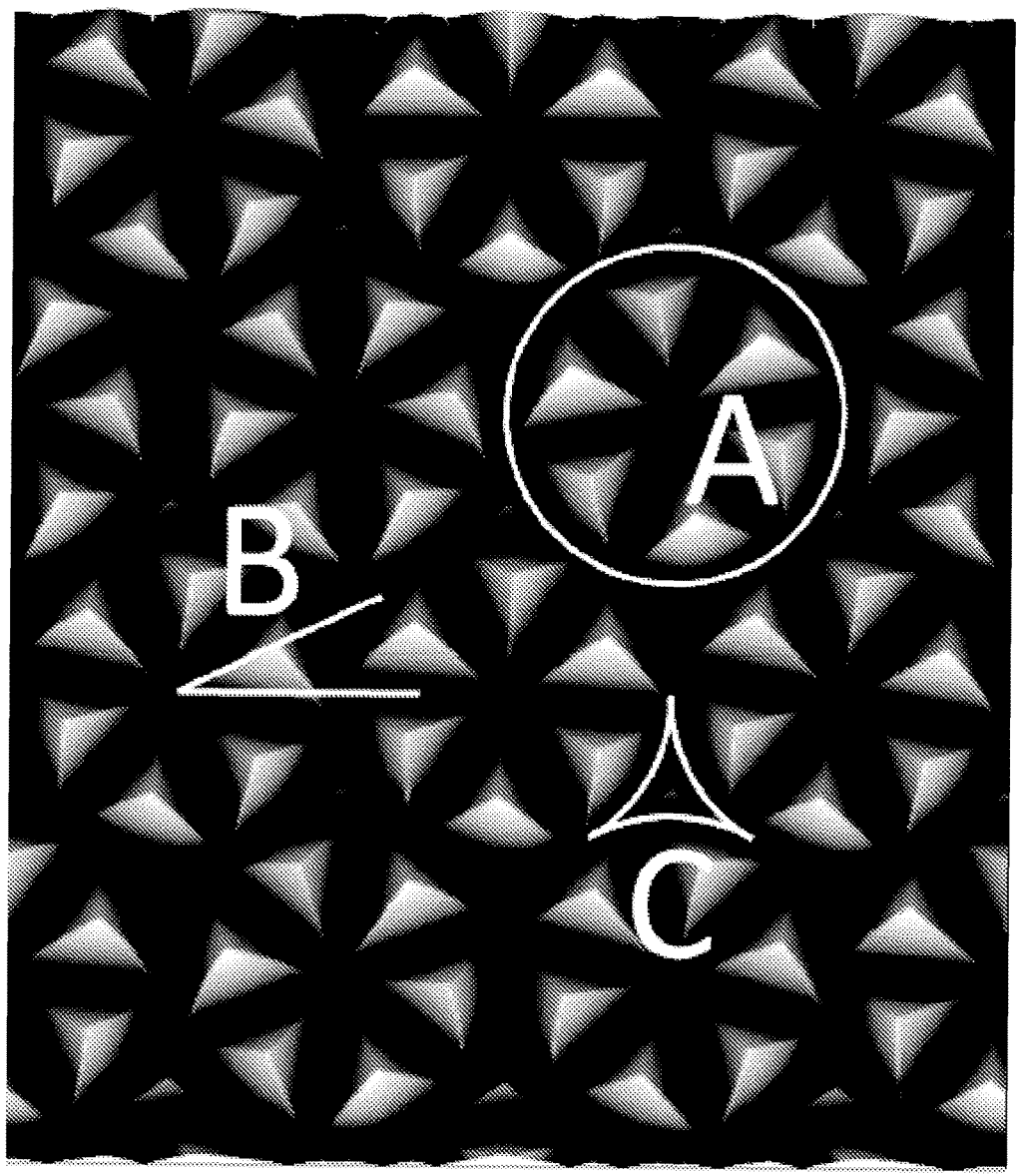
FIG. 43 is an enlarged fragmentary perspective view of a light transmissive structure according to some embodiments described herein.

FIG. 43 depicts a gray-scale 3D rendering of a triangular pyramid array in which 12 circular elements are combined in a seamlessly repeatable unit rectangle. The triangular pyramids are on one side of a substrate. Each circular element A contains pyramids at a rotation angle B measured from an arbitrary axis in the plane of the substrate (e.g., the x- or horizontal axis). The rotation angle B may also be measured relative to an edge of the substrate (e.g., an edge of a polygonal substrate or a tangent of a circular or elliptical substrate). In between the circular elements, an interstitial space C exists and can be filled by shapes such as additional pyramids or other microstructures and/or left unfilled. In FIG. 43 some faces of the pyramids are slightly rounded to more easily fit into a circular shape. In a similar embodiment, not pictured, the faces can be planar and simply extend until they intersect faces of pyramids elsewhere on the substrate.

Figure 44:
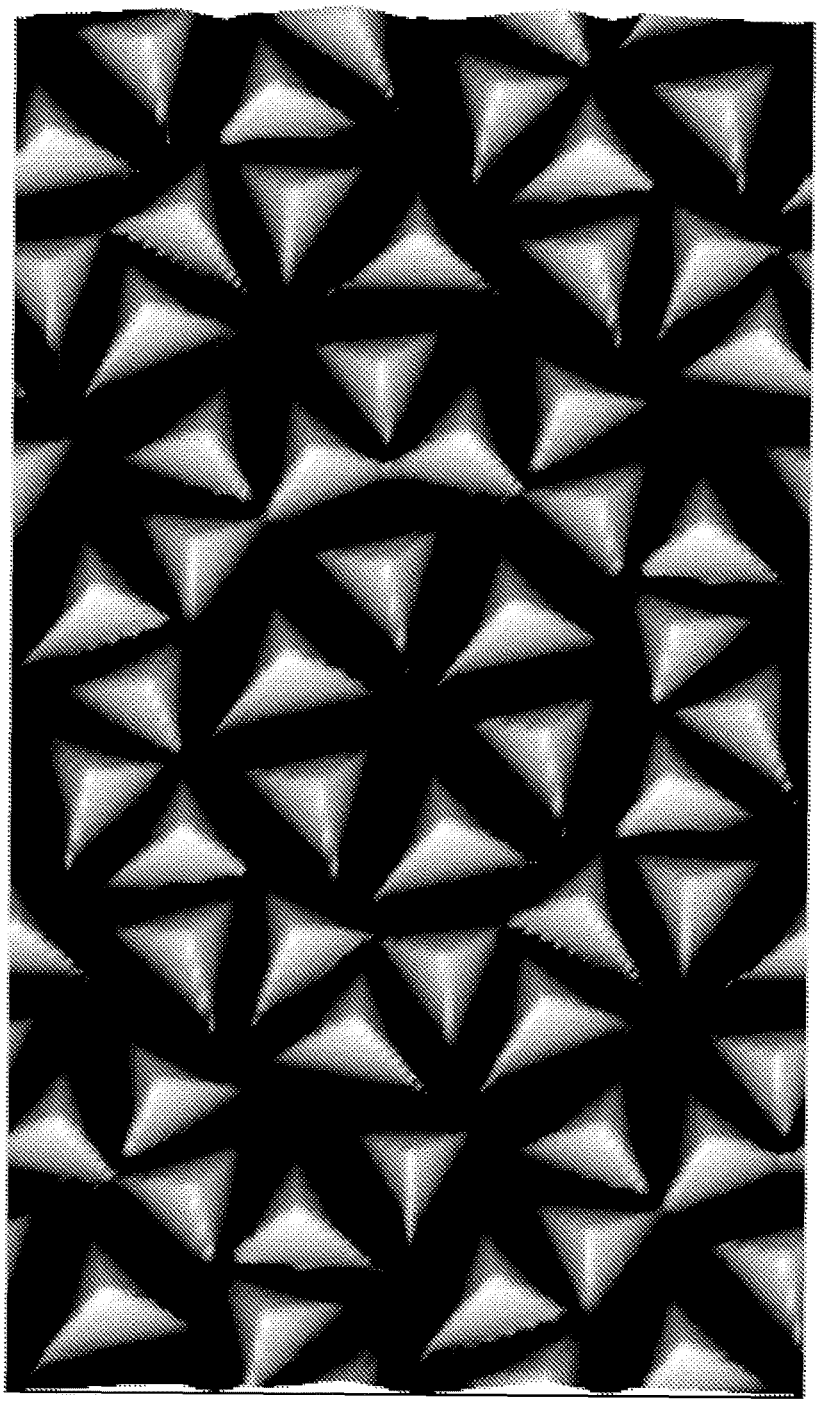
FIG. 44 is an enlarged fragmentary perspective view of a light transmissive structure according to some embodiments described herein.

FIG. 44 depicts a gray-scale 3D rendering of a triangular pyramid array in which a central circle containing pyramids at one rotation angle is surrounded by an additional ring containing multiple pyramids arranged in approximately triangular packing into the ring, with the pyramid ring rotated to a second rotation angle. Interstitial space may be filled by additional shapes such as a triangular pyramid or multiple triangular pyramids or other microstructures.

FIG. 44 depicts a seamlessly repeatable unit rectangle containing two elements. It is possible to make larger unit rectangles comprising any number of distinct elements, with each element having random or pseudo-random rotation angles for each central circle and ring.

Figure 45:
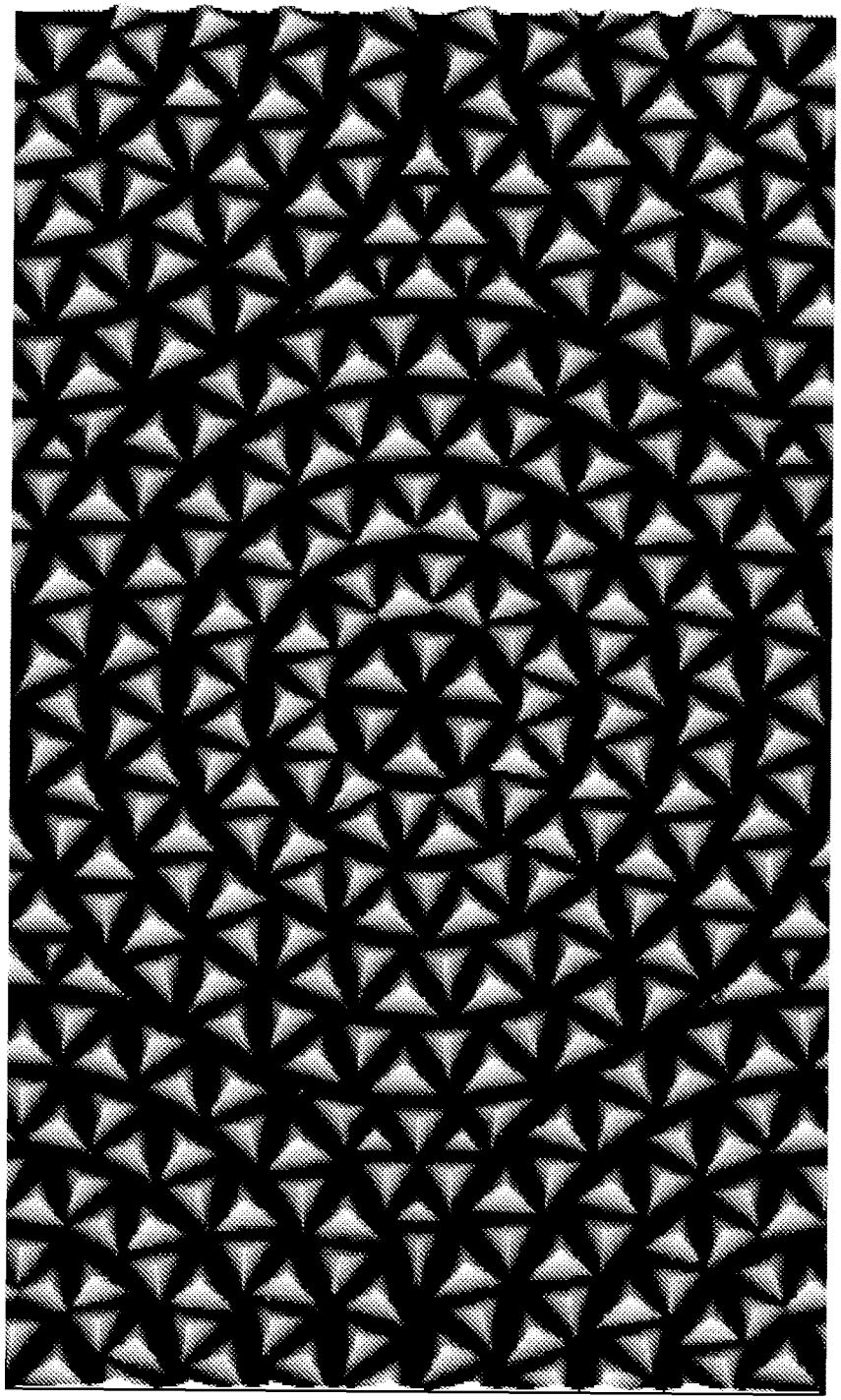
FIG. 45 is an enlarged fragmentary perspective view of a light transmissive structure according to some embodiments described herein.

FIG. 45 depicts a gray-scale 3D rendering of a triangular pyramid array in which a central circle containing pyramids at one rotation angle is surrounded by a plurality of additional rings containing multiple pyramids arranged in approximately triangular packing into the ring, with each pyramid ring rotated to a random or pseudo-random rotation angle. Due to the triangular packing, within any ring the orientation of the triangles varies in such a way that adjacent triangles alternate between having a pyramid face facing the center of the circle or having a pyramid edge facing the center of the circle. Interstitial space may be filled by additional shapes such as a triangular pyramid or multiple triangular pyramids or other microstructures. FIG. 45 depicts a seamlessly repeatable unit rectangle containing two elements. It is possible to make larger unit rectangles comprising any number of distinct elements, with each element having a different set of random or pseudo-random rotation angles for each central circle and ring.

Figure 46:
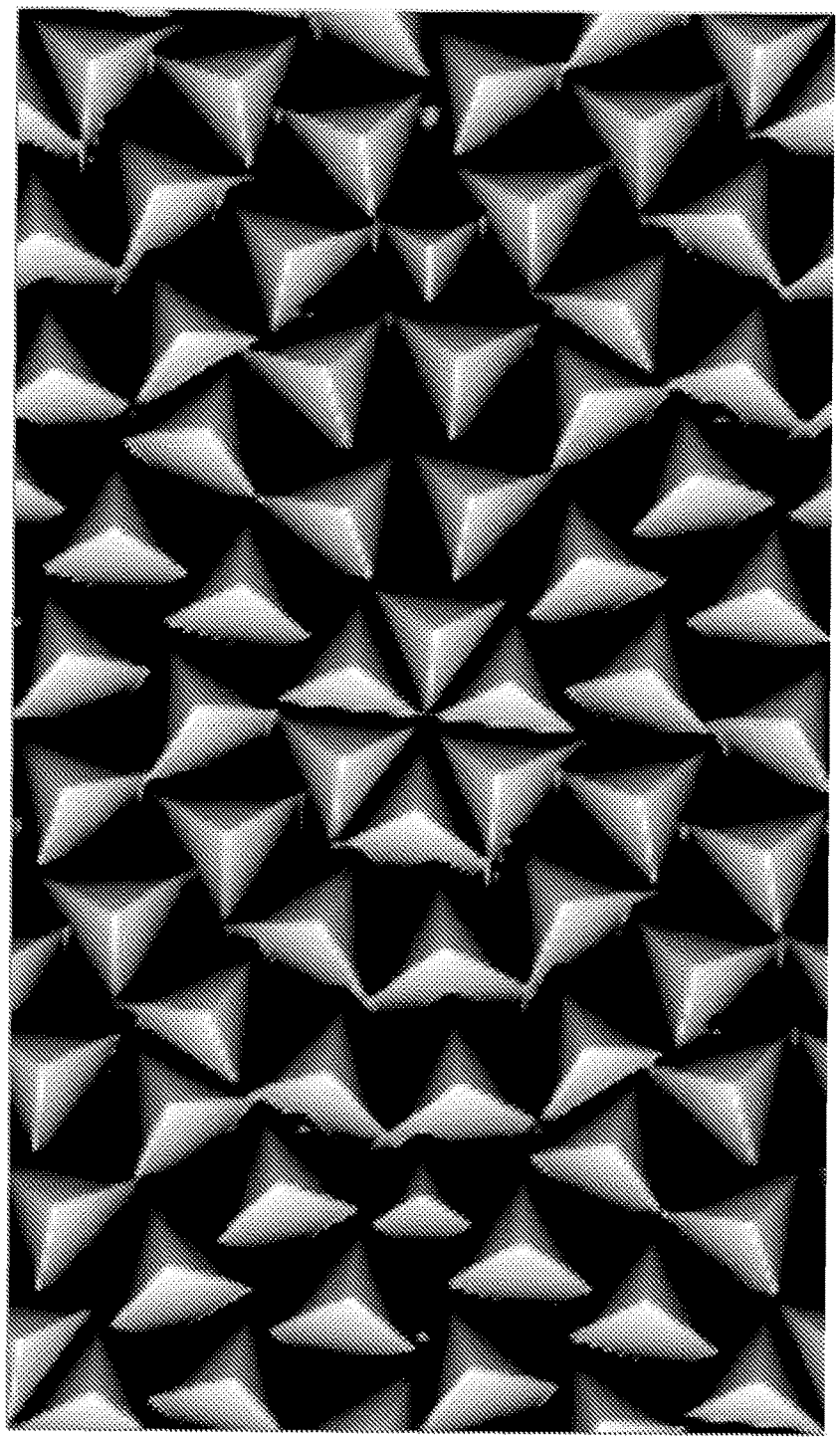
FIG. 46 is an enlarged fragmentary perspective view of a light transmissive structure according to some embodiments described herein.

FIG. 46 depicts a gray-scale 3D rendering of a triangular pyramid array in which a central circle containing pyramids at one rotation angle is surrounded by a plurality of additional rings containing multiple pyramids arranged in a ring, with each pyramid ring rotated to a random or pseudo-random rotation angle. Pyramids are arranged such that all pyramids have an edge pointing toward the center, giving the appearance of close hexagonal packing similar to a traditional corner cube array such as in FIG. 42A. Interstitial space may be filled by additional shapes such as a triangular pyramid or multiple triangular pyramids or other microstructures.

FIG. 46 depicts a seamlessly repeatable unit rectangle containing two elements. It is possible to make larger unit rectangles comprising any number of distinct elements, with each element having a different set of random or pseudo-random rotation angles for each central circle and ring.

Figure 47:
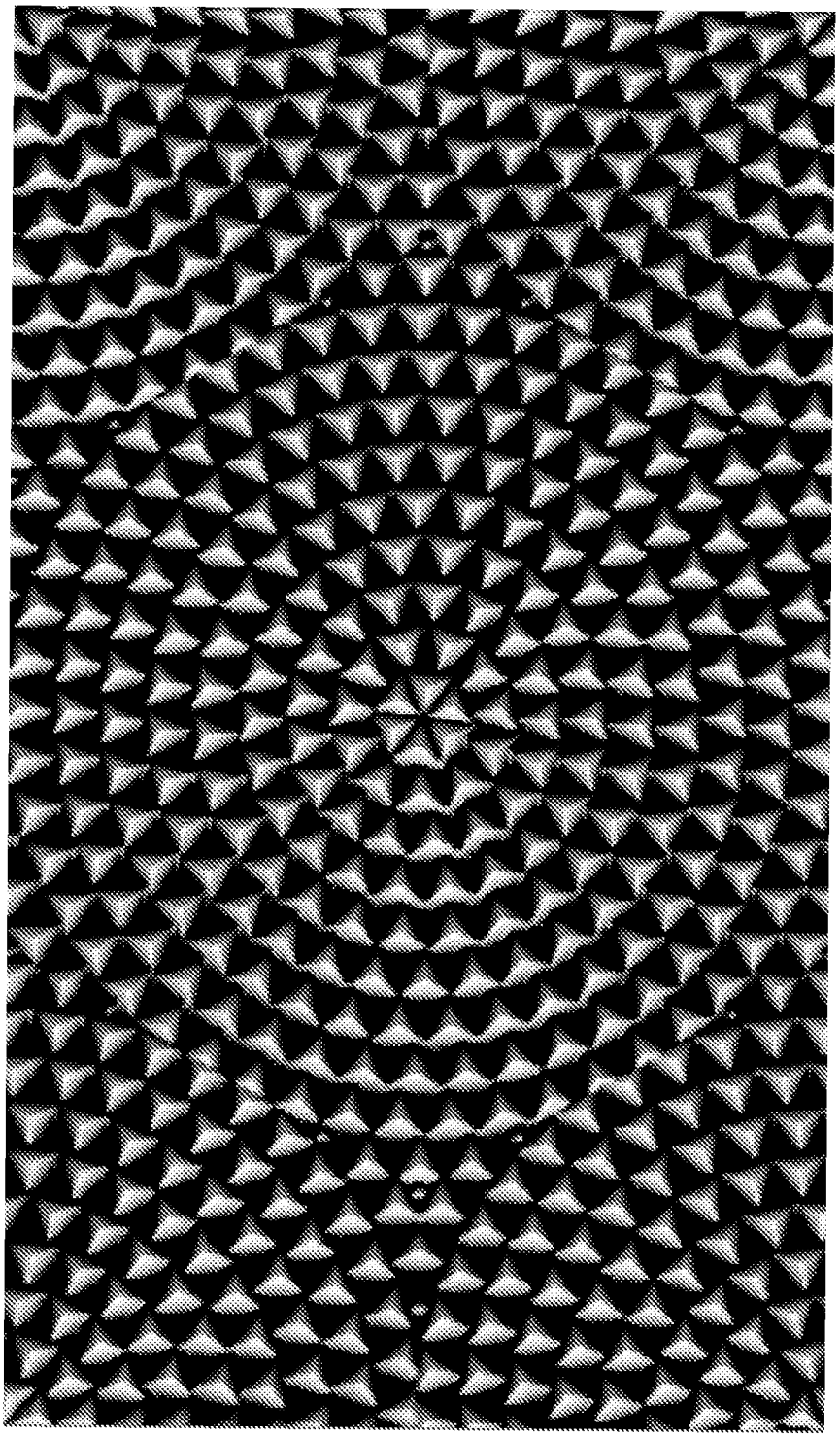
FIG. 47 is an enlarged fragmentary perspective view of a light transmissive structure according to some embodiments described herein.

FIG. 47 depicts a version similar to that of FIG. 46 except with a larger number of rings, and multiple pyramids in the interstitial space.

Similar to FIGS. 46 and 47, the pyramids can be oriented with a face pointing toward center (180 degree rotation of each pyramid within the rings compared to the embodiment of FIG. 46).

Figure 48:
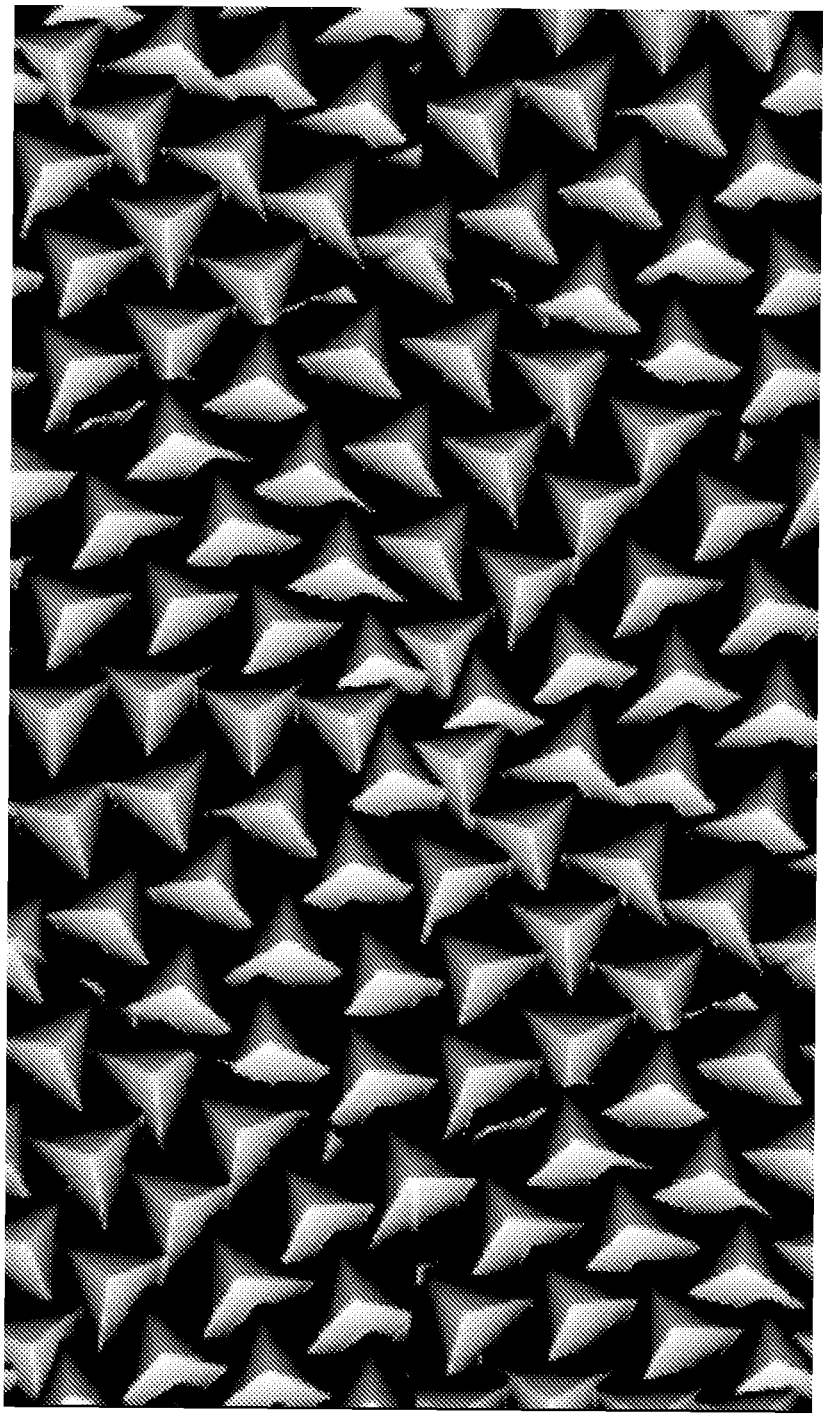
FIG. 48 is an enlarged fragmentary perspective view of a light transmissive structure according to some embodiments described herein.

Similar to FIGS. 46 and 47, pyramids can be rotated at other angles, such as 30 degrees from that shown in FIG. 46, as depicted in FIG. 48.

Figure 49:
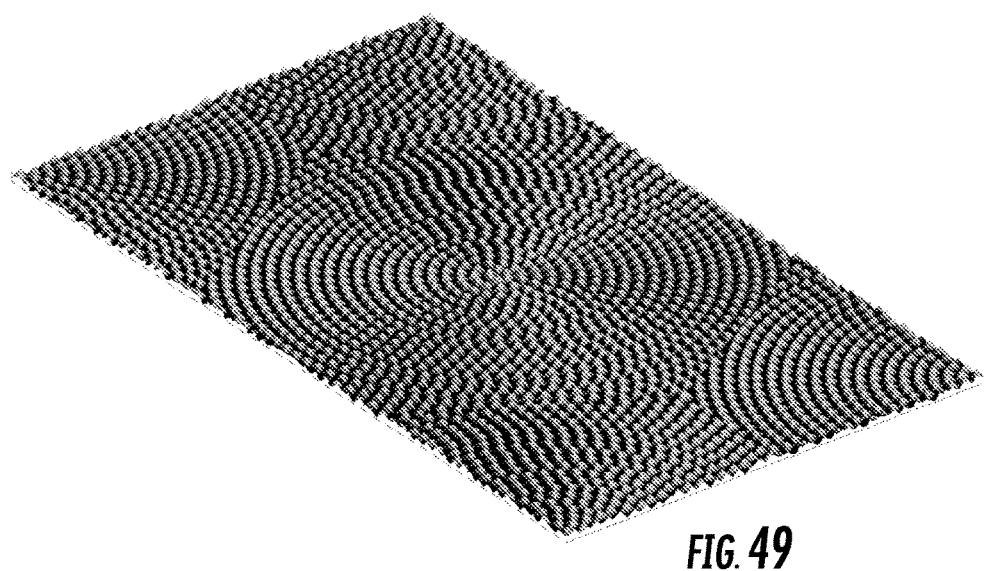
FIG. 49 is an enlarged fragmentary perspective view of a light transmissive structure including an array of microprism elements according to some embodiments described herein.

In FIG. 49, corner cube shapes or pyramids of approximately 30 microns are created in concentric rings, oriented such that one flat face of each corner cube faces away from the center of the ring. There are about 18 rings in each pattern element, with adjacent rings about 32 microns apart. The pattern elements are repeated in a hexagonal array with dimension about 1.2 mm to fill the surface of the diffuser as shown in FIG. 49, which depicts a seamlessly repeatable unit rectangle containing two elements. The corner cubes have an internal angle between any two faces of about 90 degrees and substantially planar sidewalls. The refractive index is about 1.49. The prisms are formed of a transparent polymer on a transparent polymer substrate of thickness about 175 microns. When illuminated with an approximately 120 degree Lambertian light source with distribution shown by the dashed line in FIG. 50, impinging upon the substantially smooth side, this 2D deglaring diffuser reduces high-angle luminous intensity in all azimuthal directions, increases axial luminous intensity, and has no wink, with distribution shown in the solid line of FIG. 50. The peak high-angle luminous intensity at 65 degrees is about 24% of the axial luminous intensity. An unexpected benefit is that the hexagonal pattern elements are visible to the naked eye, and the array of hexagons produces a pleasing surface pattern that adds artistic and visual appeal, while individual prisms (corner cubes) are undetectable by the naked eye at typical viewing distances of three feet or more or at typical viewing distances of one meter or more. When illuminated by a single LED or array of multiple LEDs (or similar light source), there is an unexpected benefit that the corner-cubes, possibly due to having an evenly-distributed range of orientation angles with respect to an axis in the plane of the substrate, provide better visual hiding of LED sources than other anti-glare solutions on the market today including linear arrays of prisms or cones.

Figure 51:
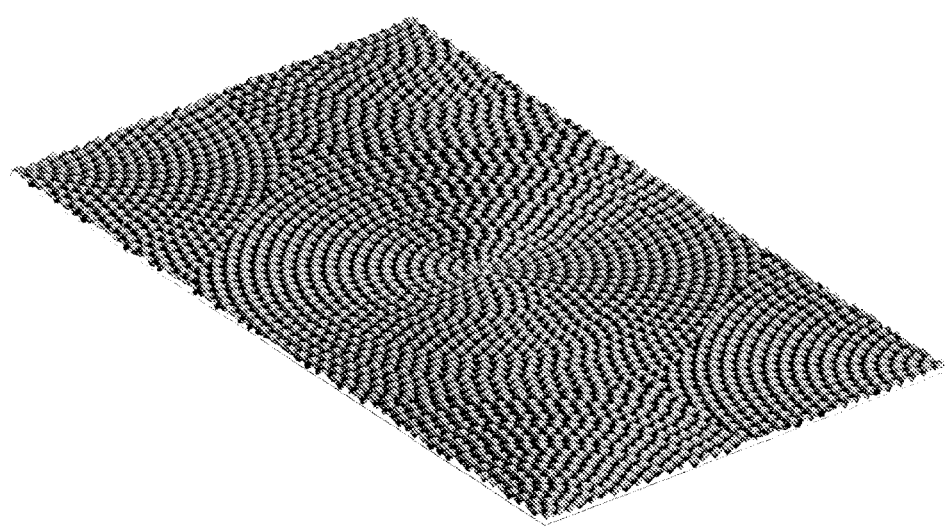
FIG. 51 is an enlarged fragmentary perspective view of a light transmissive structure including an array of microprism elements according to some embodiments described herein.

In FIG. 51, corner cube shapes or pyramids of approximately 30 microns are created in concentric rings, oriented such that one flat face of each corner cube faces away from the center of the ring. There are about 18 rings in each pattern element, with adjacent rings about 32 microns apart. The pattern elements are repeated in a hexagonal array with dimension about 1.2 mm to fill the surface of the diffuser as shown in FIG. 51, which depicts a seamlessly repeatable unit rectangle containing two elements. The corner cubes near their bases have an internal angle between any two faces of about 90 degrees and the sidewalls have a slight convex curvature so that the angle between two faces near the peak is slightly greater than 90 degrees. The refractive index is about 1.49. The prisms are formed of a transparent polymer on a transparent polymer substrate of thickness about 175 microns. When illuminated with an approximately 120 degree Lambertian light source with distribution shown by the dashed line in FIG. 52, impinging upon the substantially smooth side, this 2D deglaring diffuser reduces high-angle luminous intensity in all azimuthal directions, increases axial luminous intensity, and has no wink, with distribution shown in the solid line of FIG. 52. The peak high-angle luminous intensity at 65 degrees is about 22% of the axial luminous intensity. An unexpected benefit is that the hexagonal pattern elements are detectable by or visible to the naked eye, and the array of hexagons produces a pleasing surface pattern that adds artistic and visual appeal, while individual prisms (corner cubes) are undetectable by the naked eye at typical viewing distances of three feet or more or at typical viewing distances of one meter or more. When illuminated by a single LED or array of multiple LEDs (or similar light source), there is an unexpected benefit that the corner-cubes, possibly due to having an evenly-distributed range of orientation angles with respect to an axis in the plane of the substrate and/or the slight convex curvature of the sidewalls, provide better visual hiding of LED sources than other anti-glare solutions on the market today including linear arrays of prisms or cones.

Figure 50:
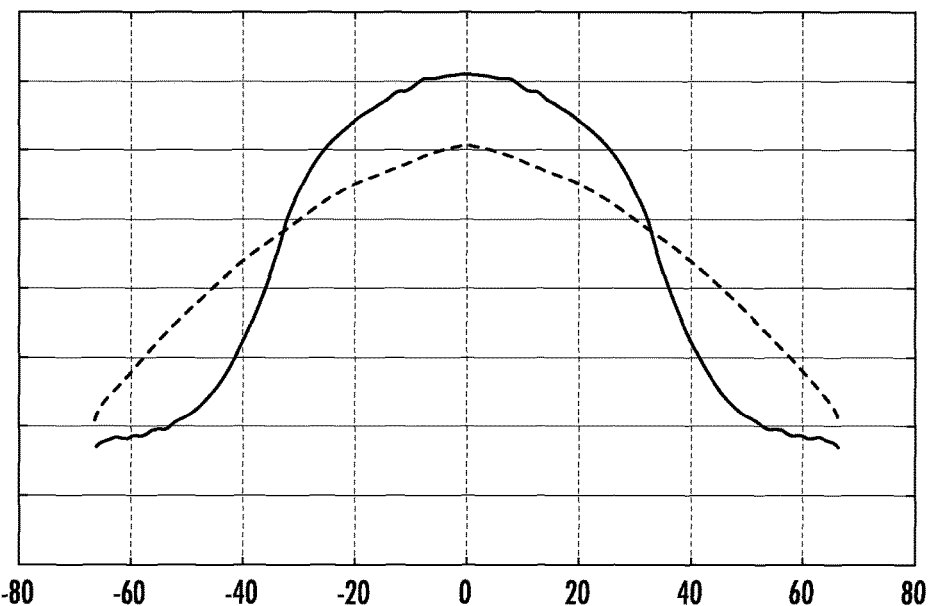
FIG. 50 is a chart illustrating the light distribution of a Lambertian light source having a FWHM of 120 degrees after passing through the light transmissive structure of FIG. 49 with the microprism elements facing away from light source.
Figure 52:
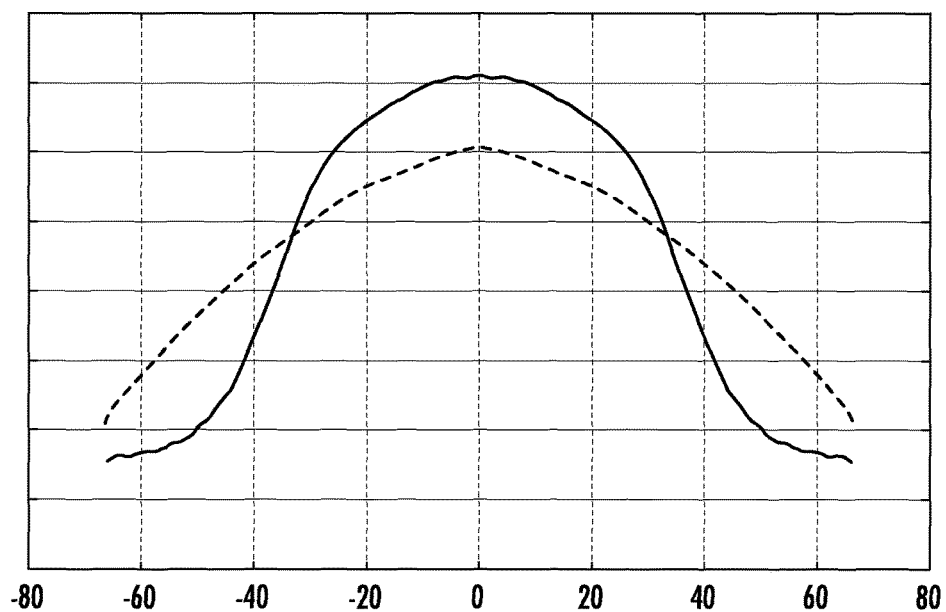
FIG. 52 is a chart illustrating the light distribution of a Lambertian light source having a FWHM of 120 degrees after passing through the light transmissive structure of FIG. 51 with the microprism elements facing away from light source.

Due to imperfections or limitations of manufacturing technology, it may not be possible to make pyramids or corner cubes of perfect shape. For example, it may not be possible to create sidewalls with cross-section of precisely the desired flatness or curvature; it may not be possible to create tips, valleys, or edges of perfect sharpness or with exactly a desired rounding. Pyramid deglaring diffusers of the embodiments of FIGS. 49 and 51 were created by Applicant, and were known to have significant rounding of the tips, valleys, and edges. The experimental data of FIGS. 50 and 52 show that glare was indeed suppressed at 65 degree angle relative to the Lambertian source, but it was not suppressed as much as for some other embodiments presented herein. It is believed that with sharper tips, valleys, and edges, a greater degree of glare suppression is achievable.

In some cases, triangular pyramids with 90 degree angles between faces, also known as corner cubes, may be desirable. In other cases, angles other than 90 degrees may be desirable. For use in anti-glare applications, angles between faces of about 90-120 degrees may be desirable.

Figure 53A:
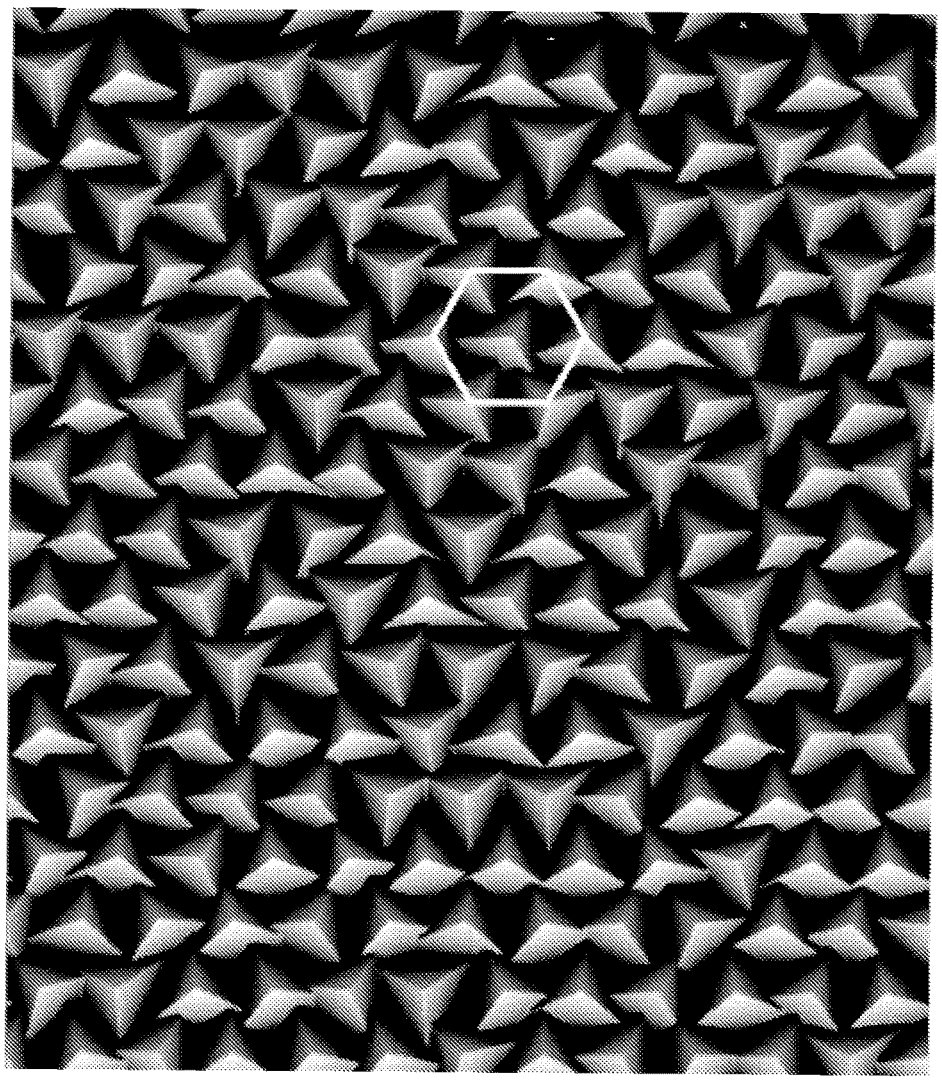
FIG. 53A is an enlarged fragmentary perspective view of a light transmissive structure according to some embodiments described herein.
Figure 53B:
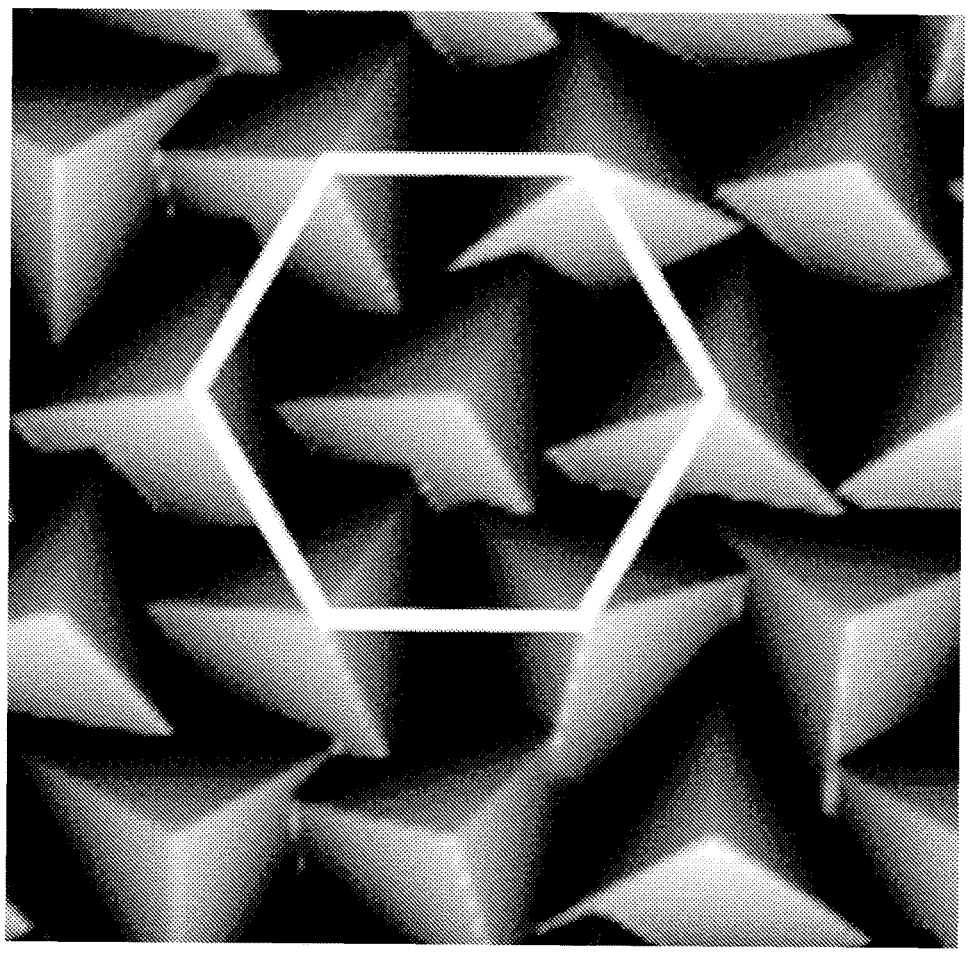
FIG. 53B is a further enlarged fragmentary perspective view of the light transmissive structure of FIG. 53A.

In other embodiments, pyramids can be arranged with their tips (i.e., highest corners) on a uniform hexagonal packing, but with the angle of rotation of each pyramid varied according to random or other criteria. An example of this is depicted in FIG. 53A and FIG. 53B, in which 90-degree triangular pyramids are arranged on a substrate with their tips on a uniform hexagonal close-packing, each pyramid having a randomly-chosen rotational orientation in the plane of the substrate. FIG. 53B enlarges a portion of FIG. 53A to more clearly illustrate how prism tips are arranged in close hexagonal packing.

Figure 54A:
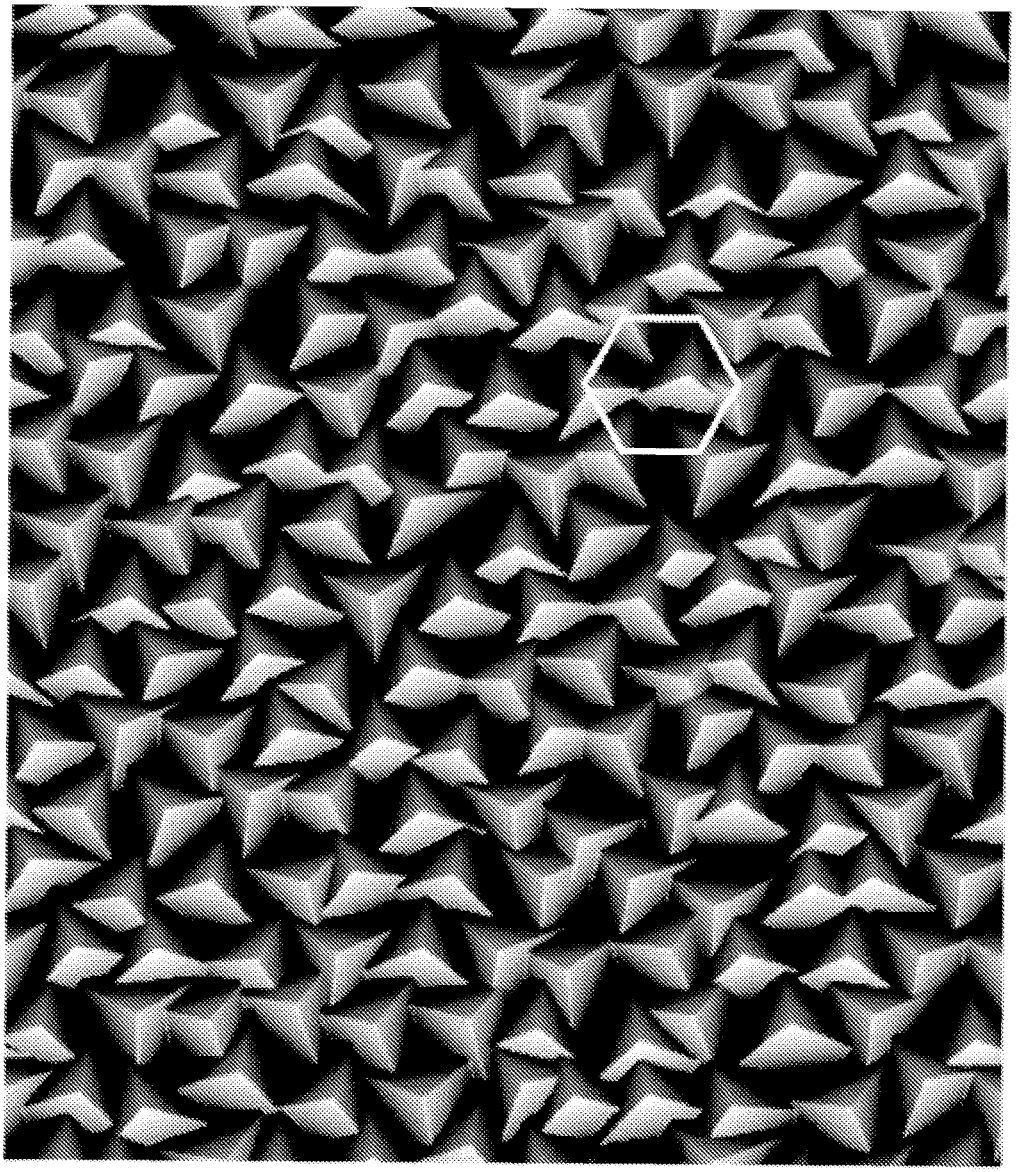
FIG. 54A is an enlarged fragmentary perspective view of a light transmissive structure according to some embodiments described herein.
Figure 54B:
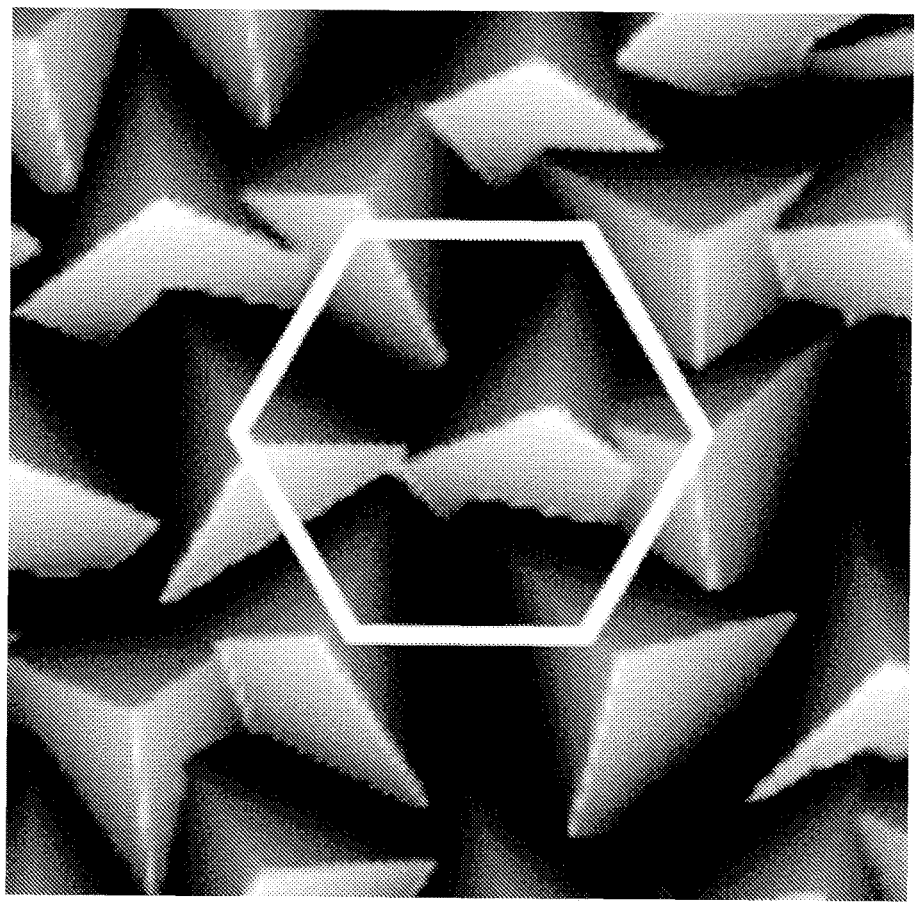
FIG. 54B is a further enlarged fragmentary perspective view of the light transmissive structure of FIG. 54A.

In FIGS. 54A and 54B, a similar array is depicted, in which each pyramid tip lies on an approximate close-packed hexagonal spacing, except that the position of each has been randomized by moving it a finite distance in a random direction from its position in a close-packed hexagonal grid. As with the embodiment of FIG. 53A, each pyramid has a randomly-chosen rotational orientation in the plane of the substrate. FIG. 54B enlarges a portion of FIG. 54A to more clearly illustrate how prism tips deviate from the locations of close hexagonal packing.

In various embodiments herein, data describing the desired microstructures can be created digitally through the following method: a full sized array is created along with a coordinate system describing the extent of the microstructure desired. Locations are then selected for the desired location of the tip (i.e., highest corner) of each pyramid. For each pyramid, a rotational orientation is also selected (whether random or deterministic). For each tip, a pyramid or corner-cube is created extending downward in all directions from the desired peak (the pyramid tip) to fill the entire coordinate system. As each subsequent pyramid is added, a maximum value is calculated between the data describing the height of the new pyramid and the array containing data describing the heights of the rest of the previously-calculated pyramids. In this manner, all pyramids extend downward until they meet a neighboring wall of a pyramid. This enables relatively simple calculation of pyramids without need for complex calculations of where sides of neighboring pyramids overlap.

In some embodiments, pyramid angles and/or the angular rotation in the plane of the substrate of each pyramid can be randomized.

Many variations are possible. Pyramids can have curved faces and/or rounded edges or corners. Elements can be other shapes beyond circular or hexagonal. They can be square, squircle, rhombus, or other shapes.

In some embodiments, a respective microstructure element has an area of less than about 1 square centimeter on the first face of the substrate. In some embodiments, a respective microstructure element has an area of about 0.1 square centimeters or less on the first face of the substrate. In some embodiments, a respective microstructure pyramid is undetectable by the naked eye (e.g., from a viewing distance of about 8 feet, 4 feet, 1 meter, 3 feet, 2 feet, 1 foot or less in various embodiments). In some embodiments, a respective microstructure pyramid is undetectable by the naked eye at typical viewing distances of about three feet or more. In some embodiments, a respective microstructure pyramid is undetectable by the naked eye at typical viewing distances of about one meter or more.

When the elements are large enough to be seen by the human eye (e.g., at a viewing distance of about three feet), they can unexpectedly provide a pleasing visual pattern, especially when the individual pyramids are too small to see but each element is large enough to be visible.

Pyramid optics according to embodiments described herein may be used as a 2D deglaring diffuser in a luminaire, including the luminaires described below in reference to FIGS. 25-32.

In some embodiments, the light transmissive structure includes at least one diffusion feature, including the diffusion features described below in reference to FIGS. 34A-34H. For example, the diffusion feature may include surface roughness on at least some of the microstructures. The diffusion feature may include a diffuser on the second face of the substrate. The diffusion feature may include a light scattering agent in at least some of the pyramids and/or in the substrate. The diffusion feature may include a diffusive coating on at least some of the microstructures.

Various embodiments described herein can provide pyramid optic that is shift-invariant, and thus can be manufactured in large areas such that a pyramid optic suitable for a given luminaire can be cut from an arbitrary location of the large area without the need to align the cut to specific optical features (such as a central point) of the optical structure. Pyramid optics according to embodiments described herein may be manufactured as described below under "Manufacturing."

Various embodiments described herein can provide a pyramid optic with high optical transmission, having substantially no light-absorbing materials.

Various embodiments described herein can provide a pyramid optic that obscures or helps obscure light sources, including but not limited to LEDs and fluorescent lamps.

Various embodiments described herein can provide a pyramid optic that increases the luminance uniformity on the surface of a luminaire.

Various embodiments described herein can provide a pyramid optic that has a visible surface pattern that may be aesthetically pleasing to a viewer. Further, various embodiments described herein can provide a pyramid optic that has a visible surface pattern that visually obscures light sources such as LEDs, or distracts the eye to reduce their visibility.

Various embodiments described herein can provide a pyramid optic than can be efficiently and inexpensively mass-produced in areas large enough to be suitable for use in general lighting.

In many embodiments, periodic or non-periodic tilings (or tessilations) are used to arrange elements comprising concentric arrangements of pyramids.

Figure 36A:
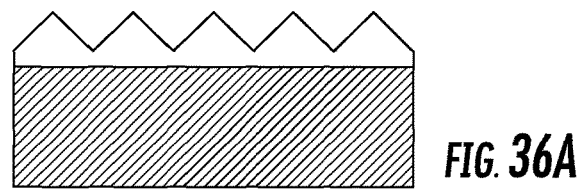
FIGS. 36A-36C are cross-sectional views of light transmissive structures with added dye according to some embodiments described herein.
Figure 36B:
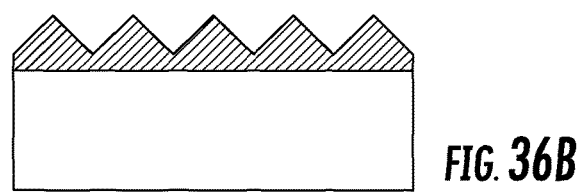
Figure 36C:
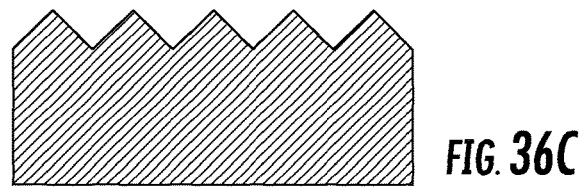

According to laboratory experiments by the Applicant, adding a dye as indicated by the shading in FIGS. 36A-36C to the substrate (FIG. 36A), prisms (FIG. 36B), or both (FIG. 36C) may desirably provide a desirably smaller high-angle luminous intensity ratio. According to experiments, added dye may somewhat undesirably reduce the total light transmission of the 2D deglaring diffuser, while desirably reducing the high-angle luminance more strongly, thus desirably improving the high-angle luminous intensity ratio. The amount of tolerable reduction in total light transmission of the 2D deglaring diffuser may depend on the specific illumination requirement, and may be acceptable in consideration of the improved suppression of high-angle luminous intensity. For reference, some commercial metal louver systems (often called "parabolic" louvers) may reduce total light transmission of luminaires by up to 40% while decreasing high-angle luminous intensity. Thus it may be desirable in some cases to incorporate dye into a 2D deglaring diffuser that causes up to 40% reduction in total light transmission. In many cases it will be desirable to provide smaller amounts of reduction in total light transmission, such as 20%, 10%, or 5%.

In many cases when a dye is used, it will be desirable to add a color-neutral dye, having substantially the same absorption at all wavelengths of interest (usually the visible wavelengths) to maintain even color of light. In some cases it may be desirable to add a non-color-neutral dye, in which case an angle-dependent color will be achieved, in which the light at high azimuthal angles is more strongly colored by the dye than light emitted at low azimuthal angles, possibly producing desirable aesthetic appeal.

Sizes for Prisms and Elements

The characteristic size of the pattern elements (which, for example, in the case of close-packed hexagons is the spacing between hexagons) will affect various embodiments described herein as follows: If the characteristic size is very small (smaller than about 1 mm) it will be undetectable by the naked eye of an observer, and the surface of the 2D deglaring diffuser will have a smooth appearance, which is desirable in some cases. If the characteristic size is larger than about 1 mm, it will present a visible pattern to the observer.

Figure 22:
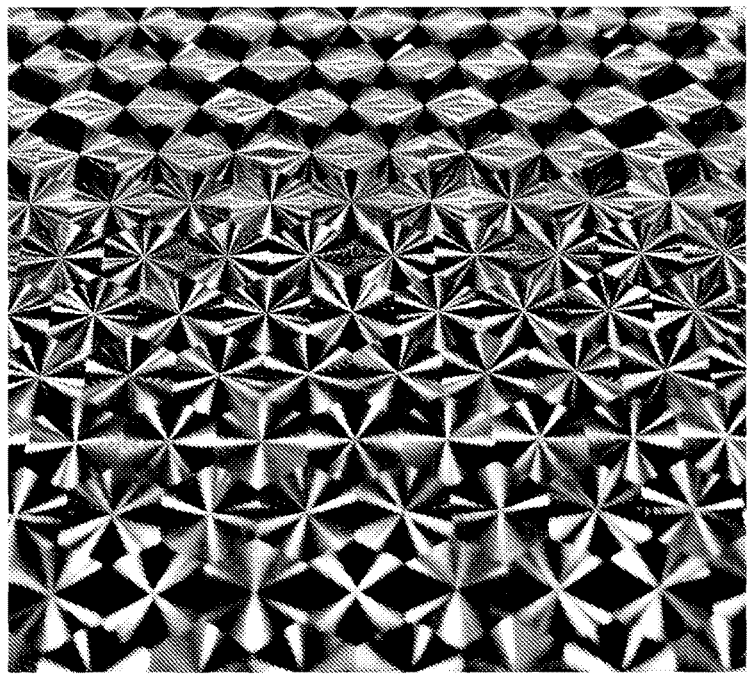
FIG. 22 is a photograph of the light transmissive structure of FIG. 39 over an array of LEDs.

According to laboratory experiments by the Applicant, pattern elements with characteristic sizes large enough to produce visible patterns can produce an unexpectedly pleasing visual appearance, adding aesthetic appeal to a luminaire in which it is used. An additional unexpected benefit of characteristic sizes large enough to produce visible patterns is that in laboratory observations, they were found to confuse the eye, giving the illusion of better hiding or scrambling of images of light sources. FIG. 22 shows a photograph of the 2D deglaring diffuser of FIG. 39 with large (approx. 10 mm) pattern elements viewed over an array of LEDs with the prism side of the diffuser facing outward away from the LEDs. It may be difficult for a viewer to determine the location of the LEDs in this photograph. In addition, when a diffuser is not used between the 2D deglaring diffuser and LEDs, this pattern will change in appearance (e.g., elements of the pattern may change in brightness and/or change in shape and/or size) at different viewing angles, adding visual appeal. Such visible surface patterns are particularly effective with LEDs, in scrambling light into pleasing patterns. In the case where additional diffusion is used, large patterns increase the effectiveness of diffusers in hiding the LEDs. This increase in effectiveness of the additional diffusers means that a weaker and thus more efficient diffuser can be used, thus leading to a luminaire of desirably higher efficiency.

The prisms of the embodiment of FIG. 22 have about 84 micron pitch, and are not substantially visible to the human eye at typical viewing distances of three feet or more or at typical viewing distances of one meter or more.

In some cases involving luminaires with arrays of LEDs, it may be desirable that the pattern elements be on a similar size scale to the spacing between LEDs, in which case they provide the strongest scrambling or obfuscation of the visibility of LED sources.

If the characteristic size of the pattern elements is more than an order of magnitude and in some embodiments, more than two orders of magnitude smaller than the light exit surface of the luminaire, then the 2D deglaring diffuser's response to light will be substantially uniform over dimensions comparable to said light exit surface of the luminaire. As such, the light distribution created by the luminaire will not be sensitive to the exact placement of the 2D deglaring diffuser in the luminaire. This is potentially advantageous for allowing tolerance in the assembly of the luminaire, and additionally potentially advantageous in allowing the product to be manufactured in sheets with large surface areas, from which 2D deglaring diffuser can be cut from any location on the sheet without needing to align the cut to specific features on the 2D deglaring diffuser pattern, saving cost. Thus in many cases it may be particularly advantageous that the characteristic size of pattern elements is more than an order of magnitude smaller, and in some embodiments more than two orders of magnitude smaller than the light exit surface of the luminaire in which it is employed. A typical small size for the light exit surface of a luminaire is about 50 mm circular, and a typical large size for the light exit surface of a luminaire is about a 1200 mm×600 mm rectangle.

Figure 23:
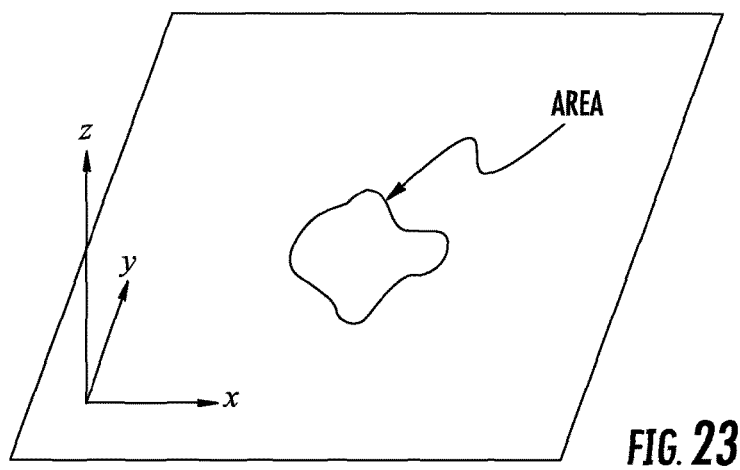
FIG. 23 is a perspective view of a light transmissive structure and a pattern element having an area thereon.

In many of the embodiments, the characteristic size of pattern elements is one or two orders of magnitude smaller than the luminaire in which it is employed. When this is true, the macroscopic optical structure is substantially uniform on the size scale of the luminaire, and to a viewer would have a consistent surface appearance, be it a smooth texture (in the case when the characteristic size is very small) or a substantially uniform pattern (for larger, more visible characteristic sizes). One can choose area on the surface of the substrate of a 2D deglaring diffuser that encompasses several pattern elements, or is several times the characteristic size of pattern elements, as illustrated in FIG. 23. This area can contain prisms with a distribution of prism orientation angles according to the design of this particular 2D deglaring diffuser, and light illuminating that area will be affected by the prisms in accordance with the collection of prism shapes and path shapes that area of the substrate. Now it is possible to choose a second area of similar size in a different location of the surface of the 2D deglaring diffuser that contains a group of prisms with substantially the same collection of prism shapes and path shapes, and have substantially the same response to incoming light. By extension, it is possible to choose areas covering the entire substrate and having substantially the same collection of prism shapes and path shapes. Given the similarity of these chosen areas, the 2D deglaring diffuser is substantially uniform over the spatial size of the substrate.

Figure 24:
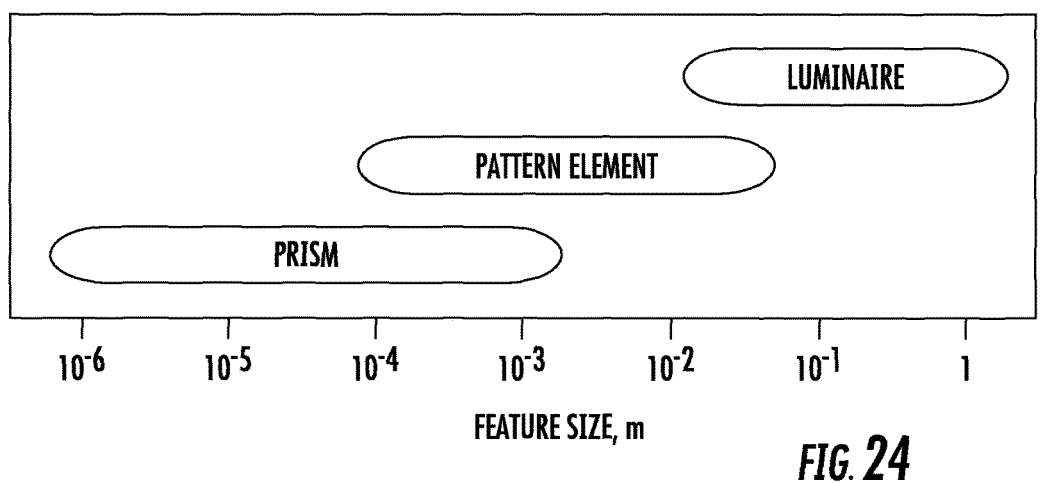
FIG. 24 is a chart illustrating the relative sizes of a luminaire, a pattern element and a prism according to some embodiments described herein.

Due to the preference that the characteristic size of pattern elements is significantly smaller than the size of the luminaire, and that the pattern elements are composed of a plurality of substantially parallel prisms and thus the individual prisms have a pitch that is generally smaller than the characteristic size of pattern elements, the prisms will in many embodiments be quite small, often smaller than 1 mm, and sometimes smaller than 100 microns. FIG. 24 shows typical order-of-magnitude sizes in meters for the prism pitch (labeled "Prism"), the characteristic size of pattern elements (labeled "Pattern Element"), and luminaires employing 2D deglaring diffusers (labeled "Luminaire"). These are only typical values, and do not place upper or lower limits on the sizes of any features of the embodiments described herein.

In an additional embodiment, the characteristic size of the pattern elements is approximately equal to or larger than the size of the light exit window of the luminaire. In this case, the 2D deglaring diffuser is comprised of substantially one pattern element. Such a diffuser would appear similar to a Fresnel lens, although it is specifically composed prisms of substantially isosceles triangular cross-section and no surfaces that are vertical (i.e. perpendicular to the substrate), whereas a Fresnel lens specifically has vertical surfaces. The 2D deglaring diffuser does not provide focusing or imaging performance, and it does not have any vertical sidewalls, both of which are characteristic of a Fresnel lens. It reduces high-angle luminous intensity of a wide Lambertian light source.

In additional embodiments, a luminaire is provided which uses any of the 2D deglaring diffusers of the embodiments herein to provide low high-angle luminous intensity.

In additional embodiments, a light source is provided which uses any of the 2D deglaring diffusers of the embodiments herein to provide low high-angle luminous intensity.

Figure 25:
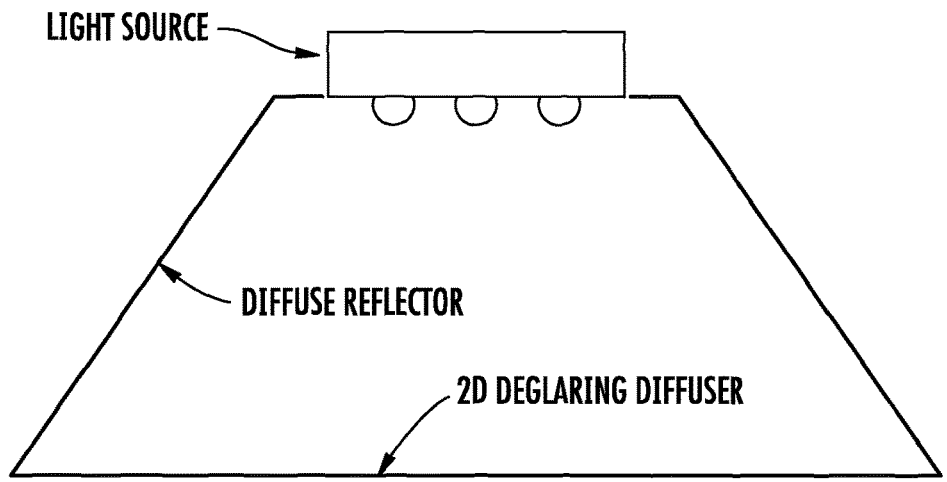
FIGS. 25-32 are simplified cross-sectional views of luminaires according to various embodiments described herein.

In other embodiments, a round luminaire as illustrated in FIG. 25 is provided with a light source, internal diffuse reflector, 2D deglaring diffuser with prisms facing away from the light source according to the embodiments herein. The luminaire has low high-angle luminous intensity, increased axial luminous intensity, and has no wink. In a related embodiment (not shown) a conventional diffuser is disposed inside the light cavity, between the 2D deglaring diffuser and light source. The luminaire has low high-angle luminous intensity.

Figure 26:
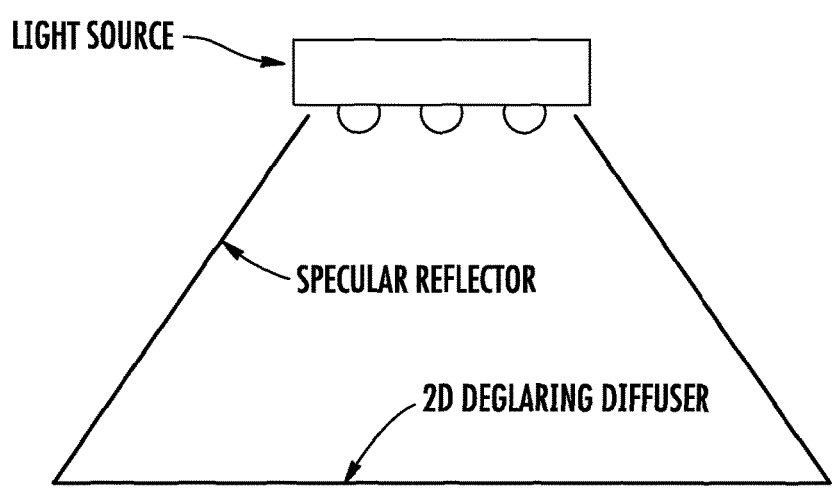

In other embodiments, a round luminaire as illustrated in FIG. 26 is provided with a light source, internal specular reflector, 2D deglaring diffuser with prisms facing away from the light source according to the embodiments herein. The luminaire has low high-angle luminous intensity. In a related embodiment (not shown) a conventional diffuser is disposed inside the light cavity, between the 2D deglaring diffuser and light source. The luminaire has low high-angle luminous intensity.

Figure 27:
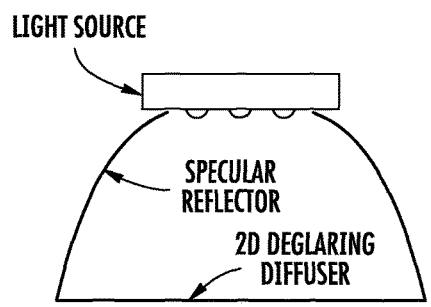

In other embodiments, a round luminaire as illustrated in FIG. 27 is provided with a light source, internal specular reflector, and 2D deglaring diffuser with prisms facing away from the light source according to the embodiments herein. The specular reflector is shaped in a curved shape such as an ellipsoid or paraboloid. The luminaire has low high-angle luminous intensity. In a related embodiment (not shown) a conventional diffuser is disposed inside the light cavity, between the 2D deglaring diffuser and light source. The luminaire has low high-angle luminous intensity.

Figure 28:
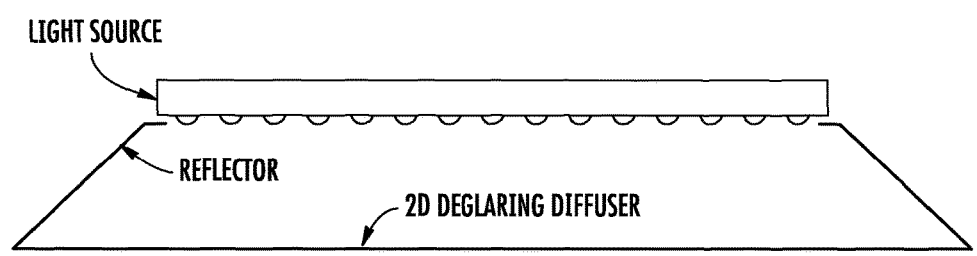

In other embodiments, a luminaire as illustrated in FIG. 28 is provided with an array of light sources over substantially the entire surface of the luminaire, an internal reflector, and 2D deglaring diffuser with prisms facing away from the light source according to the embodiments herein. The luminaire has low high-angle luminous intensity, increased axial luminous intensity, and has no wink. In other embodiments this luminaire is rectangular or circular. In a related embodiment (not shown) a conventional diffuser is disposed inside the light cavity, between the 2D deglaring diffuser and light source. The luminaire has low high-angle luminous intensity.

Figure 29:
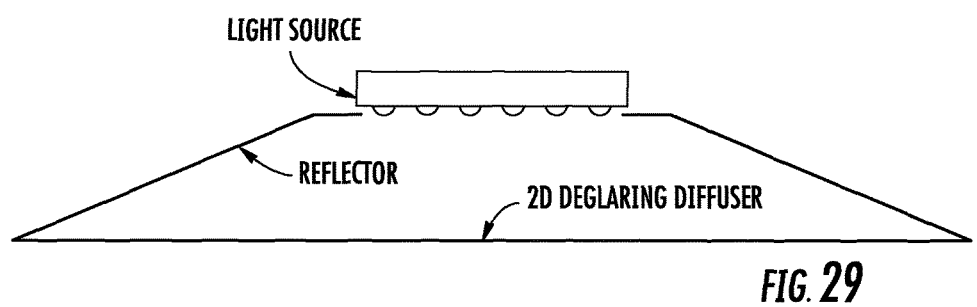

In other embodiments, a luminaire as illustrated in FIG. 29 is provided with an array of light sources over less than the entire surface of the luminaire, an internal reflector, and 2D deglaring diffuser with prisms facing away from the light source according to the embodiments herein. The luminaire has low high-angle luminous intensity, increased axial luminous intensity, and has no wink. In other embodiments this luminaire is rectangular or circular. In a related embodiment (not shown) a conventional diffuser is disposed inside the light cavity, between the 2D deglaring diffuser and light source. The luminaire has low high-angle luminous intensity.

Figure 30:
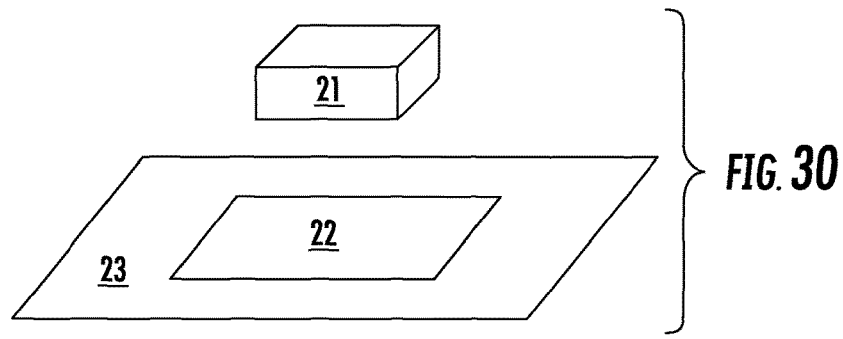

In other embodiments, a 2D deglaring diffuser according to the embodiments described herein is used on conjunction with other optics or diffusers. In one such embodiment, a rectangular luminaire as illustrated in FIG. 30 has a diffuser with central section (2) surrounded by an outer section (3). The luminaire is provided with a light source or array of light sources (1) located substantially above the central section (2). A central optic or diffuser is placed in the central section (2), and due to the placement of the light sources above the central section, receives illumination from a limited range of angles, receiving substantially no high-angle illumination. This central section does not need an optic to further reduce high-angle luminous intensity, and thus could be occupied by other optics or diffusers such as conventional diffusers, reflectors, louvers, or a 2D batwing diffuser, such as described in U.S. application Ser. No. 14/308,293, filed Jun. 18, 2014, assigned to the assignee of the present application, the disclosure of which is incorporated herein by reference in its entirety. Some optics or diffusers in the central section 22 may comprise microstructures and may be disposed on the surface of the substrate facing the light source, the surface facing away from the light source, or both. A 2D deglaring diffuser according to the embodiments herein with prisms on the side facing away from the light source is used in the outer section 23 which may receive high-angle illumination from the light sources 21. The luminaire may be provided with a specular or diffuse reflector (not shown) closing the cavity between the light source and diffuser to enhance efficiency. The luminaire provides low high-angle luminous intensity. In another variation of these embodiments, the center section has a shape other than a square as indicated, such as a circle. In another variation of these embodiments, both the conventional diffuser and the 2D deglaring diffuser are formed on the same substrate.

Figure 31:
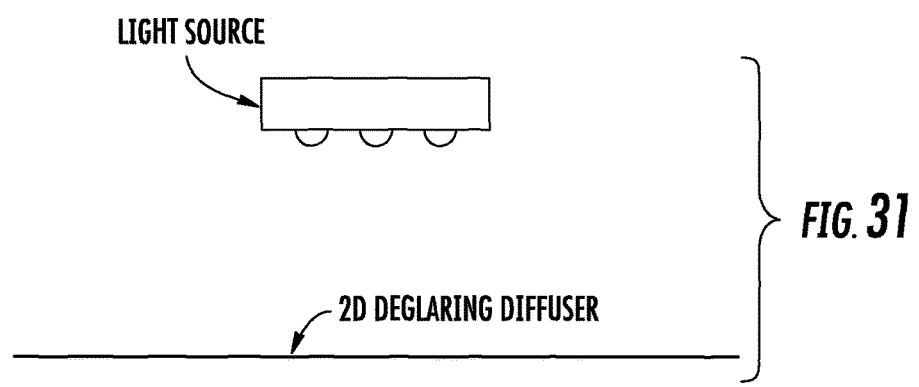

In other embodiments, a 2D deglaring diffuser is suspended below a light source, with open gaps somewhere in the housing, such that some light is transmitted through the 2D deglaring diffuser and light reflected from the diffuser continues upward to illuminate a ceiling, as shown in FIG. 31. The diffuser can be suspended under the light source via any techniques known in the art (not shown) including cables, a frame at sides or edges, or transparent enclosure. In variations of this embodiment, additional elements such as additional 2D deglaring diffusers, 2D batwing diffusers, conventional diffusers, baffles and louvers are used to further shape the upward directed light into a desired distribution.

In additional embodiments, other types of luminaires known in the art can employ a 2D deglaring diffuser according to any of the embodiments described herein and produce low high-angle luminous intensity, said luminaires including but not limited to downlight, recessed troffer, surface-mount troffer, suspended pendant, suspended linear pendant, wall wash, cove, replacement lamp, PAR lamp, architectural, fine art, outdoor, bollard, aisle, stage/show lighting, movie lighting.

In additional embodiments, luminaires including a 2D deglaring diffuser according to any of the embodiments described herein may employ additional elements such as conventional diffusers, additional 2D deglaring diffuser, 2D batwing diffusers, linear batwing diffusers, baffles, louvers, specular reflectors, diffuse reflectors, absorbers, openings, to further modify the light distribution for purposes such as obscuring lamps, modifying the light distribution, forming batwing distributions, reducing axial luminous intensity, or forming asymmetric or one-sided distributions. In additional embodiments, additional elements such as power supplies, housings, air vents, heatsinks, decorative elements, and means of affixing a luminaire to a wall, ceiling or other object are provided.

Figure 32:
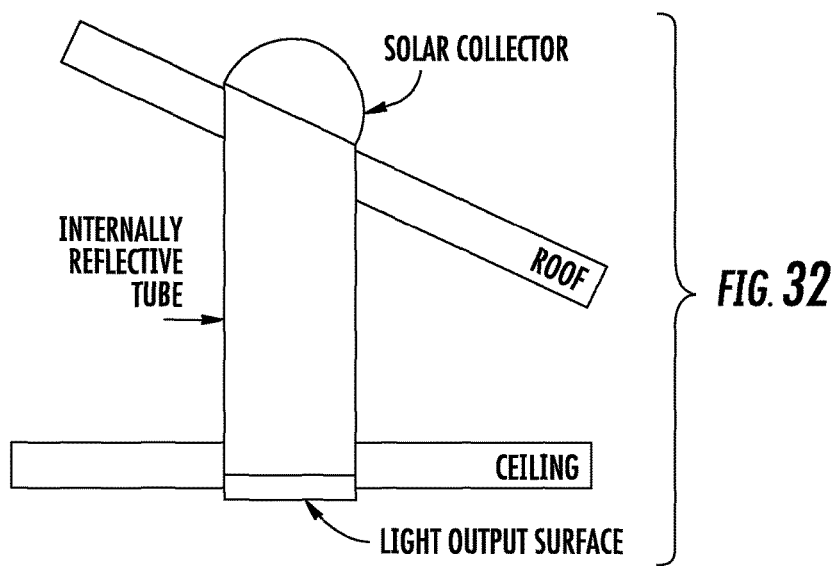

Luminaires are known in the art that collect outdoor light (i.e. direct and/or diffuse solar light) and transmit the light to a desired location, often diffusing the light at that location using a conventional diffuser or other light-transmitting material. A commercially-available example is Solatube, of Vista, Calif. (http://www.solatube.com). In additional embodiments described herein, a luminaire including a solar collector, a light-transmitting member such as tube with reflective inner walls or fiber optic cable assembly, and a light-exiting surface, through which light is emitted into a space is provided with a 2D deglaring diffuser according to any of the embodiments described herein, and emits light with low high-angle luminous intensity, as illustrated in FIG. 32.

Figure 1:
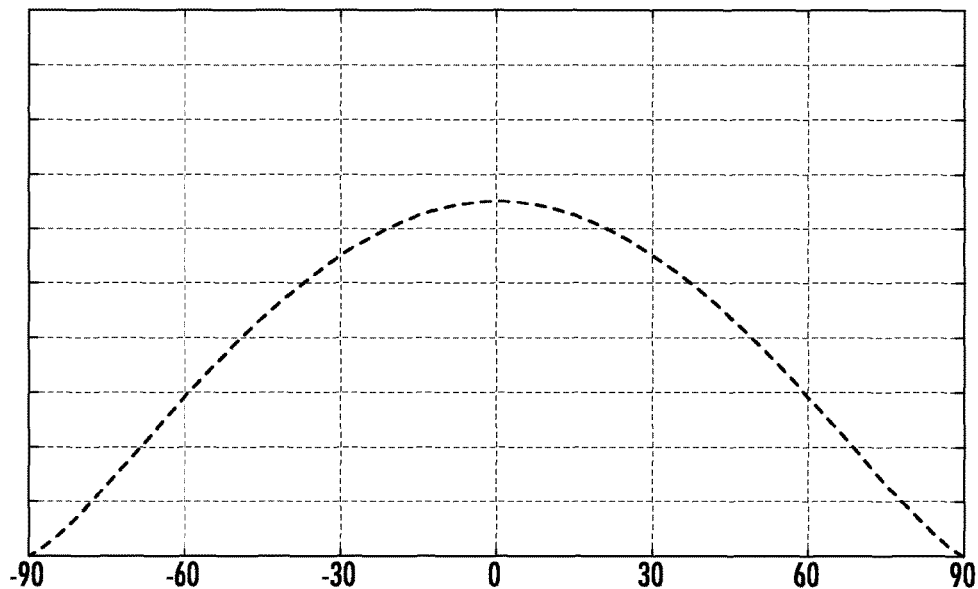
FIG. 1 is a chart illustrating a Lambertian intensity distribution with a Full Width Half Maximum (FWHM) of 120 degrees.
Figure 2:
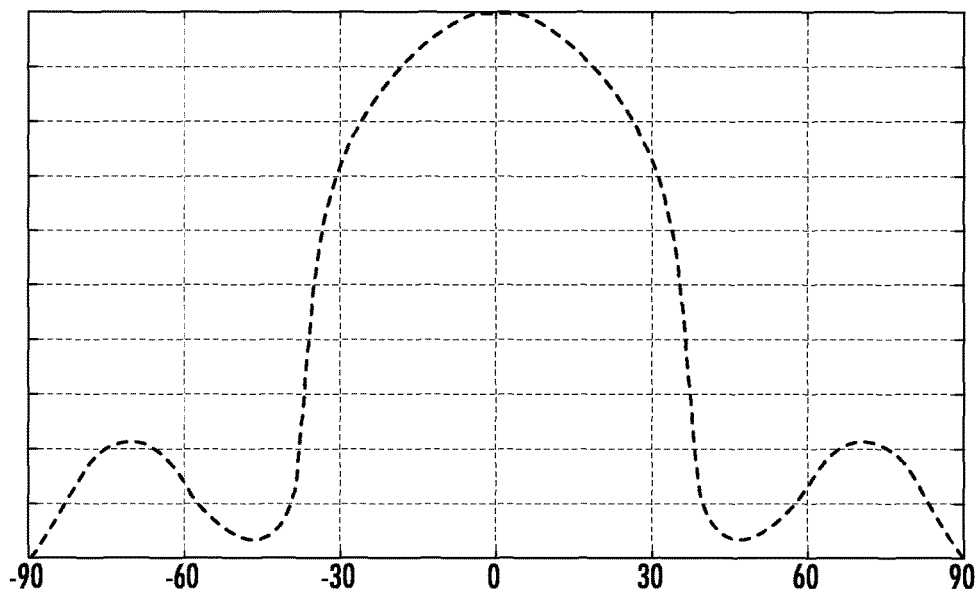
FIG. 2 is a chart illustrating the light distribution of a Lambertian light source after passing through a linear prism film.
Figure 35:
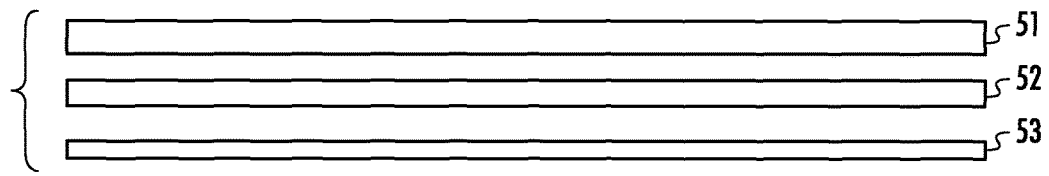
FIG. 35 is a cross-sectional view of a display incorporating a light transmissive structure according to some embodiments described herein.

In additional embodiments, a display or illuminated sign such as depicted in FIG. 35 includes a light source 51, a 2D deglaring diffuser 52 according to any of the embodiments described herein, and a means of information display 53 such as a mask, transparency, or Liquid Crystal Display (LCD) panel. The display has reduced high-angle luminous intensity, increased axial luminous intensity, and has no wink. In addition the display may benefit from a desirable monotonic decrease in luminous intensity at higher angles that does not include a wink as commonly created by 90-degree prism films and as illustrated in FIG. 2.

Manufacturing

The 2D deglaring diffuser according to any of the embodiments described herein can be created using many techniques known in the art.

The shape of the prisms may be cast onto a substrate using a suitable master mold, and thermally-curing polymer or ultraviolet (UV) light curing polymer, or the shape may be impressed into a thermoplastic substrate through compression molding or other molding, or may be created at the same time as the substrate using extrusion-embossing or injection molding.

Figure 33:
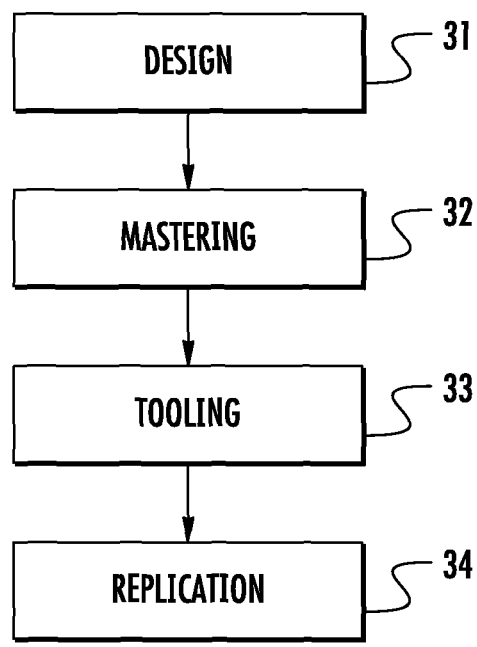
FIG. 33 is a flowchart of methods of fabricating light transmissive structures according to various embodiments described herein.

The microstructures may be produced by replicating a master, as illustrated at Block 44 of FIG. 33. For example, an optical diffuser can be made by replication of a master containing the desired shapes as described in U.S. Pat. No. 7,190,387 to Rinehart et al., entitled Systems And Methods for Fabricating Optical Microstructures Using a Cylindrical Platform and a Rastered Radiation Beam; U.S. Pat. No. 7,867,695 to Freese et al., entitled Methods for Mastering Microstructures Through a Substrate Using Negative Photoresist; and/or U.S. Pat. No. 7,192,692 to Wood et al., entitled Methods for Fabricating Microstructures by Imaging a Radiation Sensitive Layer Sandwiched Between Outer Layers, assigned to the assignee of the present application, the disclosures of all of which are incorporated herein by reference in their entirety as if set forth fully herein. The masters themselves may be fabricated using laser scanning techniques described in these patents, and may also be replicated to provide diffusers using replicating techniques described in these patents.

Large prism sizes make it impractical or even impossible to make flexible films. Films, when manufactured roll to roll, can be very economical. The prisms themselves, which can be manufactured quickly and economically using photoreplication with UV-curing polymers, benefit from smaller prism sizes, which consume less UV-cured polymer, saving expense Thin films can be laminated to rigid polymer (such as acrylic or polycarbonate) sheets.

Photoreplicated films of this sort laminated to rigid sheets can often be more cost effective than other methods, such as compression molding, which has high shape fidelity but is slow, or hot roll embossing, which is comparatively fast but has poorer shape fidelity, and thus poorer optical performance.

When using photoreplication, it is desirable that the height of the photoreplicated layer (in this case, the prisms of a 2D deglaring diffuser) be less than or about equal to the thickness of the polymer substrate onto which the microstructure is being photoreplicated. Having prisms of about 100 micron height makes it possible to photoreplicate on substrates as thin as about 100 microns. Having prisms of about 30 micron height enables photoreplication on substrates as thin as about 25 microns (0.001 inch) in thickness. Films with thickness in the 25-125 micron range are preferable for use as a flexible film due to low cost and low shipping weight. Films with thickness in the 12.5-75 micron range are preferable for use for lamination due to low cost.

The ATARO luminaire available from Waldmann of Villingen-Schwenningen, Germany has relatively large prisms (about 1 mm in pitch/size) that are arranged concentrically with only about five rings and therefore may have lower suppression of high-angle glare than desirable. If more rings of prisms were used, performance may improve, but then lamp-hiding performance will suffer because the pattern elements approach the size of the lamp and within an order of magnitude of the fixture size.

With the ATARO luminaire, both the prisms and the pattern element are of size that is detectable by the naked eye (e.g., at viewing distances of about three feet or more). This produces a very different optical appearance which Applicant has learned is undesirable for many customers. Applicant has learned from experience that for patterns used in office and architectural lighting, customers generally prefer pattern sizes of around 1-5 mm, preferably about 1-3 mm.

In other methods and systems, laser holography, known in the art, is used to create a holographic pattern that creates the desired microstructure in a photosensitive material.

In other methods and systems, projection or contact photolithography, such as used in semiconductor, display, circuit board, and other common technologies known in the art, is used to expose the microstructures into a photosensitive material.

In other systems/methods, laser ablation, either using a mask or using a focused and modulated laser beam, is used to create the microstructures in a material.

In other methods and systems, micromachining (also known as diamond machining), known in the art, is used to create the desired microstructure from a solid material.

In other methods and systems, additive manufacturing (also known as 3D printing), known in the art, is used to create the desired microstructure in a solid material.

Variations

Many other variations on the structure may be provided according to various embodiments described herein.

The substrate may be thin, such as a flexible plastic film, or thick, such as a rigid acrylic or polycarbonate sheet. It may be monolithic or include multiple layers, such as a thin plastic film laminated to a thicker rigid substrate using an adhesive layer or other lamination method. The diffuser may be substantially flat, or may take on a curvature (concave or convex; cylinder-like or dome-like) as long as the diffuser still reduces high-angle luminous intensity. Additional optical or mechanical layers may be present, such as a cladding layer of differing refractive index disposed outside of the 2D deglaring diffuser prism layer.

In one embodiment, a 2D deglaring diffuser is curved into a half-cylinder shape and illuminated by a linear light source positioned along the line defining the center of the half-cylinder. It produces a light distribution with reduced high-angle luminous intensity in the azimuthal plane parallel to the line defining the center of the cylinder, and because of the curvature, does not as strongly reduce high-angle luminous intensity in the azimuthal plane perpendicular to the line defining the center of the cylinder.

2D deglaring diffusers according to any of the embodiments described herein are designed to accept a light distribution provided by a luminaire's light source and components excluding the 2D deglaring diffuser (the "incoming light distribution") and create a useful light distribution with low high-angle luminous intensity. In some cases, the incoming light distribution will be Lambertian with 120 degree FWHM. In other cases, the incoming light distribution may be a narrower Lambertian (e.g. 60 degree FWHM), approximately Lambertian, or non-Lambertian. In these cases, it still may be desirable to shape the incoming light distribution using a 2D deglaring diffuser.

Customization of the 2D deglaring diffuser to achieve goals, including specific degrees of suppression of high-angle luminous intensity, accommodating specific incoming light distributions, desired visual appearances, etc., can be achieved by varying many different aspects of the 2D deglaring diffuser according to any of the embodiments described herein. Variations in geometry (including prism pitch, curvature, cross-sectional shape, and geometric shape of the prism layout), internal angle, rounding of prism peaks and valleys, surface roughness, etc., can be used. Prisms may be asymmetric (with a gentle-sloping face on one side, and a strongly-sloped face in the other side). The refractive index of the prisms can be varied. Different refractive indices may result in different amounts of high-angle luminous intensity.

The use of an appropriate separate diffuser with a collimated or near-collimated light source can widen the light source into a Lambertian light source. For example, it is known in the art that opal glass will transform nearly any incoming light distribution into an approximately 120-degree Lambertian distribution. Thus a 2D deglaring diffuser with a collimated or near-collimated light source and an additional diffuser with an appropriate level of diffusion disposed between the light source and 2D deglaring diffuser will perform similarly to a 2D deglaring diffuser with a Lambertian incoming light distribution. Thus a narrow light source with a diffuser of sufficient diffusion can be considered the same thing as a wide Lambertian light source when discussing 2D deglaring diffusers of the embodiments herein.

In additional embodiments, a 2D deglaring diffuser according to any of the embodiments described herein includes additional diffusion (such as from surface roughness, a diffusive substrate, or a diffusive second surface). Such diffusion may increase the ability of the 2D deglaring diffuser to hide light sources such as LEDs, and may also decrease the ability of the 2D deglaring diffuser to reduce high-angle luminous intensity. This reduction may still be acceptable and thus may be a valid choice of tradeoff in cases where increased source hiding is desired. Diffusion can be added to a 2D deglaring diffuser in many ways, as illustrated in FIGS. 34A-34.

Figure 34A:
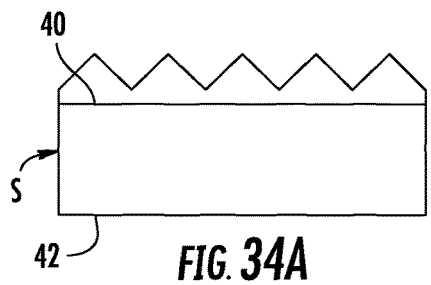
FIG. 34A is a cross-sectional view of a light transmissive structure according to some embodiments described herein.

FIG. 34A shows a cross-section of a typical non-diffused embodiment for reference. The 2D deglaring diffuser or light transmissive structure of FIG. 34A includes a substrate S having first and second opposing faces 40, 42 and a plurality of microprisms on the first face 40.

The microprisms may be the microprisms of any of the embodiments described herein such as, for example, the microprisms 12 shown in FIG. 6.

Figure 34B:
FIGS. 34B-34H are cross-sectional views of light transmissive structures with added diffusion features according to various embodiments described herein.

In one embodiment, depicted in FIG. 34B, diffusion is added to a 2D deglaring diffuser according to any of the embodiments described herein by superimposing diffusive surface features. Many conventional surface (microstructure) diffusers are comprised of surface features such as microlenses or random roughness. Such surface features can be directly superimposed upon the surface of the prisms of the 2D deglaring diffuser, and will add diffusion to the effect of the 2D deglaring diffuser.

Figure 34C:
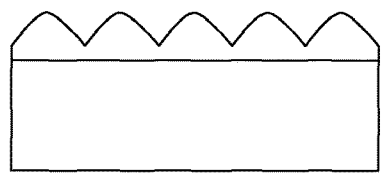

In other embodiments, depicted in FIG. 34C, diffusion is added to a 2D deglaring diffuser according to any of the embodiments described herein by rounding the prism tips. In related embodiments the prism tips and/or valleys can be rounded.

Figure 34D:
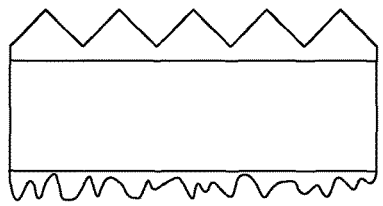

In other embodiments, depicted in FIG. 34D, diffusion is added to a 2D deglaring diffuser according to any of the embodiments described herein by creating a conventional surface diffuser such as a microstructure or holographic diffuser on the surface of the substrate opposite the prism layer, using techniques known in the art.

Figure 34E:
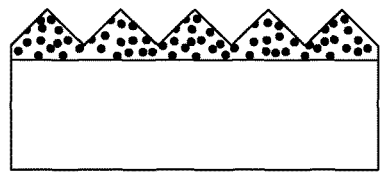

In other embodiments, depicted in FIG. 34E, diffusion is added to a 2D deglaring diffuser according to any of the embodiments described herein by introducing light scattering in the prism layer. This can be accomplished for example by incorporating a scattering agent, such as minerals (e.g. TiO2 or Calcium Carbonate), microspheres or beads, particles, phase separated materials, into the liquid UV-curable polymer used to create the prism structure.

Figure 34F:
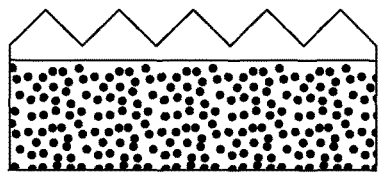

In other embodiments, depicted in FIG. 34F, diffusion is added to a 2D deglaring diffuser according to any of the embodiments described herein by incorporating a scattering agent, such as minerals (e.g. TiO2 or Calcium Carbonate), microspheres or beads, particles, phase separated materials, into the substrate material.

Figure 34G:
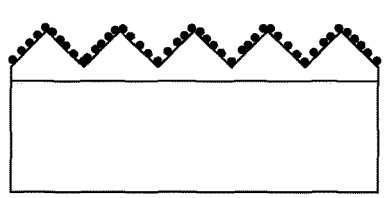

In other embodiments, depicted in FIG. 34G, diffusion is added to a 2D deglaring diffuser according to any of the embodiments described herein by conformally coating a diffusive coating onto the surface of the prisms. Diffusive coatings are known in the art, such as a mineral dispersed in a binder polymer.

Figure 34H:
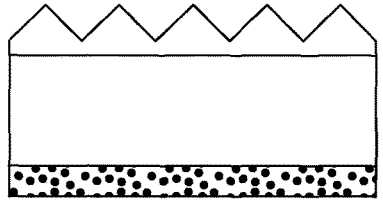

In other embodiments, depicted in FIG. 34H, diffusion is added to a 2D deglaring diffuser according to any of the embodiments described herein by combining the transparent substrate with a diffusive layer, said diffusive layer comprising any conventional diffuser known in the art.

In many cases, the exact effect of the variations in 2D deglaring diffuser design according to any of the embodiments described herein need not be directly or completely understood to be optimized, because these variations can be readily designed using mathematical software such as MATLAB, and optimized using optical ray tracing software such as LightTools to achieve specific goals. It is possible with ray tracing software to model the output of a 2D deglaring diffuser according to any of the embodiments described herein when presented with a specific incoming light distribution such as an 80 degree Lambertian distribution. It is also possible to make a complete model of a luminaire, so as to optimize the 2D deglaring diffuser design according to any of the embodiments described herein and luminaire design to achieve a specific output light distribution from the luminaire.

The performance of a 2D deglaring diffuser according to any of the embodiments described herein can be further varied by changing the design of 2D deglaring diffuser across the substrate. Any of the variations discussed herein could be changed from one location to another, or from one pattern element to another, one prism to another, to randomize the performance of the diffuser. This might be used to provide stronger or weaker suppression of high-angle luminous intensity at various locations on the substrate depending on their proximity and to the light source(s) and associated incoming light distribution at said locations, or to combine other optical functions, such as light-source hiding, and/or visible aesthetic surface patterns.

In some embodiments, a 2D deglaring diffuser according to any of the embodiments described herein includes concentric circular prisms arranged in a hexagonal repeat pattern similar to the embodiments of FIGS. 7, 21, 37 and 39.

Each pattern element contains prisms of a randomly or pseudo-randomly chosen prism internal angle, ranging from 105 to 120 degrees. The optic reduces high-angle luminous intensity.

Elements of Various Embodiments

Various embodiments described herein may be regarded as including the following elements:

Embodiment 1

A two-dimensional deglaring diffuser comprising: a first substantially smooth surface; a second textured surface; a thickness therebetween; the textured surface comprising a microprism array, the microprism array comprising a plurality of microprisms with substantially more than one prism orientation angle, the microprism array being conceptually divisible into at least 10 sub-areas for which each sub-area contains prismatic microstructures with a substantially the same distribution of prism orientation angles as the other sub-areas.

Embodiment 2

A two-dimensional deglaring diffuser comprising: a first smooth surface; a second textured surface; a thickness therebetween; the textured surface comprising a microprism array, the microprism array comprising a plurality of elements with area on the substrate of less than 1 square inch, each element on the substrate comprising prismatic microstructures arranged in a concentric geometric shape. The geometric shapes include but are not limited to: an ellipse, a circle, a rounded polygon, a rounded triangle, a rounded rectangle, a rounded square, a rounded rhombus, and a rounded hexagon.

Embodiment 3

A two-dimensional deglaring diffuser comprising: a first substantially smooth surface; a second textured surface; a thickness therebetween; the textured surface comprising a microprism array, the microprism array comprising a plurality of elements, each element comprising prismatic microstructures arranged in a concentric geometric shape; the prismatic microstructures having substantially more than one prism orientation angle.

Embodiment 4, which focuses on the "parallel" aspect, that even in concentric circles, they're essentially parallel prisms: A two-dimensional deglaring diffuser comprising: a first substantially smooth surface; a second textured surface; a thickness therebetween; the textured surface comprising a microprism array, the microprism array comprising a plurality of elements, each element comprising prismatic microstructures arranged substantially parallel to one another; the prismatic microstructures having substantially more than one prism orientation angle.

Embodiment 5

Embodiments 1-4 in which the prism cross-sectional shape is approximately isosceles triangular.

Embodiment 6

Embodiments 1-5 in which the prism cross-sectional internal angle is approximately between 95 and 120 degrees.

Embodiment 7

Embodiments 1-6 in which the prism cross-sectional internal angle is approximately between 105 and 115 degrees.

Embodiment 8

Embodiments 1-7 in which the prism cross-sectional peak is rounded, arched, or otherwise blunted.

Embodiment 9

Embodiments 1-8 in which the prism cross-sectional shape has sides that curve outwardly to be convex when viewed from above.

Embodiment 10

Embodiments 1-9 in which the prism paths follow a curvilinear shape including but not limited to a circle, ellipse, rounded triangle, rounded square, rounded hexagon, and/or random curvilinear shape.

Embodiment 11

Embodiments 1-10 in which the prism paths have substantially all possible prism orientation angles.

Embodiment 12

Embodiments 1-11 in which the majority of prism paths form substantially closed shapes.

Embodiment 13

Embodiments 1-12 in which the shape of the prism path varies between two or more shapes.

Embodiment 14

Embodiments 1-13 in which any one prism segment has at least one adjacent prism segment, disposed on one or both sides of the one prism segment that is substantially parallel to the one prism segment.

Embodiment 15

Embodiments 1-14 in which any one prism segment has at least two adjacent prism segments, disposed on one or both sides of the one prism segment that are substantially parallel to the one prism segment.

Embodiment 16

Embodiments 1-15 in which prism arrays are bounded inside one or more shapes that are repeated, tiled, or tessellated, or randomly arrayed across the substrate Embodiment 17

Embodiments 3-16 where the more than one prism orientation angles includes at least 0, 45, 90, and 135 degrees.

Embodiment 18

Embodiments 3-17 where the more than one prism orientation angles encompasses substantially all prism orientation angles.

Embodiment 19

Embodiments 3-18 where the plurality of prismatic microstructures has a distribution of prism orientation angles that is substantially uniform over all angles in the plane.

Embodiment 20

Embodiments 1-19 in which additional diffusion is added.

Embodiment 21

Embodiments 1-20 where either side of the material is further embedded in another material.

Embodiment 22

Embodiments 1-21 where a characteristic or characteristics, including but not limited to a cross-sectional shape, cross-sectional angle, prism tip rounding and/or prism path shape, is varied across the substrate in a deterministic or random manner.

Embodiment 23

Embodiments 1-22 in which a light absorbing dye is added to the prism structure, the substrate, or both.

Embodiment 24

Embodiment 23 in which the dye is color neutral, having substantially the same absorption at all visible wavelengths.

Embodiment 25

Embodiment 23 in which the dye is not color neutral causing the 2D deglaring optic to emit light of different colors at different viewing angles.

Embodiment 26

Embodiments 23-25 in which the dyed 2D deglaring optic has light transmission that is 0-40% lower than the transmission of an identical undyed 2D deglaring optic.

Embodiment 27

Embodiments 23-26 in which the dyed 2D deglaring optic has light transmission that is 0-20% lower than the transmission of an identical undyed 2D deglaring optic.

Embodiment 28

Embodiments 23-27 in which the dyed 2D deglaring optic has light transmission that is 0-10% lower than the transmission of an identical undyed 2D deglaring optic.

Embodiment 29

A luminaire, light fixture, display, or illumination device having a light source and 2D deglaring diffuser of embodiments 1-28, in which the 2D deglaring diffuser is oriented with the prism side facing generally away from the light source

Embodiment 30

A luminaire, light fixture, display, or illumination device having a light source, reflector, and 2D deglaring diffuser of embodiments 1-29, in which the 2D deglaring diffuser is illuminated by the light source and oriented with the prism side facing generally away from the light source

Embodiment 31

A method of using a light source and 2D deglaring diffuser of embodiments 1-30 with prism side oriented away from a light source to create illumination with low high-angle luminous intensity.

As used herein, the term "wherein the light transmissive structure is configured to receive light from a light source facing the second face and reduce high-angle luminous intensity of the light emerging from the first face" can mean that, when the second face is illuminated by a light distribution of a light source (e.g., a wide light source), the light transmissive structure is configured to reduce high-angle luminous intensity of the light emerging from the first face relative to that light distribution. For example, when the light source is a Lambertian light source and the second face is illuminated by a Lambertian light distribution, the light transmissive structure may be configured to reduce high-angle luminous intensity of the light emerging from the first face relative to the Lambertian light distribution.

Various embodiments have been described above with reference to the accompanying drawings. Other embodiments may take many different forms and should not be construed as limited to the embodiments set forth herein. Rather, these embodiments are provided so that this disclosure will be thorough and complete, and will fully convey the scope of the invention to those skilled in the art.

When an element is referred to as being on, coupled or connected to/with another element, it can be directly on, coupled or connected to/with the other element or intervening elements may also be present. In contrast, if an element is referred to as being directly on, coupled or connected to/with another element, then no other intervening elements are present.

As used herein, the term "and/or" includes any and all combinations of one or more of the associated listed items. The symbol "/" is also used as a shorthand notation for "and/or".

It will be understood that although the terms first and second are used herein to describe various regions, layers and/or sections, these regions, layers and/or sections should not be limited by these terms. These terms are only used to distinguish one region, layer or section from another region, layer or section. Thus, a first region, layer or section discussed above could be termed a second region, layer or section, and similarly, a second region, layer or section could be termed a first region, layer or section without departing from the teachings of the present invention. Like numbers refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," "includes" and/or "including", "have" and/or "having" (and variants thereof) when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. A light transmissive structure comprising:
   a light transmissive substrate having first and second opposing faces; and
   an array of microprism elements on the first face, a respective microprism element comprising a plurality of concentric microprisms;
   wherein the light transmissive structure is configured to receive light from a light source facing the second face and reduce high-angle luminous intensity of the light emerging from the first face,
   wherein the respective microprism element comprises a plurality of concentric circular microprisms,
   wherein a respective microprism has a generally triangular cross section with sides defining a peak, the cross section taken in a plane perpendicular to the first face of the substrate,
   wherein the respective microprism has an internal angle defined by the peak of between about 95 and 120 degrees.

2. The light transmissive structure of claim 1 wherein the light transmissive structure is configured to reduce luminous intensity of the light emerging from the first face at angles greater than about 65 degrees from a direction orthogonal to the light transmissive substrate to less than about 30% of the light emerging from the first face in the direction orthogonal to the light transmissive substrate.

3. The light transmissive structure of claim 2 wherein the light transmissive structure is configured to monotonically decrease luminous intensity of the light emerging from the first face at increasing angles from the direction orthogonal to the light transmissive substrate.

4. The light transmissive structure of claim 1 wherein the light transmissive structure is configured to substantially reduce luminous intensity of the light emerging from the first face at angles between about 65 degrees and about 85 degrees from a direction orthogonal to the light transmissive substrate relative to a Lambertian light distribution.

5. The light transmissive structure of claim 1 wherein the light transmissive structure is configured to substantially increase luminous intensity of the light emerging from the first face in a direction orthogonal to the light transmissive substrate relative to a Lambertian light distribution.

6. The light transmissive structure of claim 1 wherein the respective microprism element comprises at least 10 concentric circular microprisms.

7. The light transmissive structure of claim 1 wherein at least one generally triangular microprism is defined by at least some adjacent microprism elements.

8. The light transmissive structure of claim 1 wherein the second face is substantially smooth.

9. The light transmissive structure of claim 1 wherein a respective microprism is undetectable by the naked eye at a viewing distance of about three feet.

10. The light transmissive structure of claim 1 wherein the respective microprism element includes a hexagonal outer boundary.

11. The light transmissive structure of claim 1 wherein the light transmissive structure is configured to produce a visible pattern to a viewer of the light transmissive structure at a viewing distance of about three feet, the visible pattern corresponding to the array of microprism elements on the first face.

12. The light transmissive structure of claim 1 wherein the light transmissive structure is configured to receive light from an array of LEDs as the light source and produce a sparkly pattern to a viewer of the light transmissive substrate.

13. The light transmissive structure of claim 12 wherein the sparkly pattern changes in appearance as a viewing angle relative to a direction orthogonal to the light transmissive substrate changes.

14. The light transmissive substrate of claim 1 wherein at least one side of the respective microprism defines a convex surface.

15. The light transmissive structure of claim 1 in combination with at least one light source and a housing that is configured to hold the at least one light source and the light transmissive substrate so that light from the light source impinges on the second face of the substrate and emerges from the first face of the substrate with reduced high-angle luminous intensity.

16. The light transmissive structure of claim 1 wherein the array of microprism elements extends over substantially the entire first face of the substrate.

* * * * *